(12) United States Patent
Goto et al.

(10) Patent No.: US 6,314,483 B1
(45) Date of Patent: Nov. 6, 2001

(54) PORTABLE ELECTRONIC DEVICE

(75) Inventors: Teiyu Goto, Saitama; Ken Kutaragi, Tokyo, both of (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/250,070

(22) Filed: Feb. 12, 1999

(30) Foreign Application Priority Data

Feb. 16, 1998 (JP) .................................................. 10-050096
Feb. 16, 1998 (JP) .................................................. 10-050159

(51) Int. Cl.[7] ........................................................ G06F 13/00
(52) U.S. Cl. .......................... 710/107; 710/102; 361/683; 361/686; 463/1; 463/42
(58) Field of Search ........................ 710/107, 102, 710/72; 463/1, 42, 43, 46, 48; 361/681, 683, 684, 686, 679

(56) References Cited

U.S. PATENT DOCUMENTS

| | | | |
|---|---|---|---|
| 5,428,528 | * 6/1995 | Takenouchi et al. ................... | 463/42 |
| 5,600,800 | 2/1997 | Takenouchi et al. ................... | 273/237 |
| 5,701,232 | * 12/1997 | Tang et al. ............................. | 361/683 |
| 5,769,646 | * 6/1998 | Cavello et al. ........................ | 439/136 |
| 5,778,256 | * 7/1998 | Darbee .................................... | 710/72 |
| 5,971,855 | * 10/1999 | Ng .......................................... | 463/42 |
| 5,990,874 | * 11/1999 | Tsumura et al. ...................... | 345/173 |
| 6,018,848 | * 2/2000 | Nilsen .................................... | 24/3.12 |
| 6,049,453 | * 4/2000 | Hulsebosch .......................... | 361/686 |
| 6,108,200 | * 8/2000 | Fullerton .............................. | 361/686 |

FOREIGN PATENT DOCUMENTS 0 665 038   8/1995   (EP) .
WO 93/23125   11/1993   (WO) .

* cited by examiner

Primary Examiner—Robert Beausoleil
Assistant Examiner—X. Chung-Trans
(74) Attorney, Agent, or Firm—Frommer Lawrence & Haug LLP.; William S. Frommer; Gordon Kessler

(57) ABSTRACT

A portable electronic device adapted to be connected to or disconnected from an external device comprises a housing which accommodates an electrical circuit and which has a terminal adapted to be connected to the external device. A lid member is pivotally supported by the housing for movement between a first position covering the terminal and a second position exposing the terminal.

14 Claims, 50 Drawing Sheets

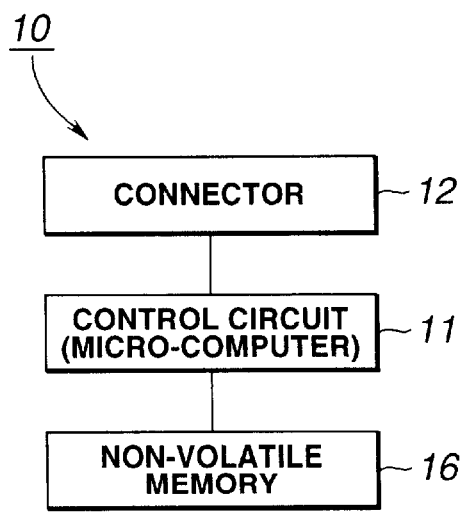
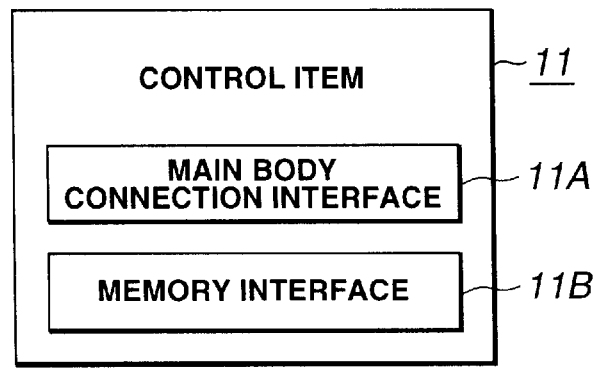
FIG.68A  FIG.68B

PORTABLE ELECTRONIC DEVICE

BACKGROUND OF THE INVENTION

This invention relates generally to a portable electronic device used as an auxiliary storage device for an information equipment, such as a memory card device, and also to a portable, electronic gaming device, and more particularly to a connection terminal and cover thereof.

As is known in the art, a portable electronic device or a slave device, such as a memory card device, may be used as a non-volatile storage element for holding data. The portable electronic device is inserted into an information providing apparatus, such as a video game machine acting as a master device, and receives information thereof for storage. The portable electronic device includes an interface for connection to a main body portion of the information providing apparatus.

FIG. 68A shows an illustrative block diagram structure of a memory card device as an example of the portable electronic device. In FIG. 68A, a memory card device 10 has a control circuit II for controlling the operation of the memory card device, a connector 12 for connecting the memory card device to a terminal provided in a slot of the main body portion of the information providing apparatus and a non-volatile memory 16 for holding data. Connector 12 and non-volatile memory 16 are coupled with control circuit 11. The control circuit comprises, by way of example, a micro-computer and the non-volatile memory comprises a flash memory, such as EEPROM, or the like by way of example. As a connection interface with the information providing apparatus, an additional micro-computer, or the same micro-computer as that used for controller 12, may be used to oversee the data transfer protocol.

FIG. 68B further shows a plurality of control items within controller 11 of memory card device 10. Here, the controller 11 has a connection interface 11A for connection to the main body portion of the information providing apparatus and a memory interface 11B for data input/output for non-volatile memory 16.

A conventional video game device, such as a home TV game device, stores game data or the like in an auxiliary storage device. The above-mentioned memory card device 10 may be used as this auxiliary storage device for such a conventional video game device. FIG. 69 depicts an example of such a conventional video game device 1 employing memory card device 10 as the auxiliary storage device. As shown, the video game device has a main body portion 2 housed in a casing. A disc loading unit 3 is positioned in a center area thereof and is adapted to receive an optical disc having an application program recorded thereon to be used by the video game device. Main body portion 2 of video game device 1 includes a reset switch 4 for optionally resetting the game, a power switch 5, a disc actuating switch 6 for actuating the loading of the optical disc, and in a preferred embodiment by way of example, two slots 7A and 7B. Memory card device 10, used as the auxiliary storage device, is inserted into one of slots 7A and 7B. A control circuit 19 (Central Processing Unit "CPU") of video game device 1 feeds information indicative of, for example, the results of a game being executed on the video game device. These game results are written to non-volatile memory 16 of memory card device 10 and may include score results, game position information so a user may restart a game at a desired location, or the like. Plural actuators (controllers), not shown, may also be connected to slots 7A and 7B so that plural users can simultaneously play combat games or the like, for example.

The terminal used for connection of memory card device 10 to the video game device is exposed to the outside of the outer casing of the memory card device. This terminal of the memory card device is coupled with an integrated circuit within the memory card device, for example. If a hand or finger of a user makes contact with the terminal, the integrated circuit of the memory card device may be electrostatically destroyed. Therefore, when not connected to an information providing apparatus, the terminal of the memory card device should be protected by a cover formed of an electric insulating material. However, a conventional cap type cover that may be mounted/dismounted from the outer casing of the memory card device is difficult to handle. Additionally, the cover may be lost when the memory card device is in use.

Although a rotary cover may be provided on the outer casing of the memory card device to protect the terminal thereof, this rotary type cover may have its supporting portion destroyed by an externally applied force. Moreover, this type of cover occasionally proves a hindrance during connection of the memory card device to the information providing apparatus. Also, if a rotary type lid is provided, and it is desired to reduce the size of the memory card device, the rotary type lid may take up a large part of the space of the outer casing of the memory card device. Thus, no space may be left on the memory card device to provide an actuator, display or the like.

It would therefore be beneficial to provide an improved electronic apparatus that overcomes the drawbacks of the prior art.

OBJECTS OF THE INVENTION

Accordingly, it is an object of the invention to provide an improved portable electronic device having a terminal portion for connection to an external equipment.

It is another object of the invention to provide an improved portable electronic apparatus which, when not connected to an external equipment, the terminal portion thereof can be reliably protected.

It is a further object of the invention to provide an improved portable electronic apparatus that is easy to handle and which permits facilitated operation of an actuator positioned on an outer casing of the portable electronic apparatus.

It is still another object of the invention to provide an improved portable electronic apparatus that can be connected smoothly to an external equipment while retaining a cover for protecting a terminal thereof.

Still other objects and advantages of the invention will in part be obvious and will in part be apparent from the specification and drawings.

SUMMARY OF THE INVENTION

Generally speaking in accordance with the invention, a portable electronic apparatus is provided and includes an electronic circuit portion having a terminal portion for connection to an external equipment. The terminal portion is exposed to the outside of the outer casing of the portable electronic apparatus via a through-hole provided therein. A lid member is also provided and is rotatably supported by the outer casing of the portable electronic apparatus. The lid member reliably protects the terminal portion of the portable electronic apparatus, and can be mounted on or dismounted from the outer casing, as desired. Thus, the lid member is not destroyed by an external force during the opening or closing of the lid. Moreover, if the lid member proves a hindrance during connection of the portable electronic apparatus to the external equipment, it can be intentionally dismounted.

The invention accordingly comprises the several steps and the relation of one or more of such steps with respect to the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 68A and B show illustrative structures of essential portions of a conventional memory card device.

DETAILED DESCRIPTION OF THE PREFERRED EMBODIMENTS

Figure 1:
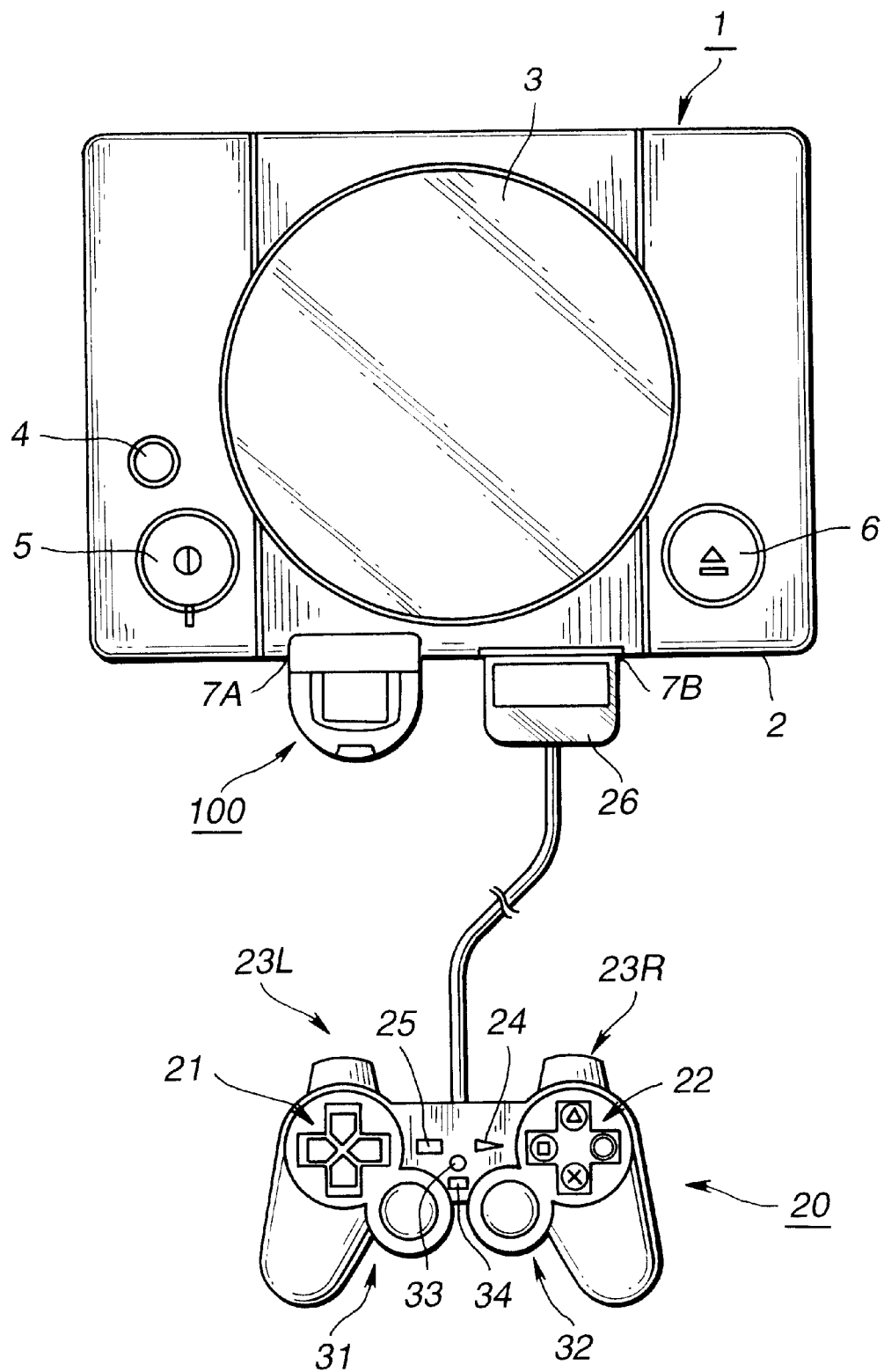
FIG. 1 is a top plan view depicting a video game device connected with a portable electronic apparatus constructed in accordance with the present invention.

Referring to the drawings, the preferred embodiments of the present invention will be explained in detail. It should be noted that the portable electronic device of the present invention is usable not only as a memory card for an entertainment system, such as a video game device that acts as a master device, but also as a portable small-sized game device. The master device is not limited to a video game device, while the portable electronic apparatus, acting as a slave device, need not necessarily be limited to a memory card.

In the following description, a video game device is depicted as an example of a master device, in which a portable electronic device embodying the present invention is used as a slave device.

Referring first to FIG. 1, a video game device 1, acting as a master device, is shown with a portable electronic device 100 constructed in accordance with the present invention loaded thereon. Video game device 1 is provided with a main body portion 2 housed in a casing, and a disc loading unit 3 adapted for loading an optical disc is positioned in a center area thereof. This optical disc may comprise a CD-ROM as a recording medium, the optical disc having an application program recorded thereon to be executed by video game device 1. The video game device reads out the game program recorded on the optical disc, and executes the game program in accordance with instructions from a user (game player). Game execution includes controlling the progress of the game, display and sound. Main body portion 2 of video game device 1 also includes in a preferred embodiment, a reset switch 4 for optionally resetting the game, a power switch 5, a disc actuating switch 6 for loading the optical disc, and two slots 7A and 7B. The recording medium for supplying the application program is not limited to an optical disc; and the application program may also be supplied via a communication network or via other non-volatile storage media.

Two actuating devices 20 may each be selectively connected to either one of slots 7A and 7B so that two users can play a combat or other two player, or head-to-head game. The aforementioned memory card device or the portable electronic device embodying the present invention can also be inserted in either of slots 7A and 7B. Although FIG. 1 shows two slots 7A and 7B, the number of slots may also be other than two.

Actuating device 20 includes first and second actuating units 21 and 22, an L-button 23L, an R-button 23R, a start button 24, and a selection button 25. Actuating device 20 also includes actuating units 31 and 32, a mode selection switch 33 for selecting between the operating modes of these actuating units and 21 and 22, and 31 and 32, and a display unit 34 for displaying the selected actuating mode.

Figure 2:
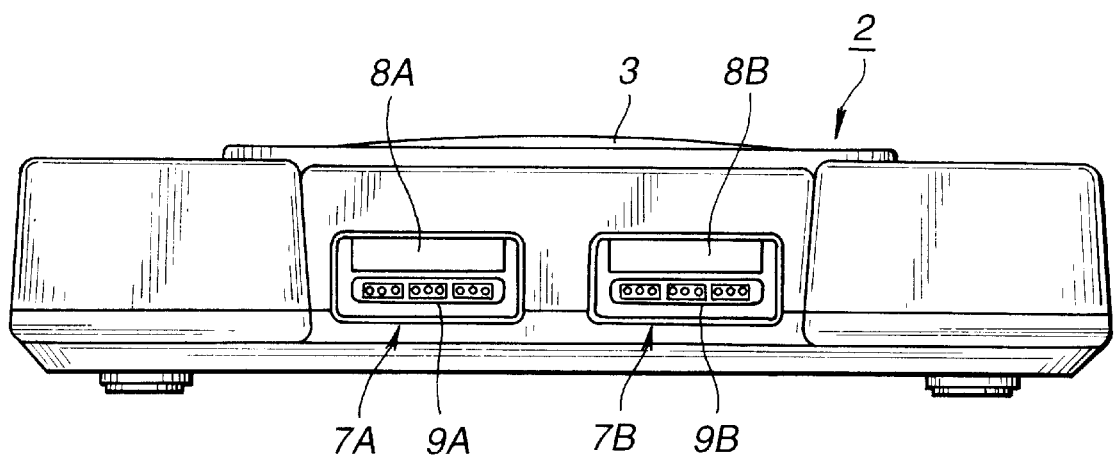
FIG. 2 is a front elevational side view of a slot portion of the video game device of FIG. 1.

FIG. 2 depicts the appearance of slots 7A and 7B provided on the front surface of main body portion 2 of video game device 1. In the present embodiment, slots 7A and 7B are designed having two tiers. In the upper tier of each slot is provided a memory card insertion unit 8A and 8B, respectively, in which a memory card device or portable electronic device may be selectively inserted as later explained. In the lower tier of each slot 7A or 7B is provided a controller connection unit (jacks) 9A or 9B, respectively, for connecting a connection terminal (connector) 26 of each controller 20 to the video game device.

The insertion slots of memory card insertion units 8A and 8B are formed as horizontally elongated rectangles whose upper side corners are rounded more prominently than the lower side comers thereof (not shown) to prevent the memory card or portable electronic device from being inserted in an incorrect orientation. Memory card insertion units 8A and 8B are also provided with a shutter for protecting a connection terminal provided therein (not shown). Controller connection units 9A and 9B are formed of horizontally elongated rectangles whose lower side comers are rounded more prominently than the upper side comers thereof to prevent connection terminal 26 of controller 20 from being inserted in an incorrect orientation. Additionally, the insertion slots of controller connection units 9A and 9B are of a different shape from memory card insertion units 8A and 8B to prevent incorrect insertion of the memory card in controller connection units 9A and 9B, and vice-versa.

Figure 3:
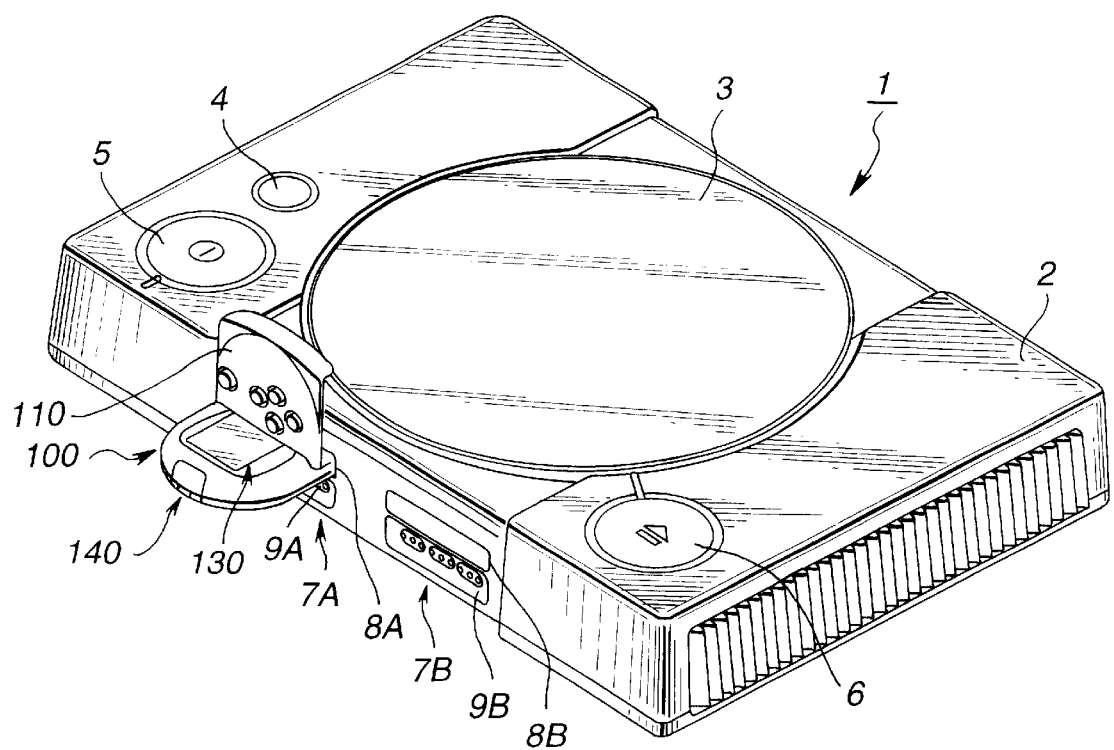
FIG. 3 is a perspective view depicting the video game device of FIG. 1 with the portable electronic apparatus constructed in accordance with the invention coupled therewith.

Referring next to FIG. 3, portable electronic device 100 of the present invention is shown having been inserted into memory card insertion unit 8A of slot 7A on the front side of video game device 1. A lid 110 of portable electronic device 100 is in an opened position, allowing for the insertion of the portable electronic device.

Figure 4:
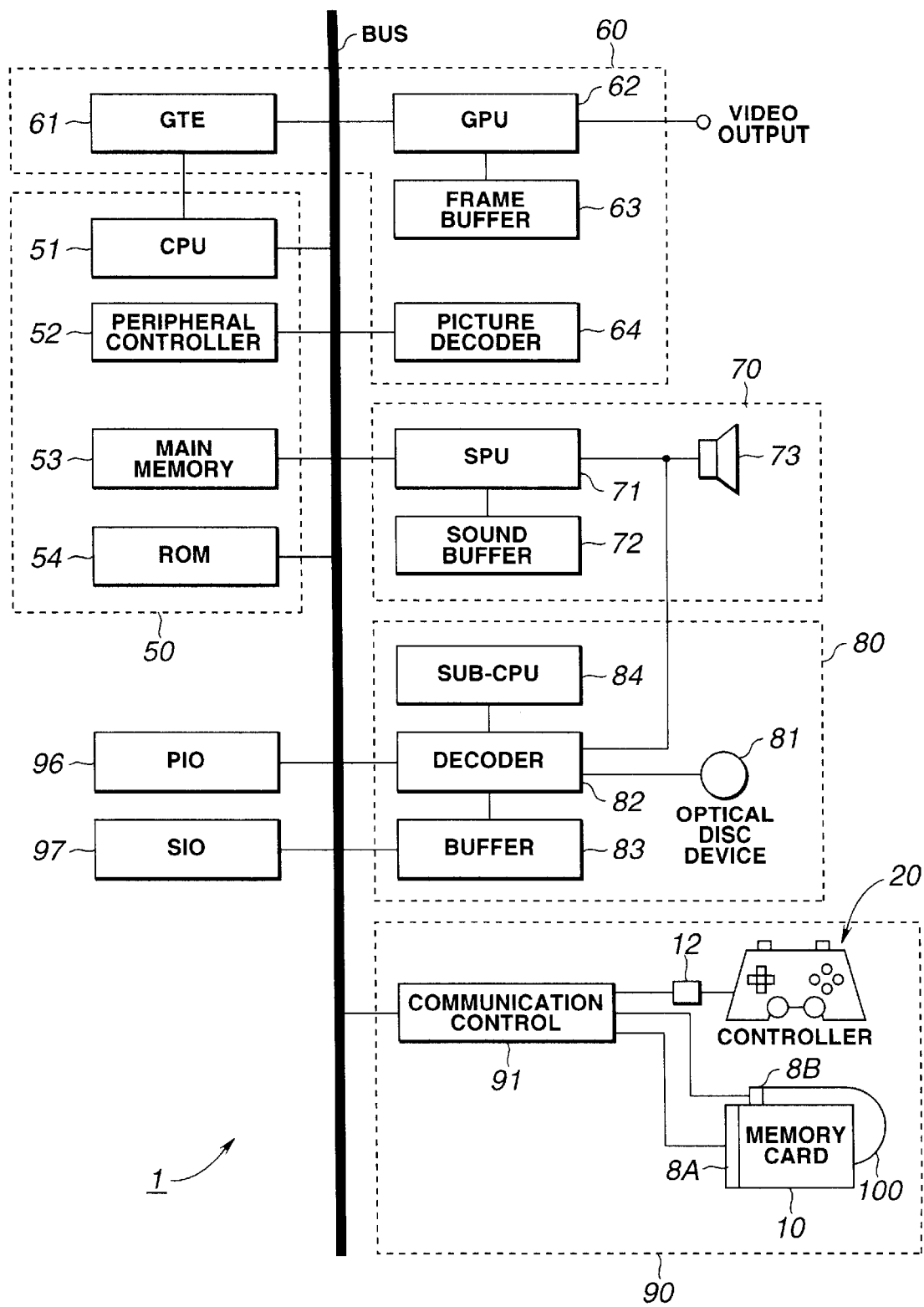
FIG. 4 is a block diagram showing an illustrative structure of essential portions of the video game device of FIG. 1.

FIG. 4 is a block diagram showing an example of a schematic circuit configuration of essential portions of video game device 1. The video game device includes a control system 50 made up in part of a central processing unit CPU 51 and peripherals, a graphic system 60 comprised in part of a graphic processing unit GPU 62 for performing a drawing operation to a frame buffer 63 and peripherals, a sound system 70 comprised in part of a sound processing unit SPU for generating music, other sound effects, an optical disc controller 80 for controlling an optical disc having an application program recorded thereon, and a communication unit 90 comprising in part a communication controller 91 for controlling input/output of data from the portable electronic device 100 or memory card 10 for storing game setting data and signals received from controller 20, in accordance with commands from the user and game setting signals, and a bus BUS for interconnecting the above components.

Control system 50 includes CPU 51, a peripheral controller 52 for controlling interrupt or direct memory access (DMA) transfer, a main memory 53 comprised of a random access memory (RAM) and a read-only memory (ROM) having stored therein programs for operating main memory 53, graphic system 60 or sound system 70. CPU 51 executes instructions in accordance with an operating system stored in memory in a ROM 54 in order to control video game device 1 in its entirety. ROM 54 is comprised of, for example, a 32-bit RISC-CPU.

On power up of video game device 1, CPU 51 of control system 50 executes instructions in accordance with the operating system stored in ROM 54 so that CPU 51 controls graphic system 60 and/or sound system 70. When the operating system is executed, CPU 51 initializes video game device 1 in its entirety, such as operation recognition, and subsequently controls optical disc controller 80 to execute the application program such as the game recorded on the optical disc. During execution of the recorded game program, CPU 51 is responsive to the input from the user via controller 20 to control graphic system 60 to present the appropriate picture display and sound system 70 regarding generation of the proper sound effects.

Graphic system 60 includes a geometry transfer engine (GTE) 61 coupled with CPU 51 for performing processing, such as coordinate transformation. GPU 62 draws a picture in accordance with drawing commands from CPU 51, a frame buffer 63 stores a picture drawn by GPU 62 and a picture decoder 64 decodes picture data that was compressed when encoded by orthogonal transform such as DCT or the like.

GTE 61 includes a parallel computing mechanism and is responsive to a request for processing from CPU 51 to execute high-speed processing such as coordinate transformation, light source computations, matrix or vector computations. In a preferred embodiment GTE 61 executes coordinate computations of up to 1,500,000 polygons per second including flat shading or drawing a sole triangular polygon with the same color. It is thus possible to reduce the computational burden on CPU 51 and to execute high-speed coordinate computations through the use of GTE 61.

GPU 62 is also responsive to a drawing command from CPU 51, and is adapted to draw a picture such as a polygon on frame buffer 63. GPU 62 can draw up to 360,000 polygons per second. Frame buffer 63 is comprised of a dual-port RAM and can receive a picture from GPU 62, transfer a picture from a main memory and read out a picture for display simultaneously. In a preferred embodiment, frame buffer 63 is formed with a capacity of, for example, 1 Mbyte and is handled as a matrix of 1024 horizontal pixels and 512 vertical pixels, each pixel being 16 bits. Frame buffer 63 may further include, in addition to a display area for storing a video display to be output, a CLUT (color look-up table) area in which to store a CLUT to which the GPU 62 refers when drawing a picture such as a polygon. The frame buffer may additionally include a texture area in which is stored a texture that may be inserted (mapped) into e.g., a polygon coordinate-transformed and drawn by the GPU 62. The size of the CLUT area and the texture area are dynamically changed in response to changes in the display area GPU 62 can perform goulow shading, i.e. determining the color in a polygon by complementation from the color of the vertex point and texture mapping of affixing the texture stored in the texture area to the polygon, in addition to the above-mentioned flat shading. In carrying out the goulow shading or texture mapping, in a preferred embodiment, GTE 61 can execute coordinate computations of up to about 500,000 polygons per second. Picture decoder 64 decodes picture data of still or moving pictures stored in main memory 53 under the control of CPU 51, and stores the resulting decoded picture data in the main memory. Also, the reproduced picture data is stored via GPU 62 in frame buffer 63 so as to be usable as the picture drawn by the GPU 62.

Sound system 70 also includes SPU 71 for producing the musical sound or the sound effect in accordance with instructions from CPU 51, a sound buffer 72 that stores wave data or the like provided by SPU 71, and a speaker 73 for outputting the musical sound or the sound effect generated by SPU 71. SPU 71 performs an adaptive differential PCM (ADPCM) decoding function for reproducing sound data obtained on adaptive differential PCM (ADPCM) of, for example, 16-bit sound data as a 4-bit differential signal. SPU 71 further performs a reproducing function of reproducing the waveform data stored in sound buffer 72 to generate the sound effect and a modulation function of modulating and reproducing the waveform data stored in sound buffer 72. Sound system 70 can function as a sampling sound source for generating a musical sound or sound effect based on the waveform data recorded in sound buffer 72 in accordance with the instructions from CPU 51.

Optical disc controller 80 includes an optical disc device 81 for reproducing the program or data recorded on an optical disc, a decoder 82 for decoding the program or data having an error correction code (ECC) appended thereto, and a buffer 83 for temporarily storing data reproduced from optical disc device 81 to expedite data readout from the optical disc. A sub-CPU 84 is coupled to decoder 82. Sound data recorded on an optical disc and read out by optical disc device 81 may be recorded using PCM data obtained by analog/digital conversion of various sound signals in addition to the above-mentioned ADPCM data. A sound data portion of the ADPCM data, corresponding to the difference of 16-bit digital data represented as 4-bits and recorded in this form, is decoded by decoder 82 and supplied to SPU 71. There, the data is processed by the SPU 71 such as by digital/analog conversion and then forwarded for driving speaker 73.

Communication controller 90 includes a communication control unit 91 for controlling communication with CPU 51 via bus BUS. Communication control unit 91 provides controller connection units 9A and 9B connected to controller 20 for entering a user command, and memory card insertion units 8A and 8B, for receiving memory card 10 and portable electronic device 100, constructed in accordance with the invention.

Controller 20 connected to controller connection units 9A and 9B has, by way of example, 16 command keys, to allow entry of commands by a user, and is thus responsive to commands from communication control unit 91. Controller 20 sends the status of the command keys approximately sixty times per second, for example in a preferred embodiment, to communication control unit 91 by synchronous communication. Communication control unit 91 sends the status of the command keys of controller 20 to CPU 51. The commands input by the user to CPU 51 cause CPU 51 to perform processing in accordance with the received user command based upon a game program currently being processed.

During the processing of a game program, a large quantity of picture data must be transferred between main memory 53, GPU 62, picture decoder 64 and decoder 82. Thus, the present video game device is designed so that data can be directly transferred among main memory 53, GPU 62, picture decoder 64 and decoder 82 under control of peripheral controller 52, without the interposition of CPU 51, by way of so-called DMA transfer. By using such DMA transfer, it is possible to relieve the computational burden on CPU 51 and enable high-speed transfer of data. If it is necessary to store in memory (of the portable electronic device or memory card) the current state data of a game currently being processed, CPU 51 transmits the data to be stored to communication control unit 91, which in turn writes the data from CPU 51 into memory card 10 or into portable electronic device 100, whichever is inserted into one of the memory card insertion units 8A or 8B.

Communication control unit 91 further includes a protective circuit for preventing electrical destruction of video game device 1, memory card 10 or portable electronic device 100. Memory card 10 or portable electronic device 100 may be mounted or dismounted while the main body portion of video game device 1 is powered up. If the recording capacity of memory card 10 or portable electronic device 100 is reaching its limit, this used memory card or portable electronic device can be removed, and a new memory card or portable electronic device can be inserted into video game device without turin off the power of the video game device. Thus, there is no risk of inadvertent loss of game data when backing-up, or when inserting a new memory card or portable electronic device. A parallel I/O interface (PIO) 96 and a serial I/O interface (SIO) 97 act as interfaces for interconnecting memory card 10, portable electronic device 100, or other additional equipment and video game device 1.

A portable electronic device embodying the present invention is hereinafter explained. In the following description, as is shown in FIG. 3, it is presupposed that portable electronic device 100 is loaded on video game device 1, and is to be controlled thereby. A portable electronic device, acting as slave device, is loaded into memory card insertion unit 8A or 8B provided in the slots 7A or 7B, respectively, of video game device 1, acting as a master device. Portable electronic device 100 is used as a memory card associated with the plural actuating devices. If, for example, the game is played by two users (players), the results of the game by the two players are recorded in two portable electronic devices 100. This function is also provided in a conventional apparatus by recording on a simple memory card 10.

Upon insertion of memory card 10 or portable electronic device 100 in memory card insertion unit 8A or 8B, the conductors of the connection terminals for grounding and for providing power to the memory card or portable electronic device are longer than the other data transmission terminals. Thus, the power source terminals and the ground terminals preferably are electrically connected first. This assures safety and stability of the electrical operations. Alternatively, or additionally, the connection terminals for grounding and for providing power of memory card insertion unit 8 of video game device 1 may also be longer in length than the other data transmission terminals. Also, the connector portions of the memory card or portable electronic device and memory card insertion unit 8A and 8B are configured asymmetrically in the left-and-right direction to further guard against improper insertion of memory card 10 or portable electronic device 100.

Figure 5:
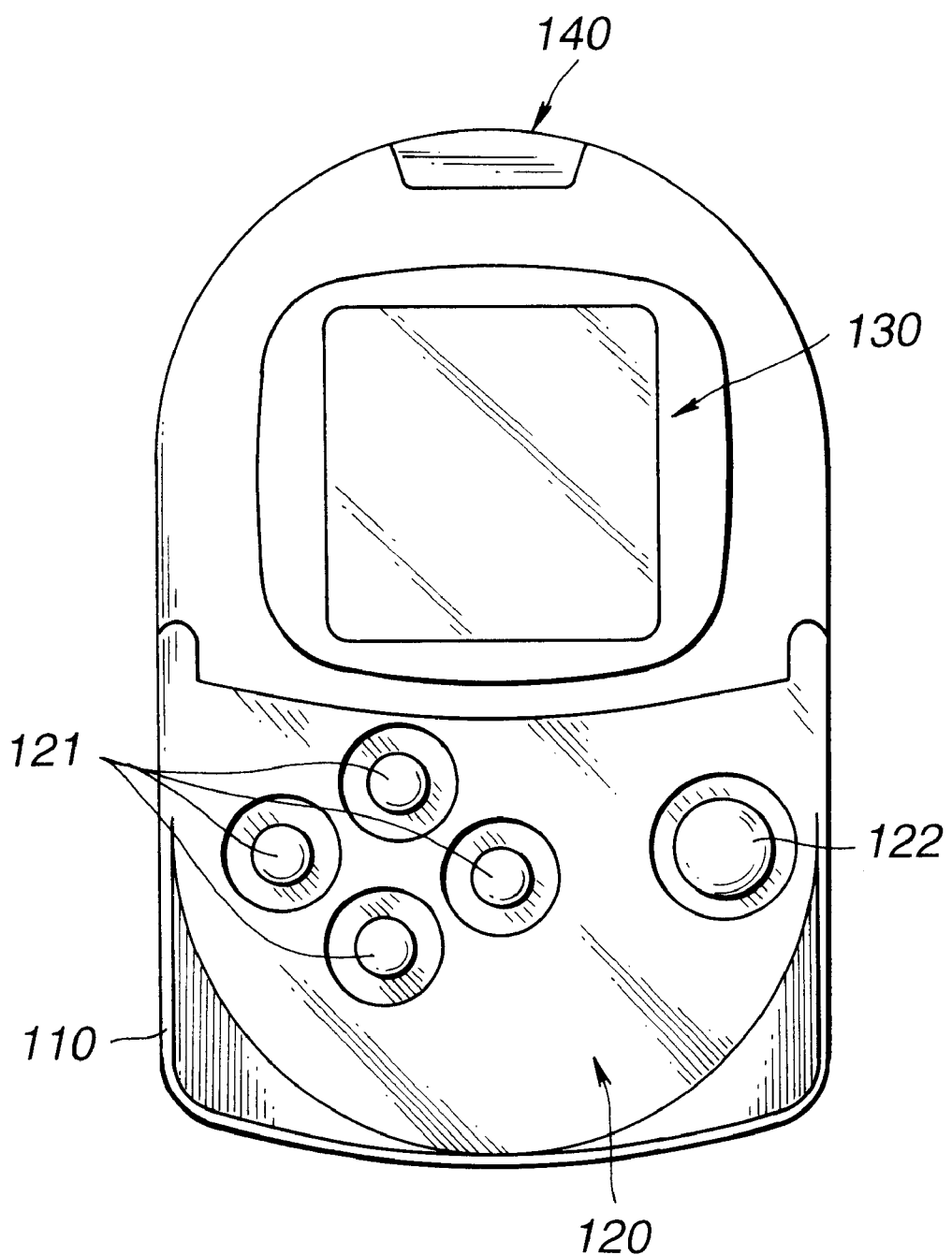
FIG. 5 is a front elevational view depicting the portable electronic apparatus constructed in accordance with a first embodiment of the invention.
Figure 6:
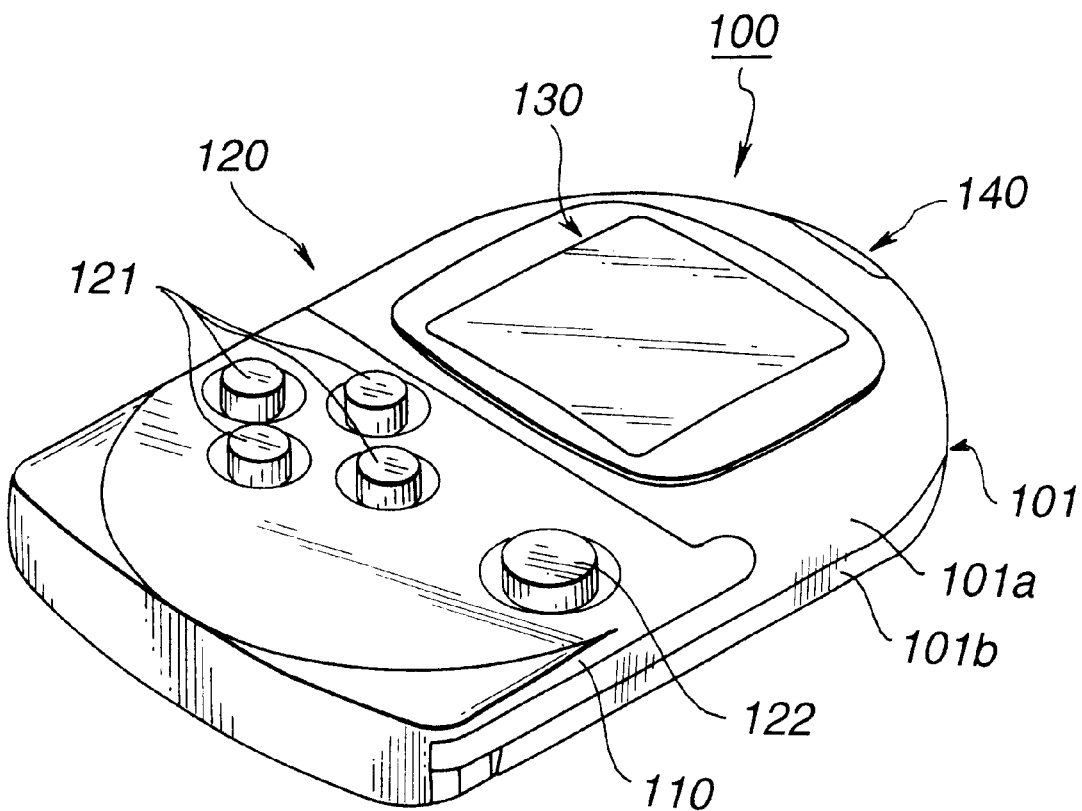
FIG. 6 is a perspective view of the portable electronic apparatus of FIG. 5.
Figure 7:
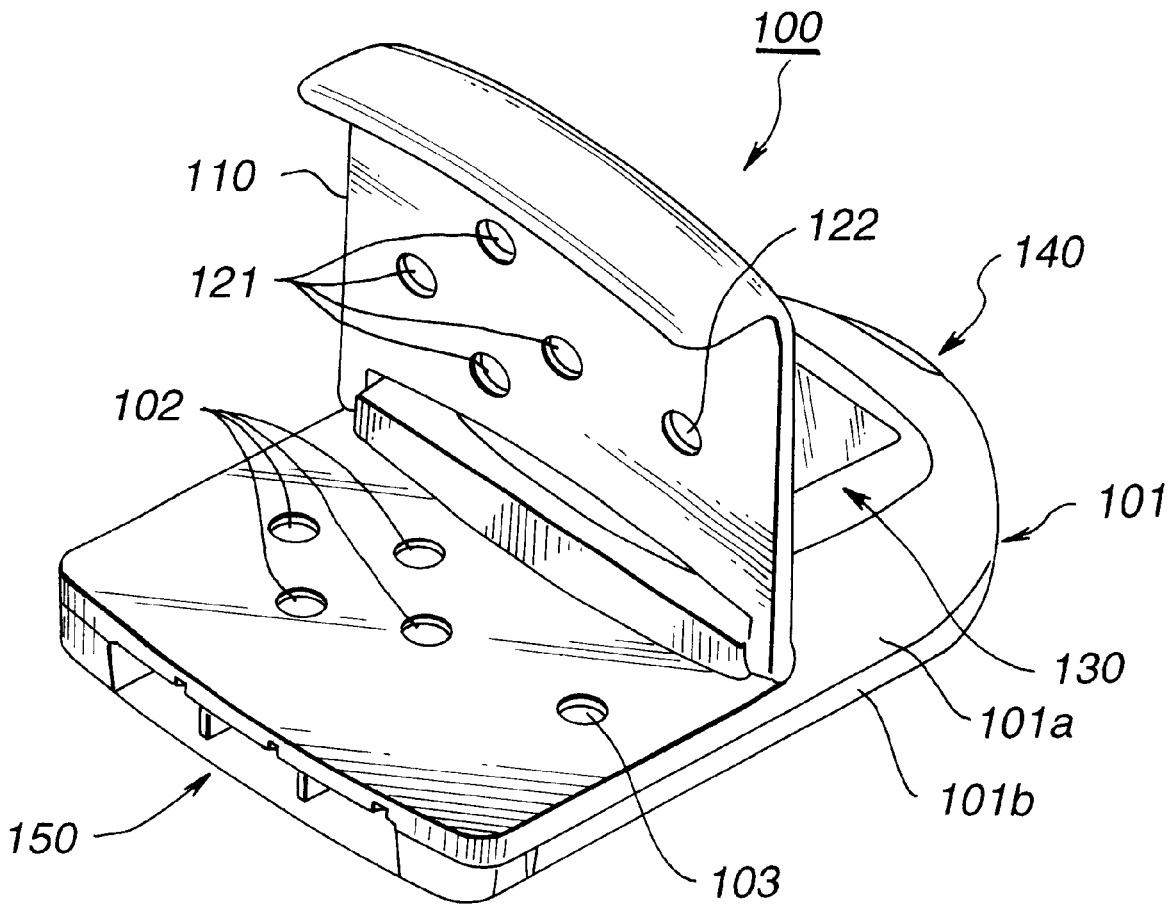
FIG. 7 is a perspective view showing the portable electronic apparatus of FIG. 5 with a lid thereof positioned in an open state.
Figure 8:
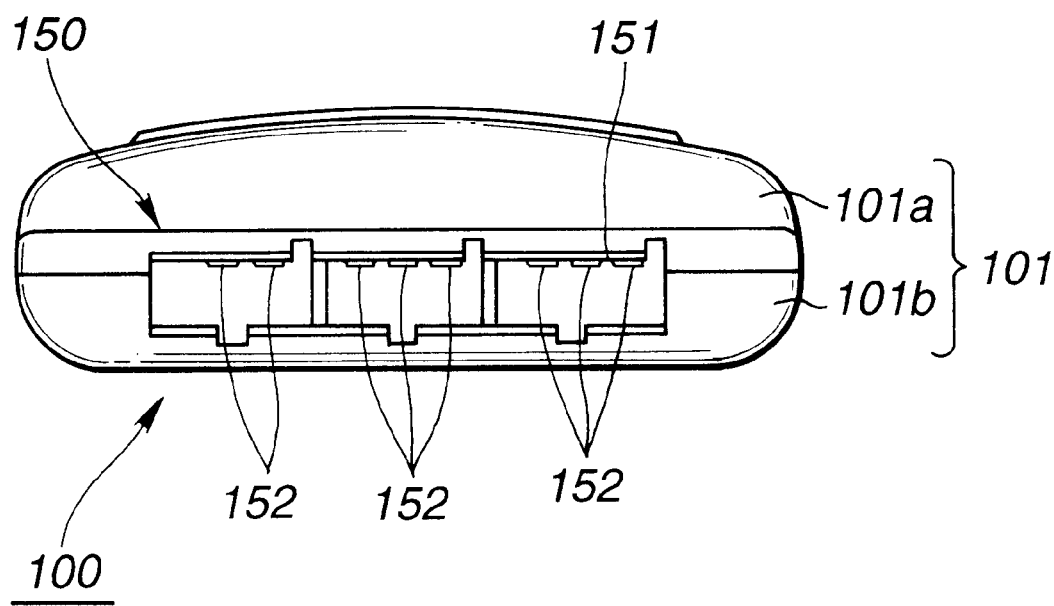
FIG. 8 is a bottom plan view of the portable electronic apparatus of FIG. 5.

FIGS. 5 to 8 are views of portable electronic device 100 constructed in accordance with a first, preferred embodiment of the invention. Specifically, FIG. 5 is a front side elevational view of the portable electronic device, FIG. 6 is a perspective view showing a cover member 110 in a closed state for protection of the connector portion of the portable electronic device, FIG. 7 is a perspective view showing cover member 100 in an open state, and FIG. 8 is a bottom plan view of the portable electronic device.

Referring to FIGS. 5 to 8, portable electronic device 100 includes a housing 101 as an outer enclosure, an actuation unit 120 having one or more actuator buttons 121, 122 for inputting information or making a selection by a user, a display unit 130, made up of liquid crystal devices (LCDs), and a window 140 for wireless communication, such as by IR communication.

Housing 101 is made up of an upper shell 101a and a lower shell 101b and holds a substrate 151 on which are mounted memory devices or the like. Housing 101 is dimensioned to be inserted into slots 7A or 7B of the main body portion of video game device 1 and includes a connector 150 formed with a rectangular window on one end thereof for insertion into the video game device.

Window 140 is provided on an opposite end portion of housing 101 from connector 150 and is provided with a generally hemispherical shape. Display unit 130 is provided in the vicinity of the window 140 on an upper surface of housing 101, occupying approximately one half of the area of the upper surface of housing. Actuator 120 is also provided on the upper surface of the housing 101, is dimensioned to occupy substantially the remaining half of the area of the upper surface, and is positioned in the vicinity of connector 150. Actuator 120 is located within lid member 110, which is rotatably supported relative to housing 101. Lid member 110 has one or more actuator buttons 121, 122 formed therein. Switch elements 102, 103 are provided below lid member 110 on the housing 101 at positions corresponding to and in registration with actuator buttons 121, 122, respectively. The actuator buttons are arranged to traverse the lid member and are supported by the lid member so as to be movable in a direction emerging from and receding below the upper surface of the lid member, allowing a force to be translated therethrough.

Switch elements 102, 103 are supported on housing 101, and are positioned to translate a force received thereby, to a respective diaphragm switch associated therewith, provided on substrate 151 in housing 101. When lid member 110 is closed, if a force is 110 applied to actuator buttons 121, 122 from above so as to force actuator buttons 121, 122 below the upper surface of lid member 110, the actuator buttons translate this force to the associated diaphragm switch on substrate 151 in the housing via associated switch elements 102, 103. It is noted that a flexible protective sheet can be bonded to the switch elements 102, 103 so that a force may be applied directly thereto by a hand or finger from above the protective sheet without the interposition of the actuators 121, 122, while contaminants such as dust and dirt are prevented from entering the inside of housing 101.

As is further shown in FIG. 8, a plurality of terminals 152 are provided within the window of connector 150 and are arranged on substrate 151. Terminals 152 supply power to, and provide for data transfer between portable electronic device 100 and video game device 1. The shape and size of connector 150 is the same as that of memory card 10 conventionally used with the video game device.

Figure 9B:
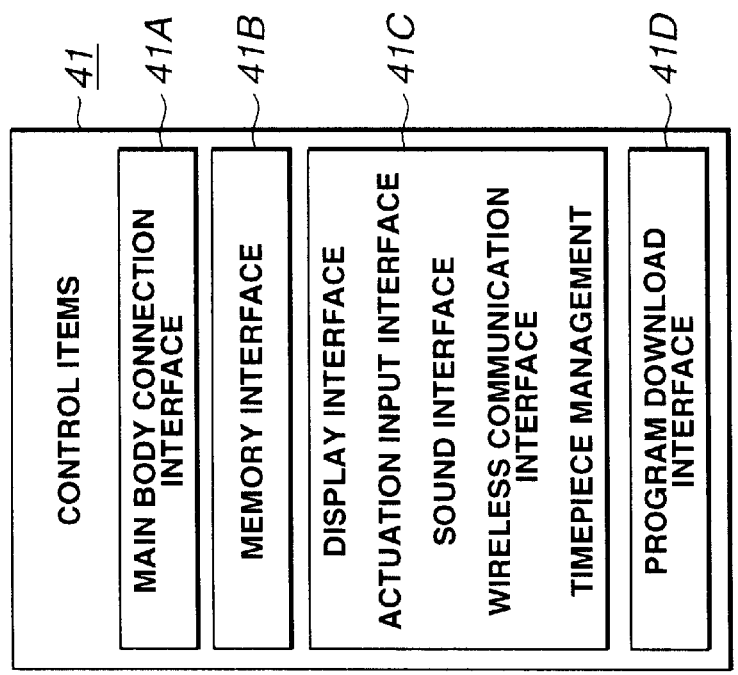
FIG. 9B is a block diagram showing an illustrative structure of the microcomputer controller of FIG. 9A.
Figure 9A:
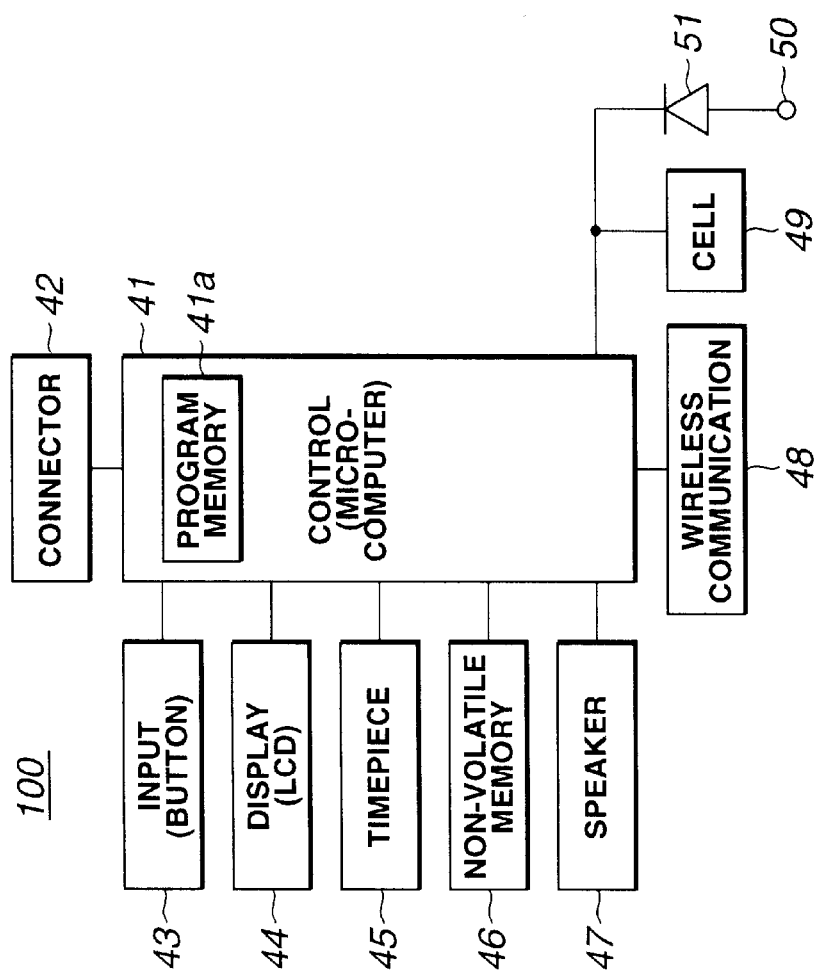
FIG. 9A is a block diagram showing an illustrative structure of essential portions of the portable electronic apparatus of FIG. 5.

FIG. 9A is a block diagram showing an illustrative structure of portable electronic device 100. Similar to the conventional memory card, the portable electronic device includes a control unit 41 for controlling the operation thereof, a connector 42 for connection to video game apparatus 1 and a non-volatile memory 46 for storing data Control unit 41 comprises a micro-computer and has a program memory 41a therein for storing a program. Non-volatile memory 46 preferably is a semiconductor memory device, such as a flash memory. The portable electronic device is provided with an electric battery, or other charge-storing cell 49. Thus, a static random access memory (SRAM) capable of fast data input/output, may be provided as non-volatile memory 46.

Portable electronic device 100 differs from conventional memory card 10 in that it includes an actuation unit 43 corresponding to actuator buttons 121, 122 for actuating and processing a stored program. Portable electronic device 100 further includes a display unit 44, such as a liquid crystal display device (LCD) for displaying a variety of information items responsive to the program being processed, a wireless communication unit 48 for exchanging data with another portable electronic device via infrared (IR) communication, by way of example. The portable electronic device can be operated under the power of battery 49 by itself when the device is removed from slots 7A and 7B of video game device 1. A rechargeable secondary cell may also be provided in place of battery 49. When portable electronic device 100 is inserted into slots 7A or 7B of video game device 1, power is supplied from video game device to the portable electronic device through a power source terminal 50 from the video game device via a reverse flow inhibiting diode 51 connected to a terminal of battery 49. The portable electronic device also includes a timepiece 45, and a speaker 47 for outputting audio sound in accordance with the program being executed. Each of the components of portable electronic device 100 is connected to control unit 41 and has its operation controlled thereby.

FIG. 9B shows internal elements included in control unit 41. While a conventional memory card includes only a connection interface 41A for connection to the main body portion of a video game device and a memory interface 41B for control of the input(output of data to the memory, portable electronic device 100 includes those interfaces and additionally includes a display interface, an actuation input interface, a sound interface, a wireless communication interface, a timepiece management interface 41C and a program downloading interface 41D. The interfaces (drivers) for managing the additional functions of portable electronic device 100 in the present embodiment are controlled by control unit 41 (micro-computer), independently of the main body connection interface and the memory interface and, therefore, interchangeability between conventional memory card 10 and the portable electronic device 100 may be maintained. Since the portable electronic device is formed with an input actuator unit 43 and a display unit 44, the portable electronic device can be used as a portable game playing machine by running game application software when disengaged from video game device 1. Moreover, since portable electronic device 100 may store in program memory 41a an application program downloaded from the main body portion of video game device 1, the application program or any of the driver software running on the portable electronic device can be easily modified.

The operation of portable electronic device 100 can be controlled independently of video game device 1, and the application software stored in program memory 41a can be formulated and executed independently of the application software of the video game device. By exchanging data with the video game device, a cooperating operation (linking) may be achieved between the portable electronic device and the video game device. Also, timepiece 45 permits synchronization of the time data of the portable electronic device and the video game device and also allows independent control of the progress of an independently executed game on the portable electronic device in real-time.

Figure 10:
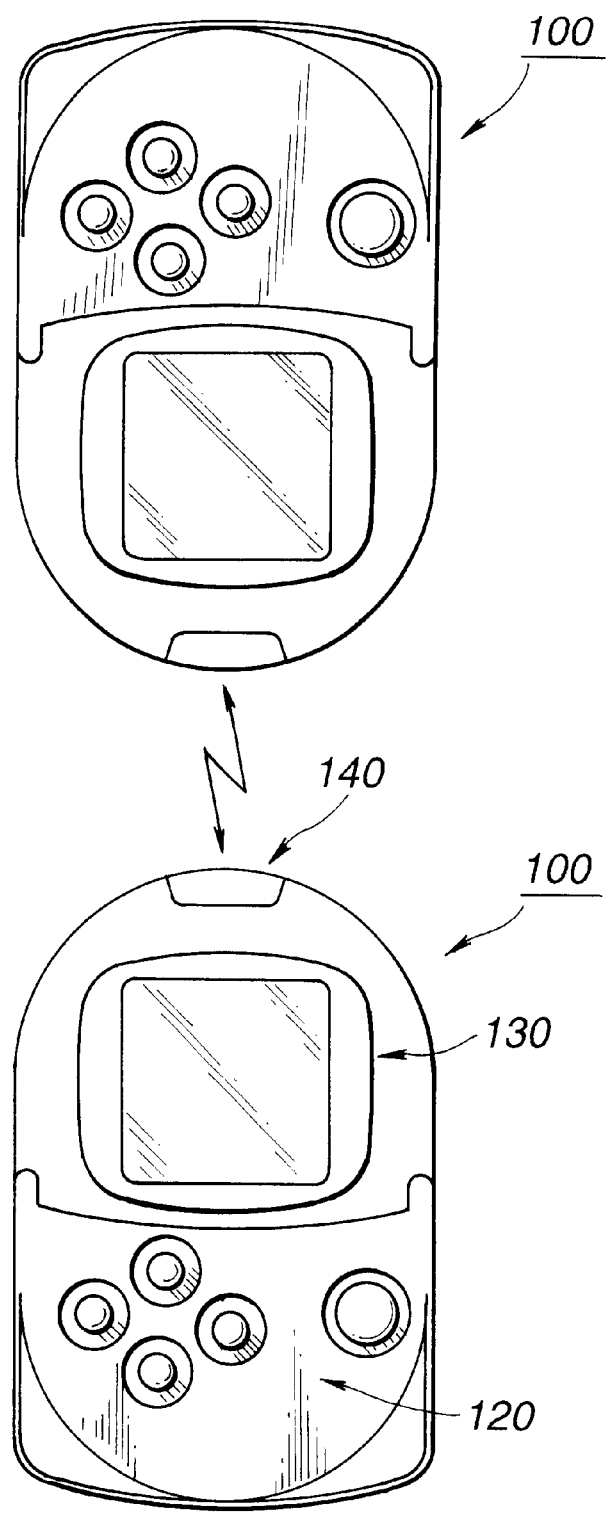
FIG. 10 illustrates a wireless communication function of the portable electronic apparatus of FIG. 5.

FIG. 10 schematically illustrates wireless communication between two portable electronic devices 100 in accordance with the invention. Data stored in the portable electronic device, either from video game device 1 or from another portable electronic device 100, can be exchanged between two or more such devices via wireless communication window 140 such as by IR communication under the control of wireless communication unit 48.

Although portable electronic apparatus 100 has been described as being used as an auxiliary storage apparatus for video game device, the invention is not limited to the video game device and may be used as auxiliary storage, or for retrieving a variety of information in any number of apparatuses.

Figure 11:
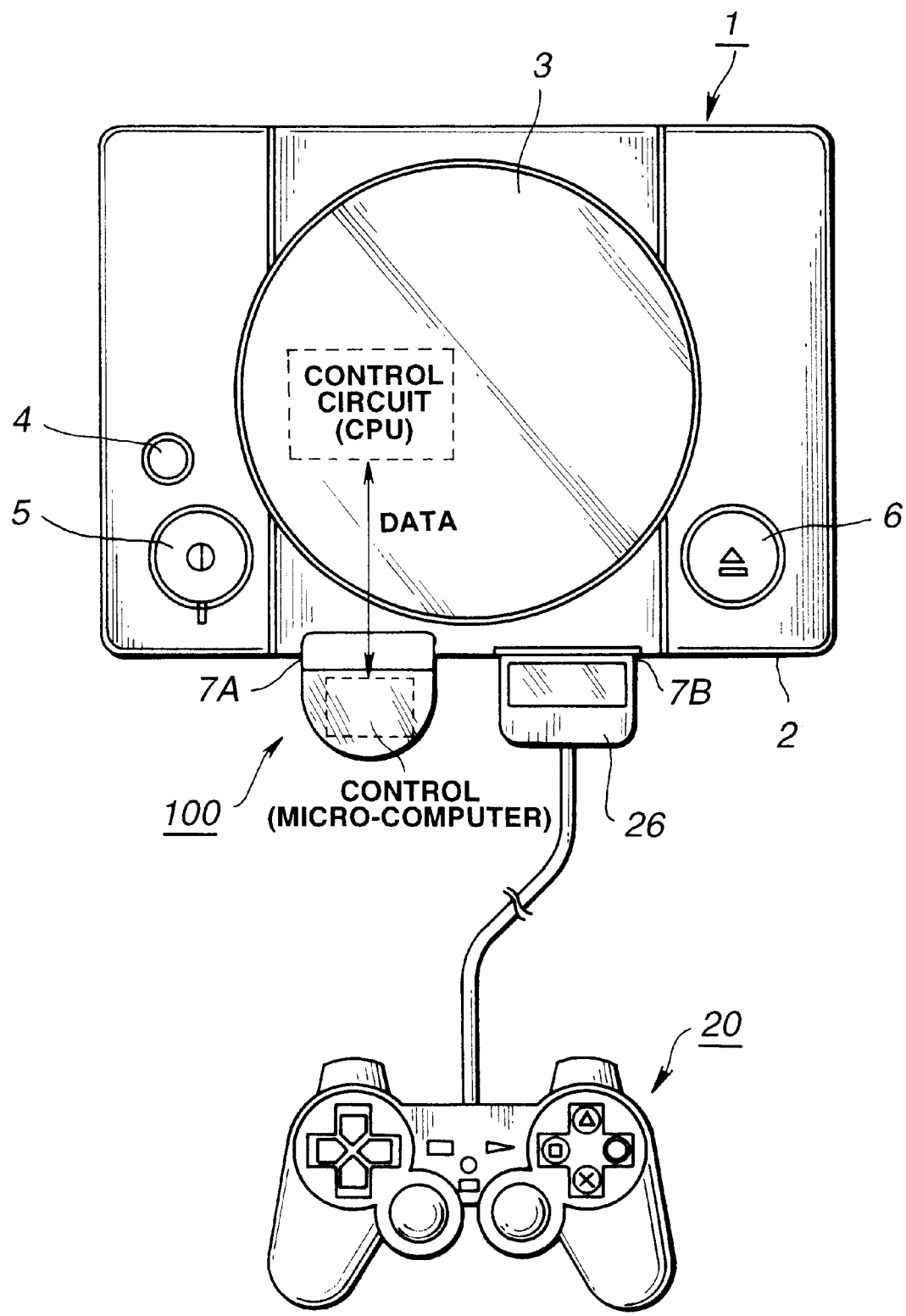
FIG. 11 illustrates cooperative operation between the portable electronic apparatus of FIG. 5 and a main body portion of the video game device of FIG. 1.

The cooperative operation between portable electronic device 100 and video game device 1 will now be explained. The portable electronic device can store game data generated by micro-computer control circuit 41 and used to control the portable electronic device, time data obtained by timepiece 45, and data generated by other portable electronic devices supplied via wireless communication unit 48. FIG. 11 schematically shows the cooperative operation between video game device 1, acting as a master device, and portable electronic device 100, acting as a slave device. In the following description, it is assumed that a recording medium, such as an optical disc (CD-ROM), having application software recorded thereon is loaded into the video game device, and that such software is read out therefrom and downloaded onto the portable electronic device inserted into slot 7A or 7B of the main body portion of video game device.

Figure 12:
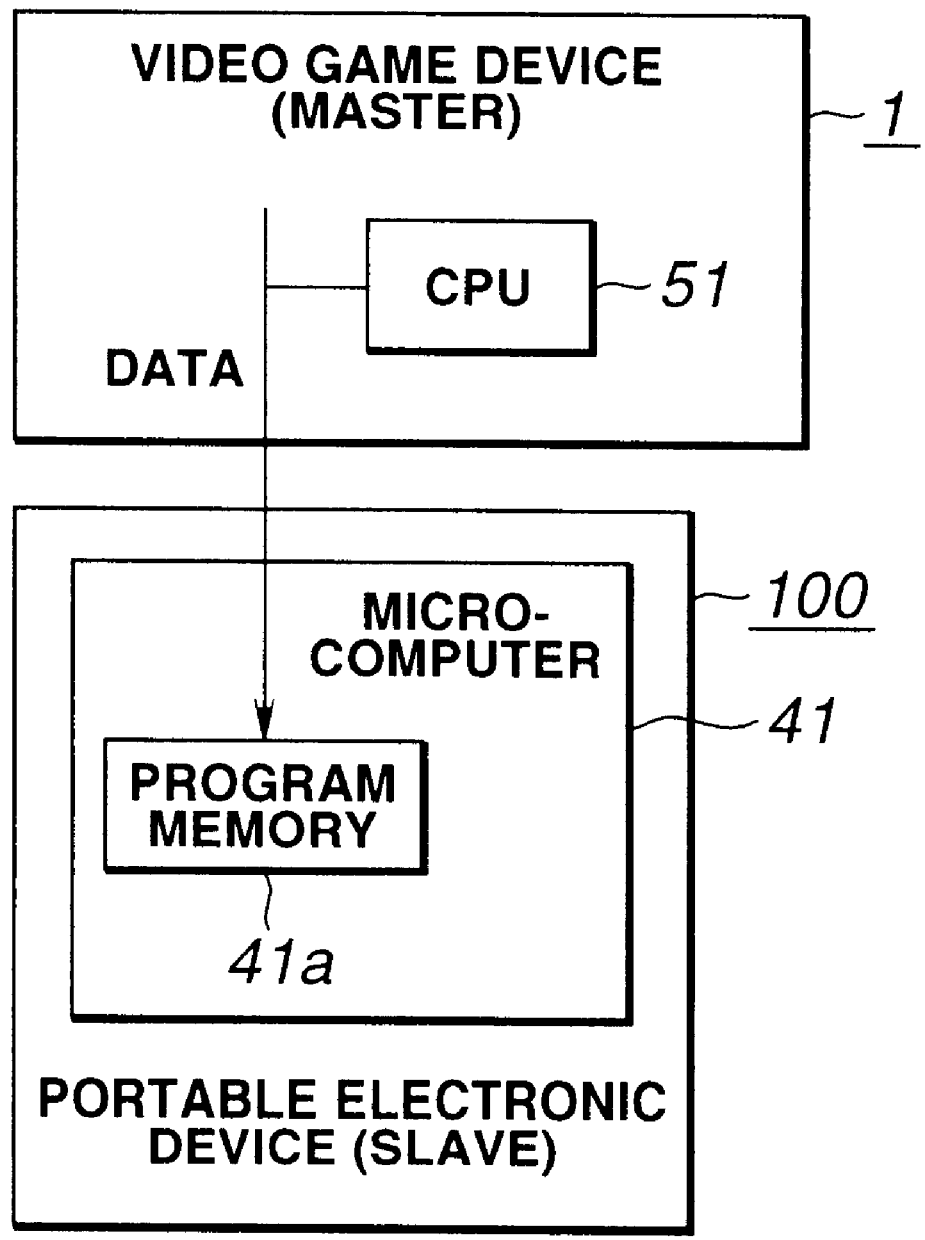
FIG. 12 is a block diagram showing the flow of program data downloaded from the main body portion of the video game device of FIG. 1 to the portable electronic apparatus of FIG. 5.

First, before proceeding to the detailed description of the cooperative operation, program downloading, as a presupposition for this cooperative operation, is explained. FIG. 12 shows the data flow of an application program of a video game furnished from the optical disc (CD-ROM) loaded in video game device 1 and transferred Directly (downloaded) to program memory 41a of micro-computer 41 of portable electronic device 100. This download is controlled by CPU 51 of video game device 1.

Figure 13:
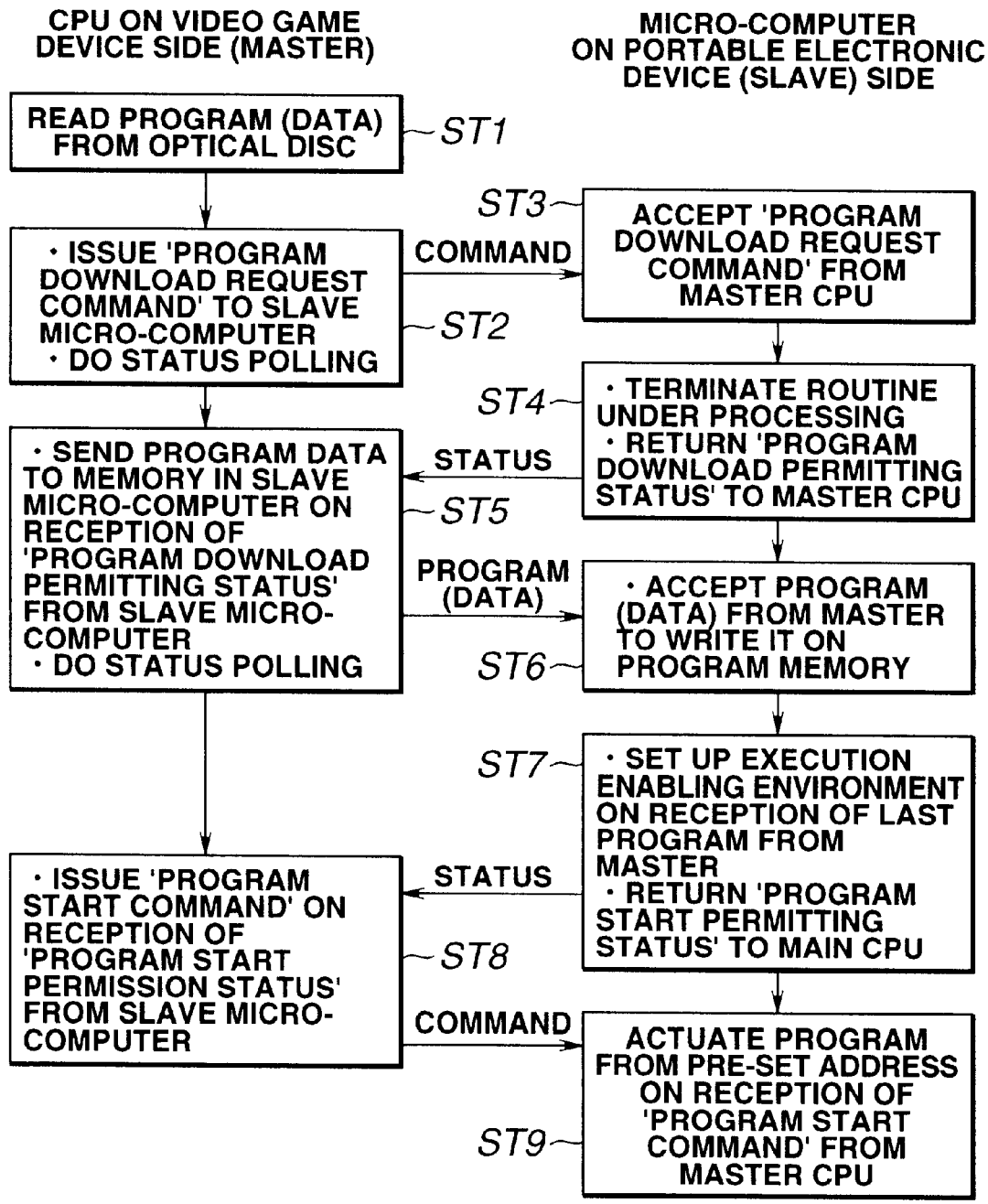
FIG. 13 is a block diagram showing the downloading sequence of FIG. 12.

FIG. 13 shows the sequence of steps performed during the downloading procedure of FIG. 12. First, at step ST1, an application program of a video game to be run on micro-computer 41 in portable electronic device 100, acting as a slave device, is read out from the CD-ROM loaded in video game device 1, acting as the master device.

Then, at step ST2, CPU 51, acting as a control unit for the master device, issues a "program downloading request command" to micro-computer 41, acting as a control nit for portable electronic device 100. CPU 51 then proceeds to a polling step, waiting to receive a "program download permission status" from micro-computer 41.

At step ST3, micro-computer 41 of portable electronic device 100 receives the "program downloading request command" from CPU 51 of the master device.

At step ST4, micro-computer 41 of the slave device terminates the routine currently being executed thereby and returns a "program download permission status" indication to CPU 51 of the master device.

Then, when CPU 51 receives the "program download permission status" from the micro-computer 41, the program read out from the CD-ROM at step ST1 is transferred (downloaded) at step ST5 to program memory 41a of portable electronic device 100. CPU 51 then proceeds to polling for receiving a "program start permission status" from micro-computer 41. The address in program memory 41a to which the downloaded data is written is managed by micro-computer 41; and although it is assumed in the above description that the program downloaded from the master device is stored in program memory 41a of micro-computer 41, the downloaded program may also (or as an alternative) be stored in a storage device, such as SRAM or the like maintained within portable electronic device 100, capable of high-speed data input/output.

At step ST6, micro-computer 41 of the portable electronic device receives the program data transferred from the master device and writes the received program data to program memory 41a.

At step ST7, after micro-computer 41 receives the last of the program data from the master device, and is ready to execute the program data, a "program start permission status" signal is returned to CPU 51 of the master device.

At step ST8, CPU 51 of the master device receives the "program start permission status" signal from micro-computer 41 and issues a "program start command". On reception of the "program start command" at step ST9, micro-computer 41 runs the downloaded program from a predetermined address of memory 41a.

By this sequence of operations, an application program is directly transferred (downloaded) from video game device I to program memory 41a in micro-computer 41 in portable electronic device 100. It is noted that the method for supplying the application program is not limited to the recording medium such as an optical disc and may also be supplied over a communication network or from other non-volatile storage. In that case, only the step ST1 in the above sequence need be changed.

Figure 14:
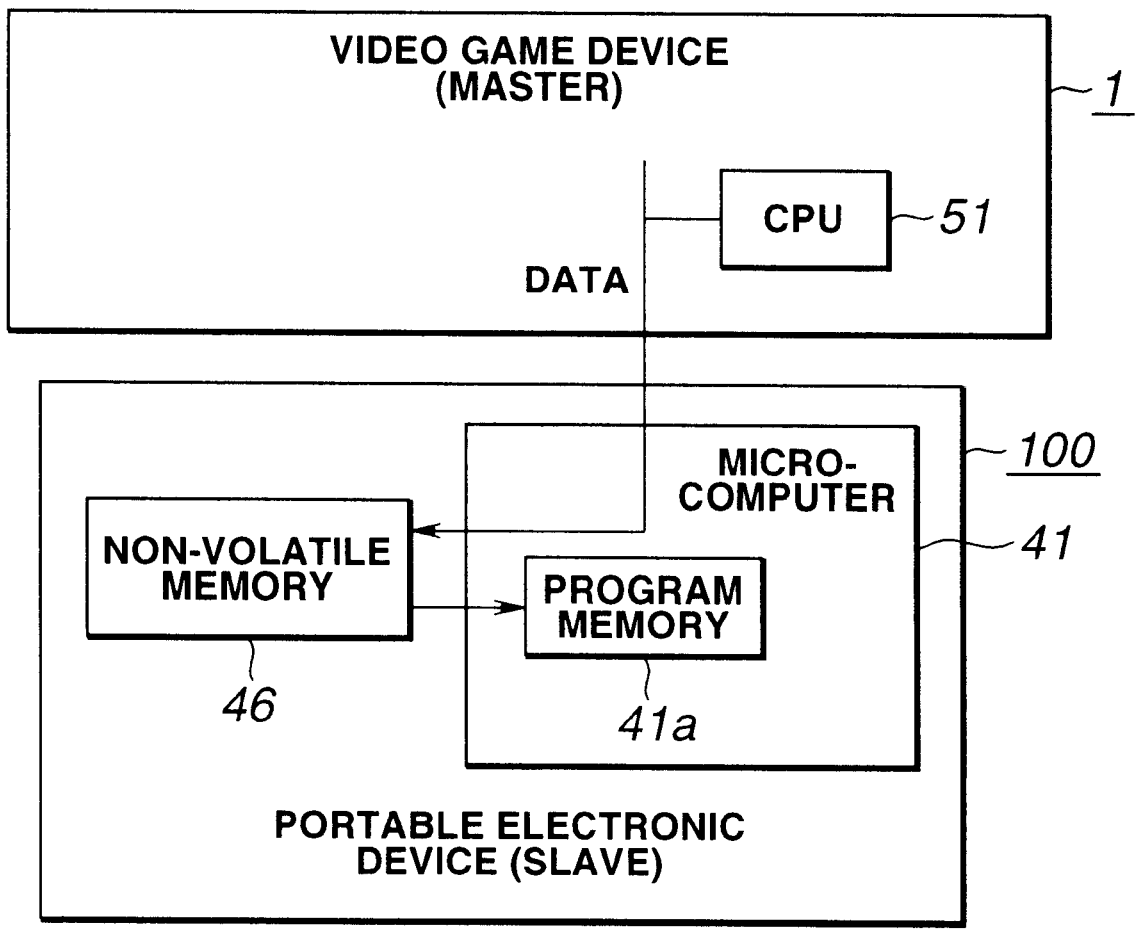
FIG. 14 is a block diagram showing an alternative flow of program data downloaded from the main body portion of the video game device of FIG. 1 to the portable electronic apparatus of FIG. 5.
Figure 15:
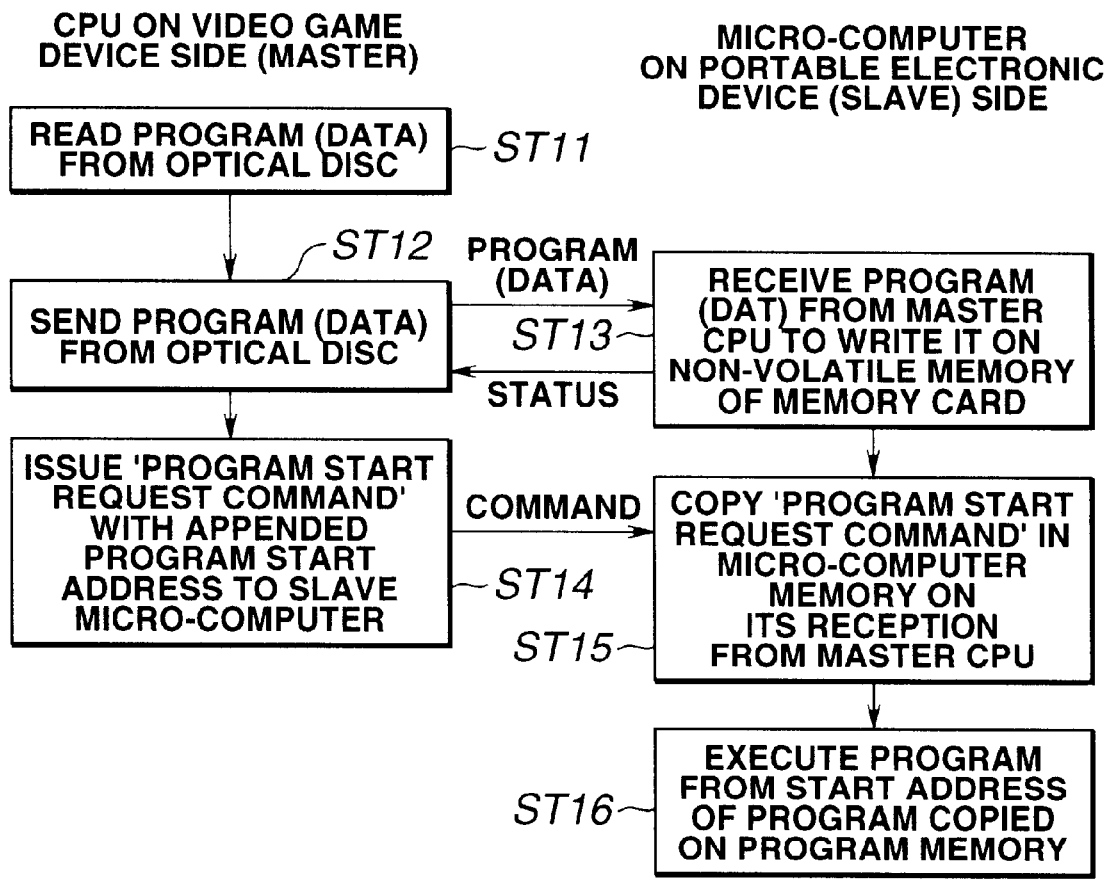
FIG. 15 is a block diagram showing the downloading sequence of FIG. 14.
Figure 16A:
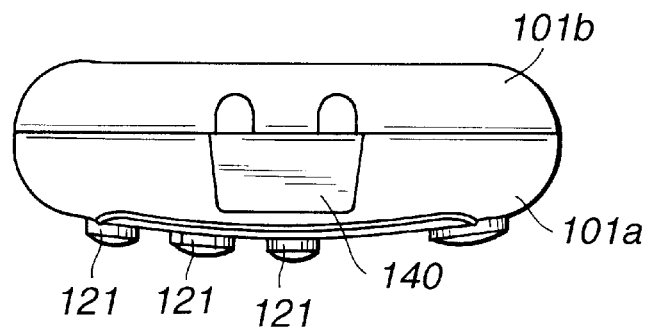
FIGS. 16A, 16B and 16C comprise a tri-plan view showing the top edge, face, and bottom edge of the portable electronic apparatus of FIG. 5.
Figure 16B:
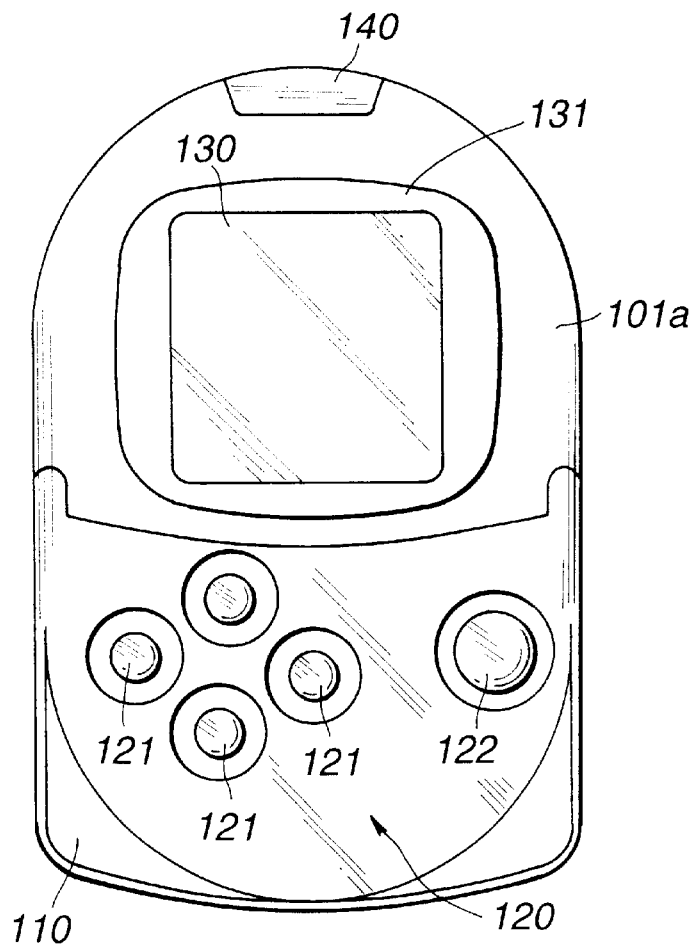
Figure 16C:
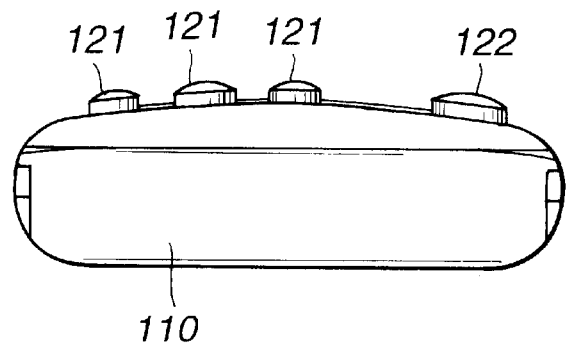
Figure 17:
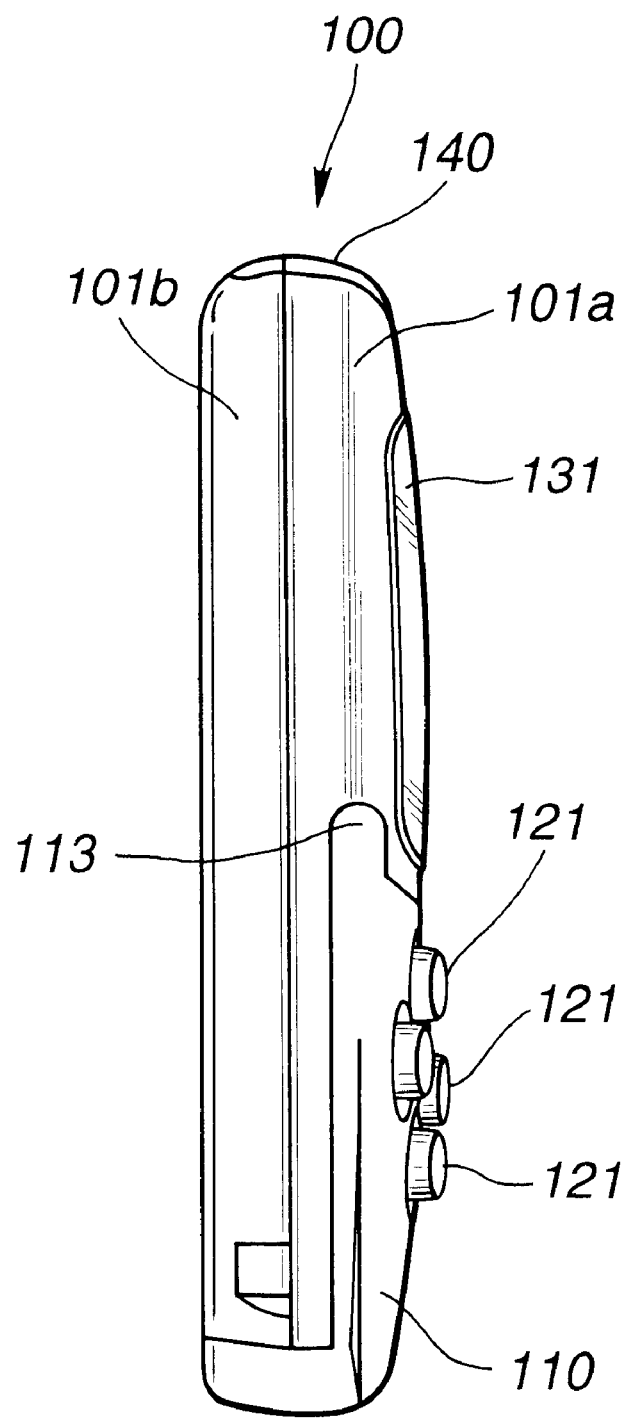
FIG. 17 is a right side elevational view of the portable electronic apparatus of FIG. 5.
Figure 18:
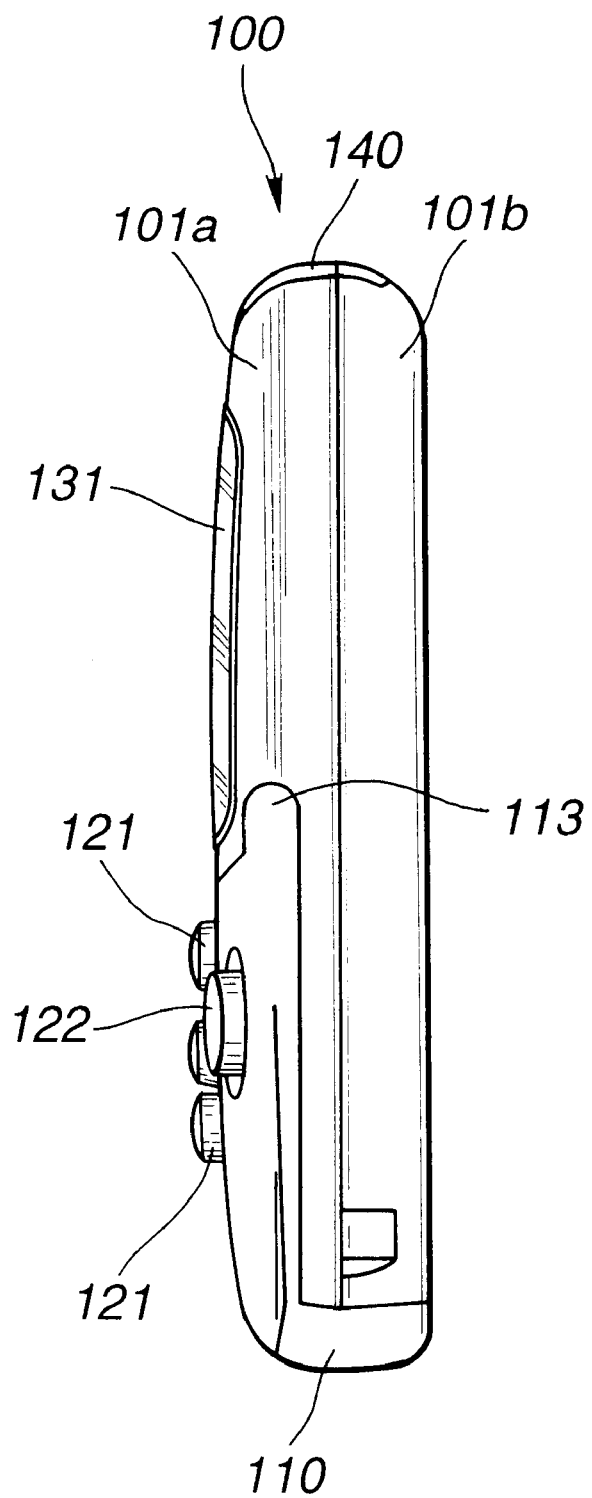
FIG. 18 is a left side elevational view of the portable electronic apparatus of FIG. 5.

While the above-described downloading sequence describes the case of directly downloading the application program from video game device 1 to program memory 41a in micro-computer 41, it is possible first to download the application program to non-volatile memory 46 of portable electronic device 100, and subsequently copy the program data to program memory 41a for execution. FIG. 14 shows the flow of data for this latter case. Specifically, the application program from video game device 1, furnished from e.g., an optical disc loaded in the disc loading unit 3, is transferred (downloaded) to non-volatile memory 46 of portable electronic device 100 via CPU 51, acting as the control unit of the video game device 1. The data is subsequently copied to program memory 41a of micro-computer 41 for execution. FIG. 15 shows this downloading sequence. At step ST11, the application program of the video game to be run on micro-computer 41 in the portable electronic device is read out as data from the CD-ROM loaded in the video game device 1.

At step ST12, CPU 51 transfers (downloads) the application program data read out from the CD-ROM to non-volatile memory 46 of the portable electronic device 100. This sequence is similar to data backup to a memory card in a conventional video game device. At step ST13, micro-computer 41, acting as the control unit for the portable electronic device, receives the application program transferred from CPU 51 in the same sequence as in conventional data backup, in order to write the received data in non-volatile memory 46.

Then, at step ST14, CPU 51 issues a "program start request command" with an appended program start address to micro-computer 41 of portable electronic device 100, which receives the "program start request command" from CPU 51 at step ST15 and in response, CPU 51 copies the commanded data to program memory 41a in microcomputer 41 from the program start address of non-volatile memory 46 in the "program start request command". At step ST16, micro-computer 41 of the portable electronic device executes from its start address the program copied in program memory 41a.

By the above sequence, the program of the application software is transferred (downloaded) as data via the non-volatile memory 46 from video game device 1 to program memory 41a of micro-computer 41 of portable electronic device 100 inserted into the video game device.

The application program downloaded from video game device 1 to portable electronic device 100 differs generally from that run on the video game device. Of course, the downloaded application program may be operated on both the video game device and the portable electronic device. However, in this case, the video game device runs in a mode in which it only uses those properties and features that are available on the portable electronic device.

Next, the cooperating operation in which the program of the application software downloaded from video game device 1 by the above-described sequence of operations is executed independently on portable electronic device 100. The results of such execution are exchanged (uploaded and downloaded) between the portable electronic device and the video game device. Here, by way of example, attribute data of a person or character appearing in a so-called roll playing game run on the video game device are downloaded to the portable electronic device, the attribute data including data specifying the growth state or other personal characteristics of the person or character. By executing the program on micro-computer 41 in portable electronic device 100, i.e. by playing the game thereon, this attribute data is changed independently of the program executed on video game device 1. Thus, the portable electronic device 100 of the present invention is designed to operate by itself without connection to video game device 1, and is small-sized and readily portable. A user (game player) can carry the portable electronic device and manipulate or change the attributes of the person or character appearing in the program executed thereon by playing the game; and the user can transfer (upload) to the video game device the attributes of the person or character that have been manipulated. In this case, the person or character whose attributes have been changed can be retrieved and operated in the program run on video game device 1. Of course, in addition to role playing games, any other type of game may be downloaded from the video game device to the portable electronic device, played by a user, and the results thereof then may be loaded back to the video game device, as desired.

As described above, a video game can be constructed in which the cooperating operation can be performed by both video game device 1 as the master device, and portable electronic device 100 as the slave device, in which both can use the attribute data of, for example, a person appearing in the game to affect mutually the attribute data.

Portable electronic device 100 is formed with a terminal 152 in housing 101 providing an electrical connection with an external device such as video game device 1. Terminal 152 is covered and protected by a lid 110, and is exposed to the outside of housing 101 via a connector 150 which is a through-hole provided in the housing. FIGS. 16a to 16c and FIGS. 17–19 show a top plan view, a front elevational view, a bottom plan view, left and right side elevational views, and a back elevational view, respectively, of the portable electronic device. Lid 110 is supported so as to be pivotable, or rotatable, between a first closed position, that covers terminal 152 and a second, opened position in which terminal 152 is exposed. Specifically, lid 110 is formed with a pair of laterally spaced arms 113, 113 which carry a pair of facing stubs 111, 112 adapted to be fitted in a pair of supporting holes 107, 107 laterally provided on the mid surface of housing 101 to rotatably support the lid, as shown in FIG. 20.

Figure 29:
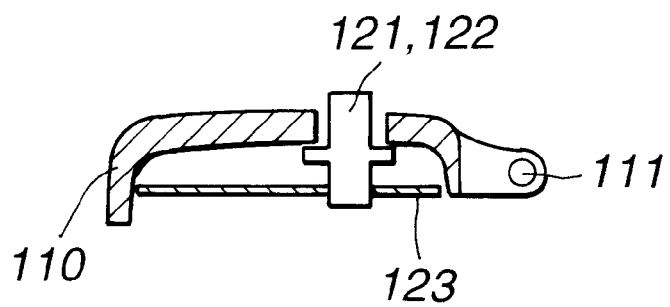
FIG. 29 is a cross-sectional view showing the structure of an actuator and actuator button positioned on the lid of the portable electronic apparatus of FIG. 5.
Figure 30:
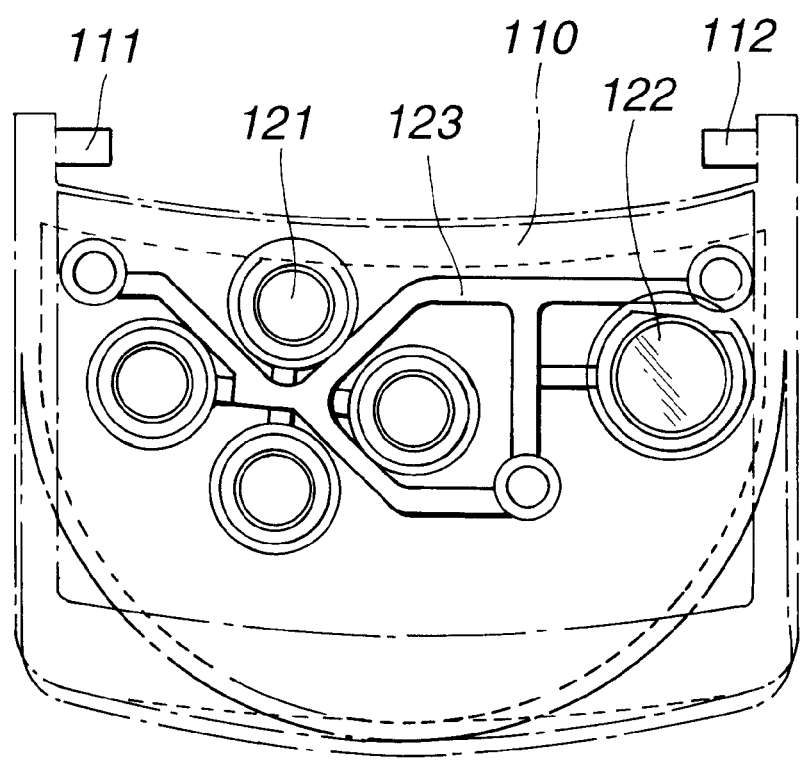
FIG. 30 is a front elevational view showing the structure of an actuator positioned on the lid of the portable electronic apparatus of FIG. 5.
Figure 31:
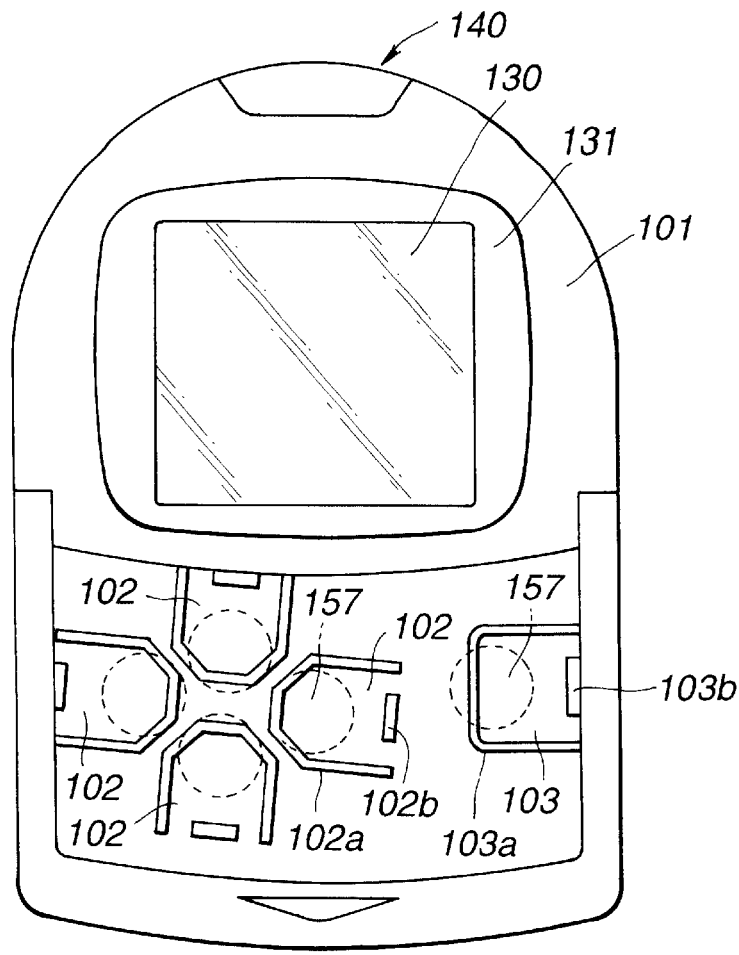
FIG. 31 is a front elevational view showing an alternative embodiment of the structure of an actuator of the portable electronic apparatus of FIG. 5.
Figure 32:
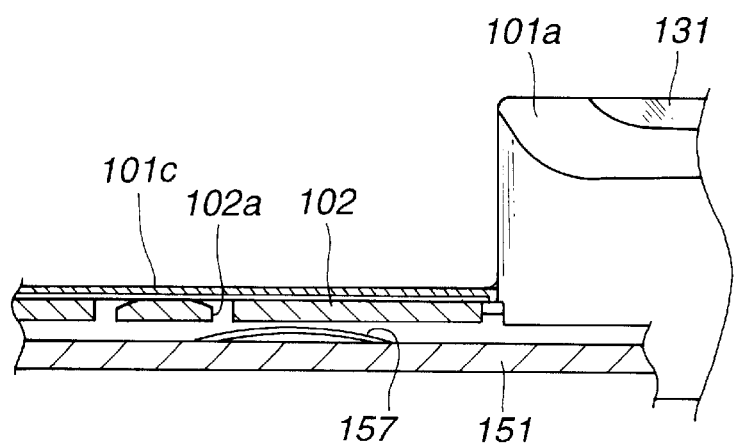
FIG. 32 is a cross-sectional view showing yet another alternative embodiment of the structure of an actuator of the portable electronic apparatus of FIG. 5.

As described previously, housing 101 is formed with actuator buttons 121, 122 which are positioned in registration with switch elements 102, 103 which translate motion to respective diaphragm switches 157 provided on substrate 151, as shown in FIG. 32. As is further shown in FIG. 29, actuator buttons 121, 122 pass through lid 110 and are in registration with switch elements 102, 103 when the lid is closed. When lid 110 is in its closed state, the actuator buttons translate force to diaphragm switches 157. Switch elements 102, 103 may be formed as members separate from and movable relative to housing 101, or may be formed as a portion of an outer portion of housing 101. In the latter case, the portion of the housing delimited by U-shaped cut-outs 102a, 103a (FIG. 31) formed in the outer portion of housing 101 serve as switch elements. The proximal ends of these switch elements have slits 102b, 103b to permit elastic deformation thereof relative to housing 101. On the upper surface of switch elements 102, 103 is fixed a flexible protective sheet 101c (FIG. 32). By bonding the protective sheet to the switch elements, the switch elements can be directly pressed through the protective sheet by hand or finger without the need for actuator buttons 121, 122. Dust and dirt are thus prevented from entering the inside of housing 101 via an actuator button.

Figure 20:
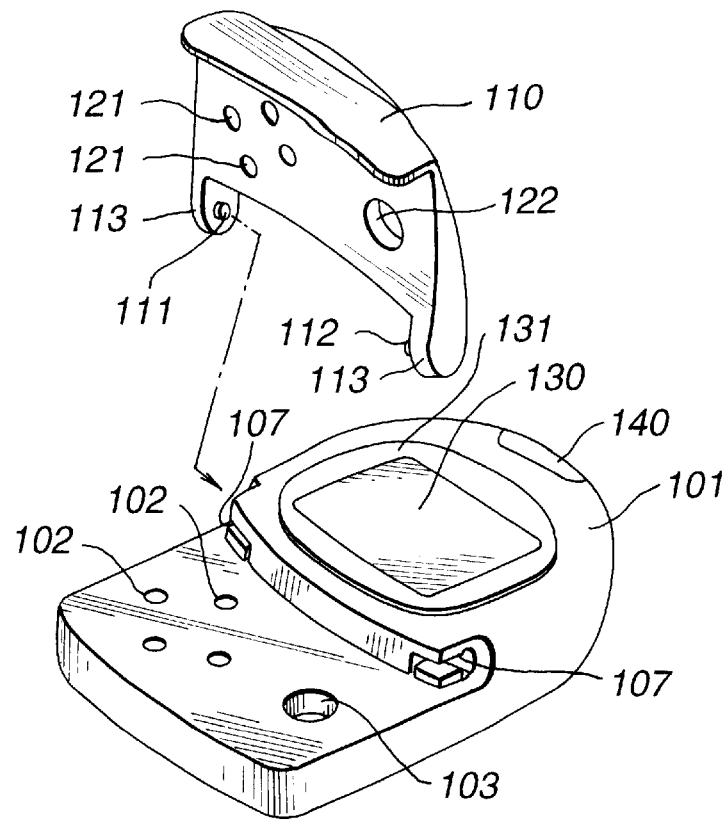
FIG. 20 is a perspective view of the portable electronic apparatus of FIG. 5 with a lid thereof removed.
Figure 21:
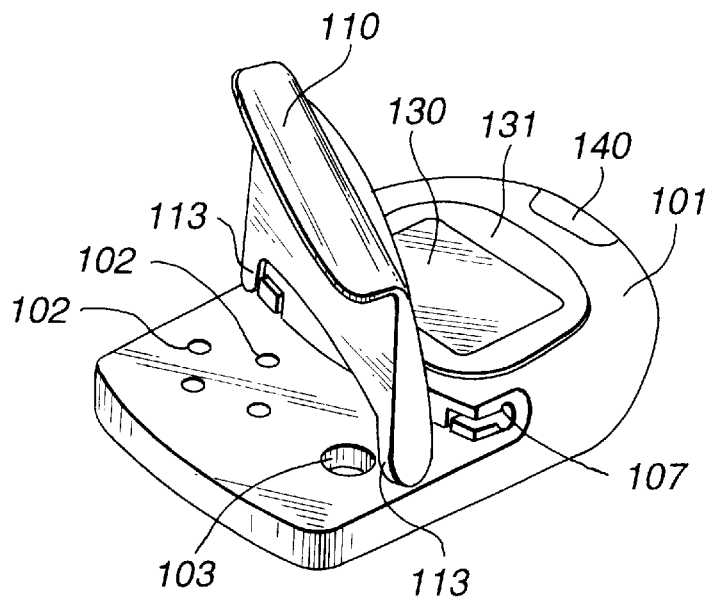
FIG. 21 is a perspective view of the portable electronic apparatus of FIG. 5 showing the lid being removed.
Figure 22:
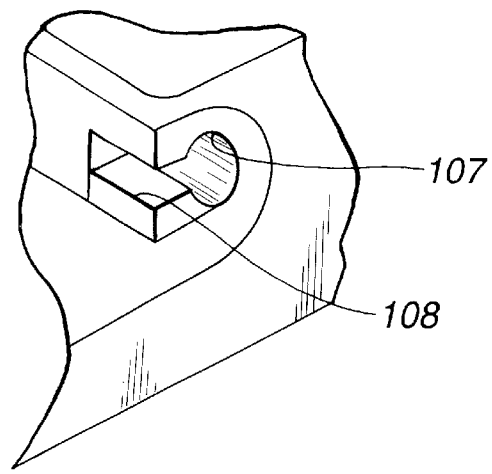
FIG. 22 is a perspective view showing the structure of a portion of the portable electronic apparatus of FIG. 5 for supporting the lid.
Figure 23:
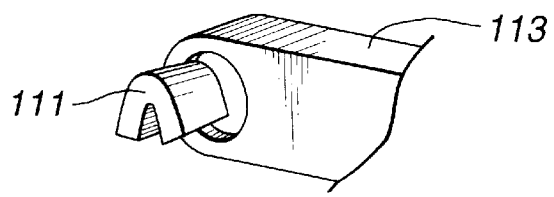
FIG. 23 is a perspective view showing a supporting shaft of the lid.
Figure 24:
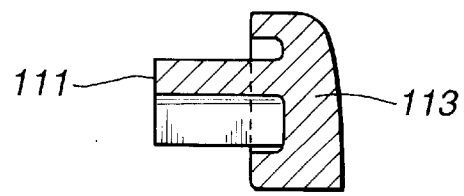
FIG. 24 is a cross-sectional view showing the supporting shaft of the lid.
Figure 25:
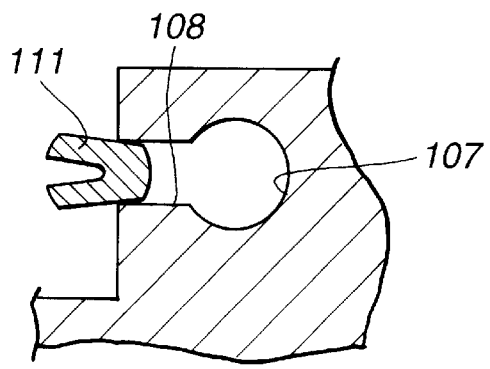
FIG. 25 is a cross-sectional view showing the supporting portion of the lid being positioned to be mounted in the supporting portion of the portable electronic apparatus of FIG. 5.
Figure 26:
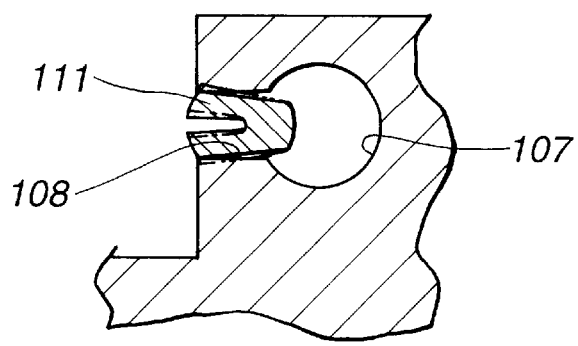
FIG. 26 is a cross-sectional view showing the supporting portion of the lid being mounted in the supporting portion of the portable electronic apparatus of FIG. 5.
Figure 27:
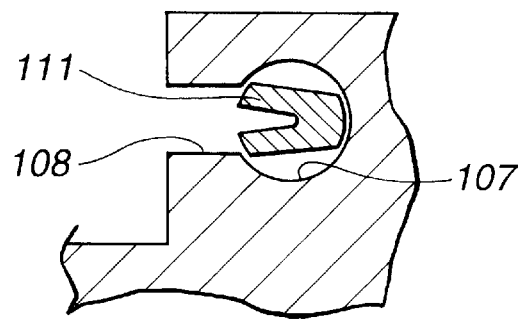
FIG. 27 is a cross-sectional view showing the supporting portion of the lid after being mounted in the supporting portion of the portable electronic apparatus of FIG. 5.
Figure 28:
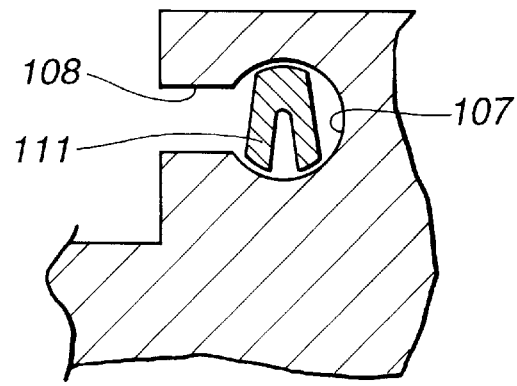
FIG. 28 is a cross-sectional view showing the supporting portion of the lid when the lid of the portable electronic apparatus of FIG. 5 is closed.

Housing 101 is designed so that even when lid 110 is opened that portion of the housing which includes connector 150 may be fitted into slots 7A or 7B of video game device 1 so that terminal 152 of the portable electronic device can be connected to the video game device, as shown in FIG. 3. Referring to FIGS. 20 and 21, lid 110 is removably mounted on housing 101. At least one of the supporting stubs 111, 112 of lid 110 can be reduced elastically in diameter by being formed with opened hollow portions in the distal and peripheral portions thereof, as shown in FIGS. 22 through 24. Housing 101 is formed with a groove 108 extending from a supporting hole 107 into which supporting stub 111 (or 112) is fit. The supporting stub passes through groove 108 when its diameter is reduced, thereby allowing lid 110 to be selectively mounted on or dismounted from the housing 101.

As shown in FIGS. 25 through 28, only when lid 110 is opened can supporting stub 111 pass through groove 108. If lid 110 is closed, the direction along which the supporting stub 111 can be reduced in diameter is perpendicular to the width-wise direction of the groove and, therefore, the supporting stub cannot pass through the groove.

Figure 33:
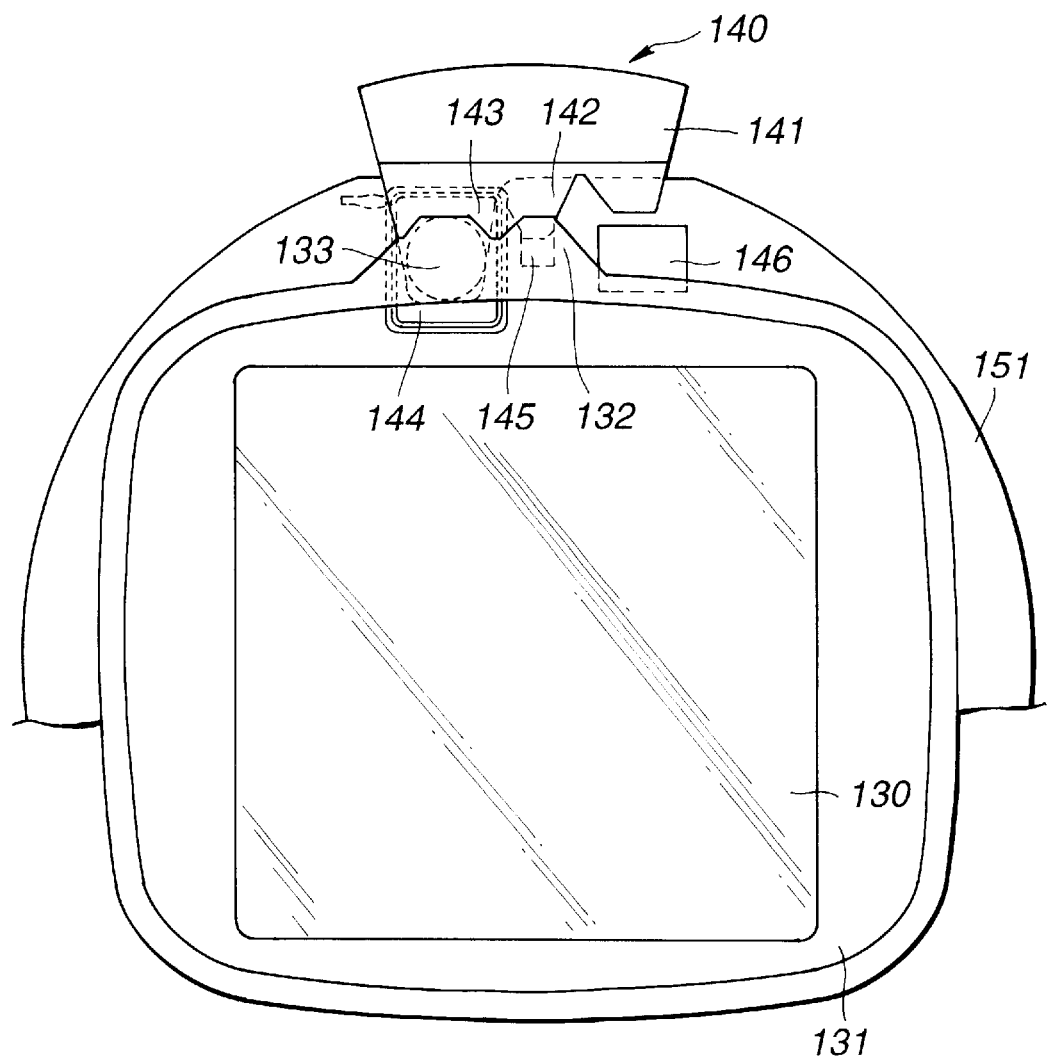
FIG. 33 is a front elevational view showing the structure of an infrared (IR) light transmitting/receiving unit of the portable electronic apparatus of FIG. 5.

Portable electronic device 100 includes an optical system for transmitting light from a source (LED) 145, for transmitting IR light from an IR light source 146, and for directing received IR light to a light receiving device 144. The optical system includes a prism 141 disposed adjacent window 140 and having respective projections 142 and 143 for transmitting display light out of device 100 and for receiving IR light directed to device 100, as shown in FIG. 33. This optical system includes a transparent protective plate 131 for protecting display 130 which, as described above, faces the outside of housing 101. Display 130 preferably is formed of a liquid crystal device (LCD). Transparent protective plate 131 is formed of transparent material, such as acryl; and prism 141 also is formed of transparent material, such as acryl.

IR light source 146 is positioned on substrate 151 within housing 101. Light source (LED) 145, which is referred to as a display light source for emitting visible light to be used with display 130, also is positioned on substrate 151 within the housing, as is light receiving device 144. IR light source 146, display light source 145 and light receiving device 144 are arrayed substantially on a straight line, as shown in FIG. 33.

Figure 34:
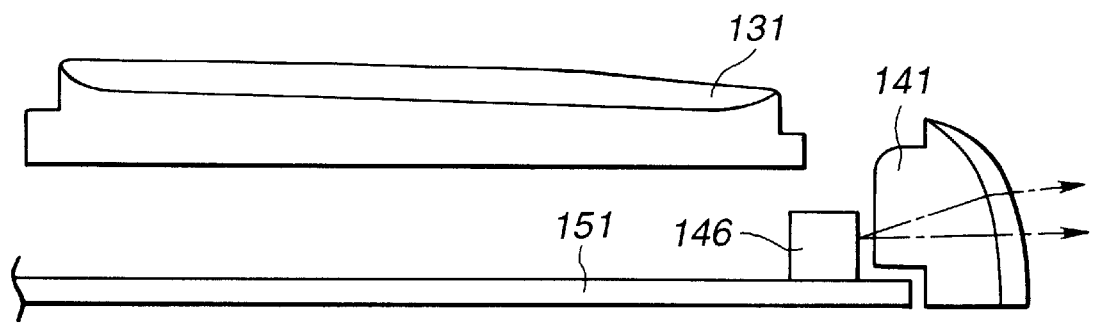
FIG. 34 is a cross-sectional view showing the structure of the IR light transmitting/receiving unit of FIG. 33.
Figure 35:
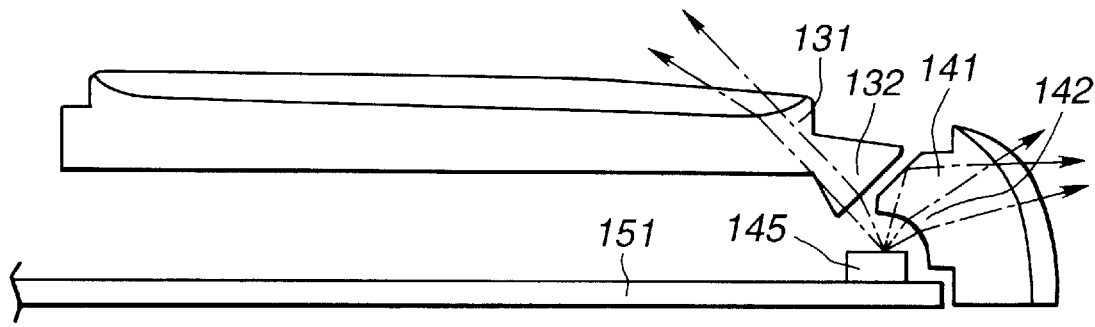
FIG. 35 is a cross-sectional view showing the structure of a visible light emitting unit of the portable electronic apparatus of FIG. 5.

Prism 141 directs IR light emitted by IR light source 146 towards window 140, from which the IR light is transmitted and projected out of housing 101 as is shown in FIG. 34. Projection 142 of the prism reflects the visible light emitted by the display light source 145 to window 140 as is shown in, FIG. 35. This visible light from display light source 145 also is transmitted by projection 132 of transparent protective plate 131 to be projected outwardly from display 130. It is appreciated that window 140 projects not only the IR light emitted by IR light source 146 but also the visible light emitted by display light source 145.

Figure 36:
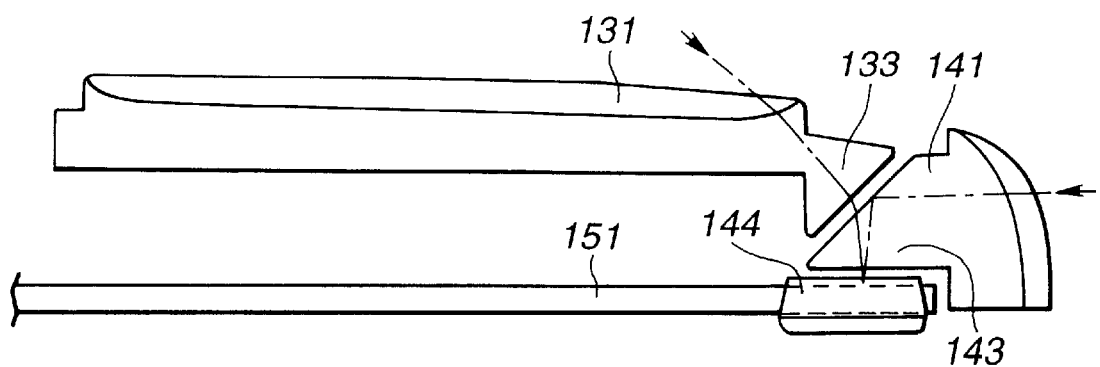
FIG. 36 is a cross-sectional view showing the structure of an IR light reception unit of the portable electronic apparatus of FIG. 5.

Projection 143 of prism 141 reflects IR light received from an external source through window 140 to light receiving device 144 as is shown in FIG. 36. IR light falling on display 130 is similarly reflected and guided by projection 133 of transparent protective plate 131 to be received by light receiving device 144.

A reset button (not shown) is mounted on the back side of the housing 101 for resetting all parameters to factory-set values. This reset button can be operated by a pin or the like. A speaker 105 is disposed on the back side of the housing to produce audio sound, as shown in FIG. 19.

Figure 19:
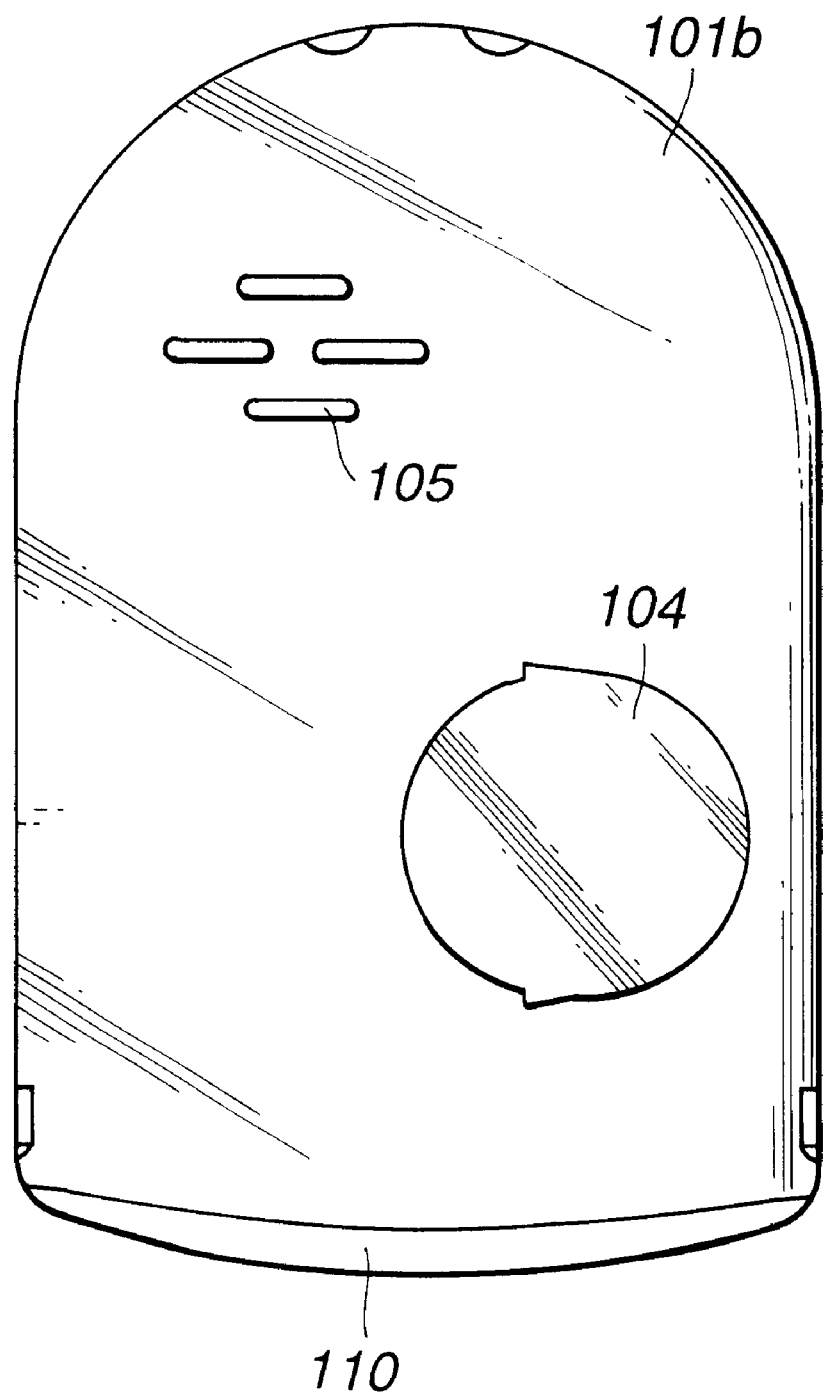
FIG. 19 is a backside elevational view of the portable electronic apparatus of FIG. 5.
Figure 37:
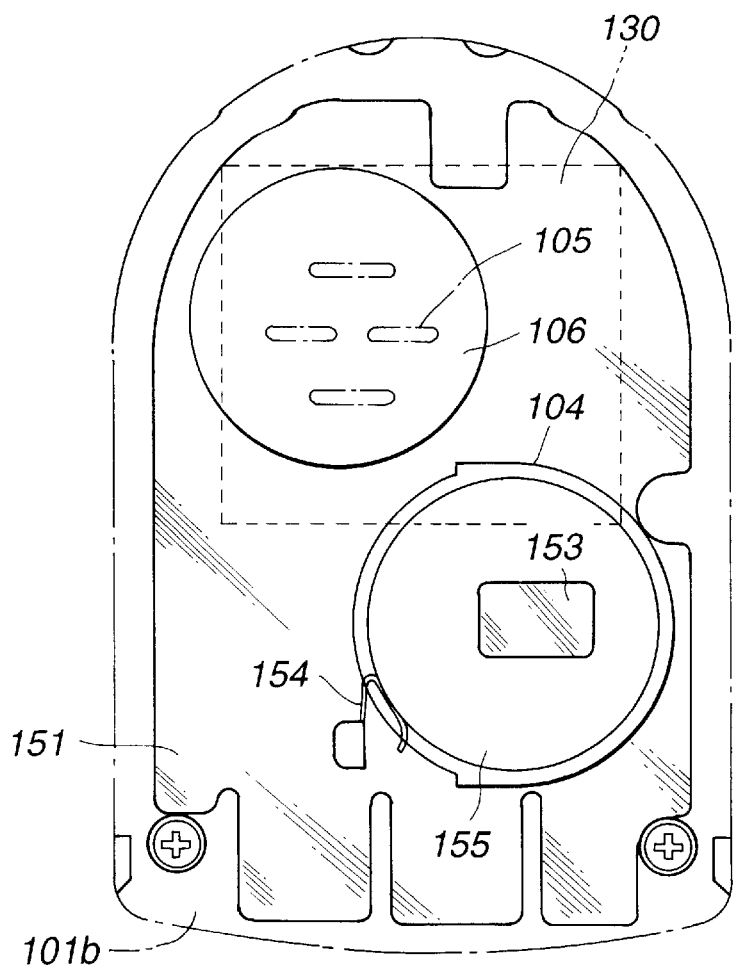
FIG. 37 is a back side elevational view showing an arrangement of a substrate and a battery of the portable electronic apparatus of FIG. 5.

A battery holder 104 is mounted on the back side of housing 101 as shown in FIGS. 19 and 37 and is adapted to hold a battery therein. The battery, such as battery 155 of FIGS. 38, 40 and 41, furnishes the driving power to each component of portable electronic device 100. Battery 155 is a substantially disc-shaped so-called button battery. When battery holder 104 is mounted on housing 101, battery 155 is held therein so that its outer peripheral surface, which acts as a positive electrode, abuts against a positive source terminal 154 provided on substrate 151 (FIG. 37), and the major surface of the battery 155, which acts as the negative electrode, abuts against a negative power source terminal 153.

Figure 38:
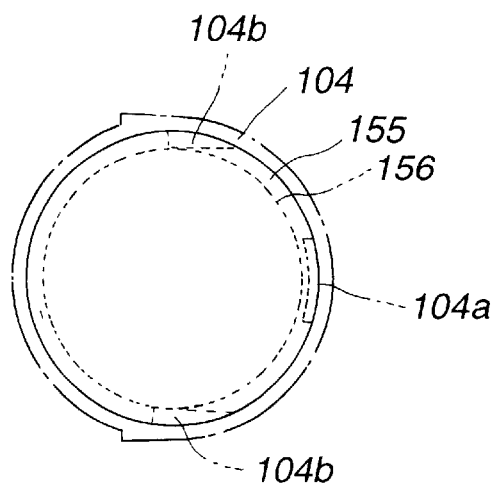
FIG. 38 is a back side elevational view showing the structure of a battery holder of the portable electronic apparatus of FIG. 5.
Figure 39:
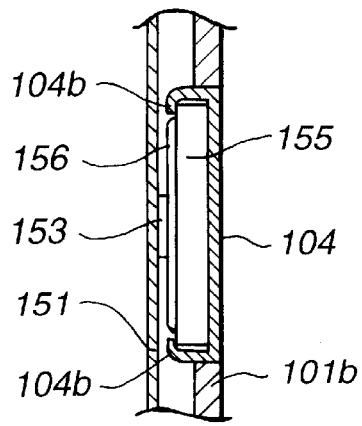
FIG. 39 is a cross-sectional view showing the structure of the battery holder of FIG. 38.
Figure 41:
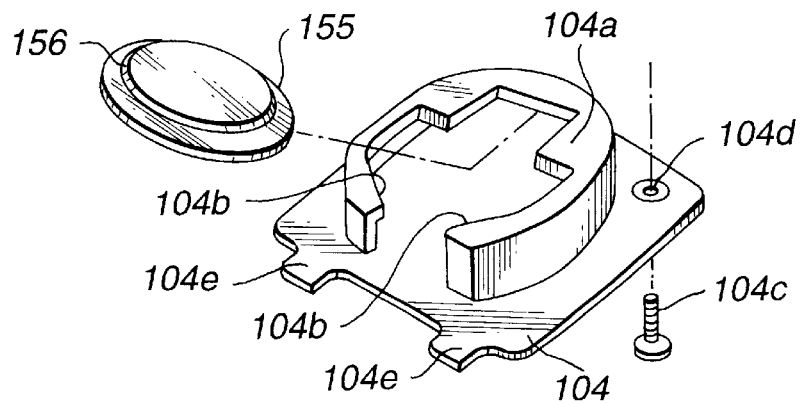
FIG. 41 is a perspective view showing the inner surface side of the alternative embodiment of the structure of a battery holder of FIG. 40.

In a preferred embodiment, the battery holder is as shown in FIG. 38, and is formed with hook-shaped battery holding portions 104a, 104b for holding the outer peripheral portion of the battery 155. As can be seen in FIGS. 39 and 41, the outer peripheral portion of battery 155 is retained by the distal ends of battery holding portions 104a, 104b which are positioned along the outer edge of projection 156 of the battery. Battery 155 is prevented from being improperly positioned in the battery holder because the battery can be positioned in the space between battery holding portions 104a, 104b only in the proper orientation, as shown in FIG. 39.

Figure 40:
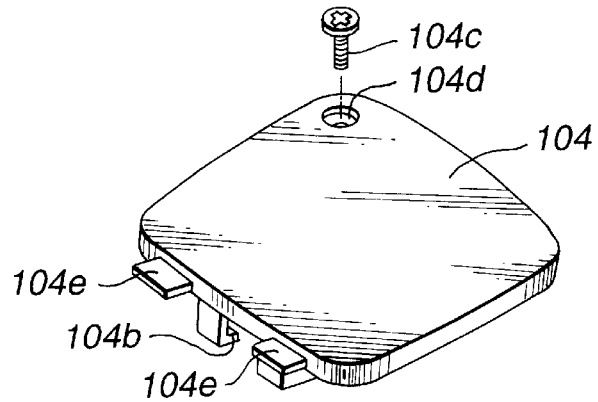
FIG. 40 is a perspective view showing the outer surface of an alternative embodiment of the structure of a battery holder of the portable electronic apparatus of FIG. 5.

In an alternative embodiment, battery holder 104 may be formed as a square-shaped plate, as shown in FIG. 40, with a retention pawl 104e adapted to engage with the edge of a through-hole provided in housing 101 (not shown) and a tapped hole 104d through which a set screw 104c passes to be thread into housing 101. Hence, battery holder 104 has the battery holding portions 104a, 104b on its back side, as shown in FIG. 41, so that battery 155 is held between these battery holding portions with the proper polarity orientation.

Figure 42:
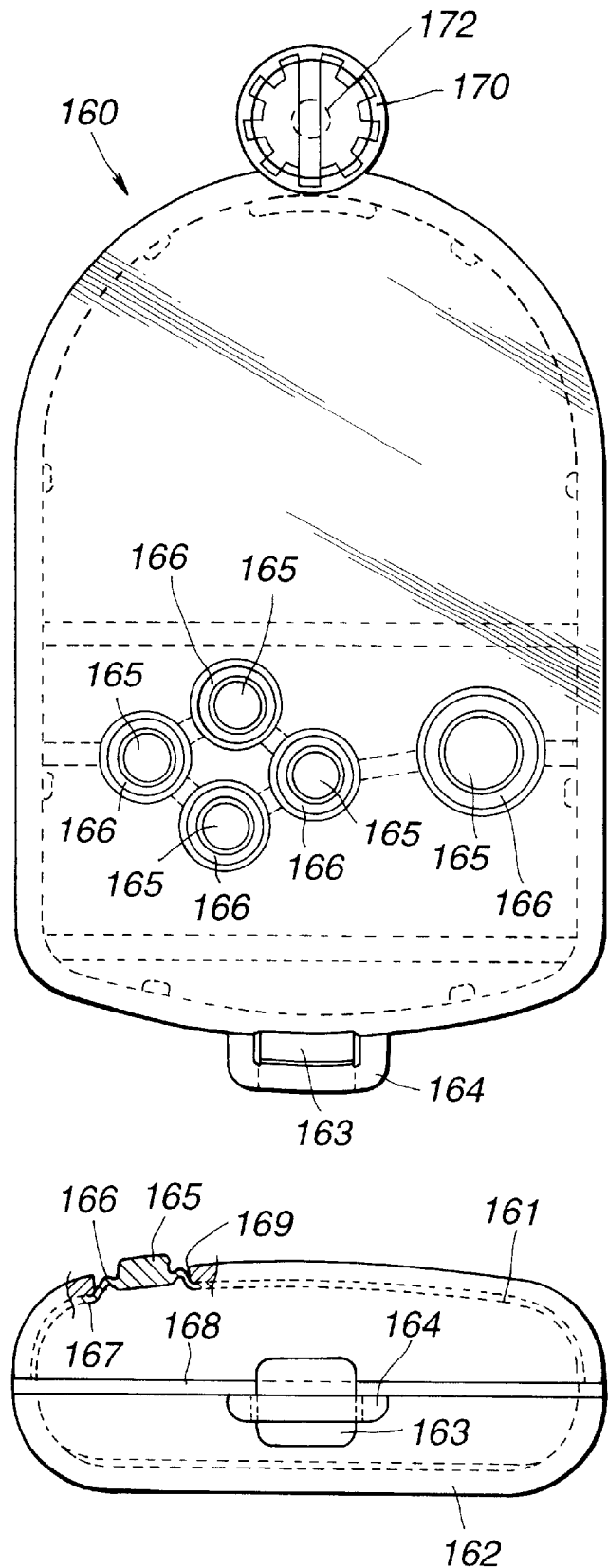
FIG. 42 is a front elevational, and bottom plan view showing the front and bottom sides of the structure of a protective casing for accommodating the portable electronic apparatus of FIG. 5.
Figure 43:
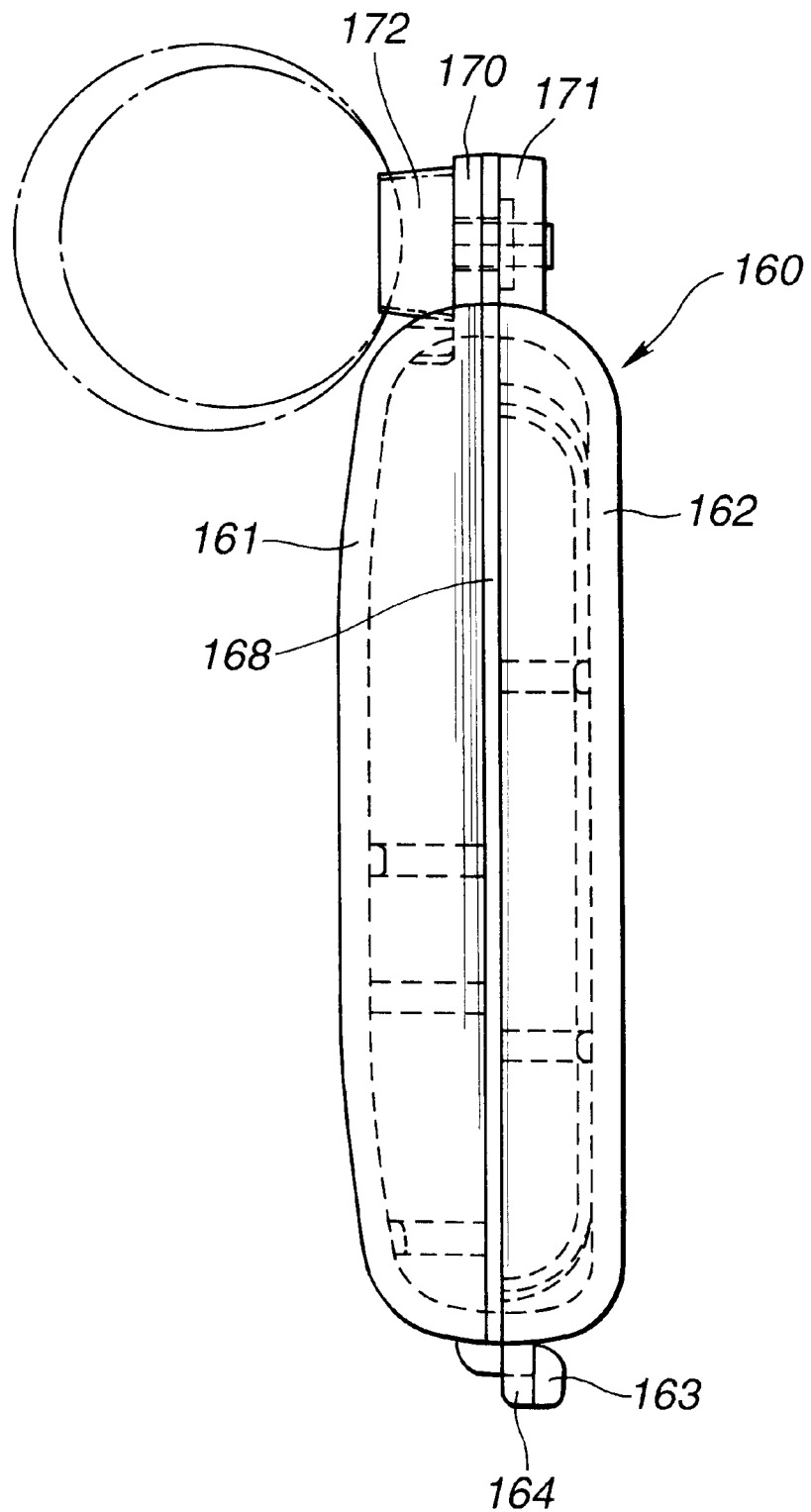
FIG. 43 is a side elevational view showing the structure of the protective casing of FIG. 42 accommodating the portable electronic apparatus of FIG. 5.
Figure 44:
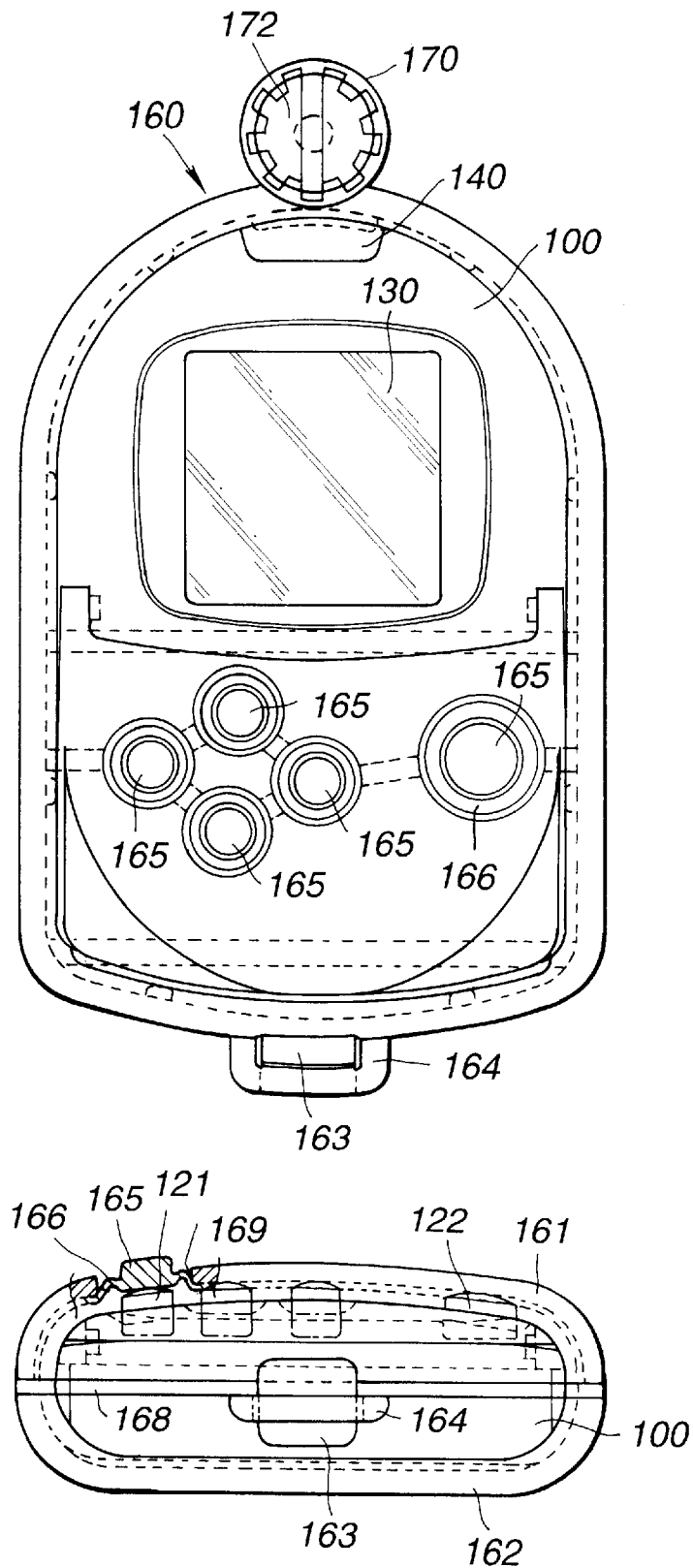
FIG. 44 is a front elevational, and bottom plan view showing the front and bottom sides of the structure of the protective casing of FIG. 42 accommodating the portable electronic apparatus of FIG. 5.
Figure 45:
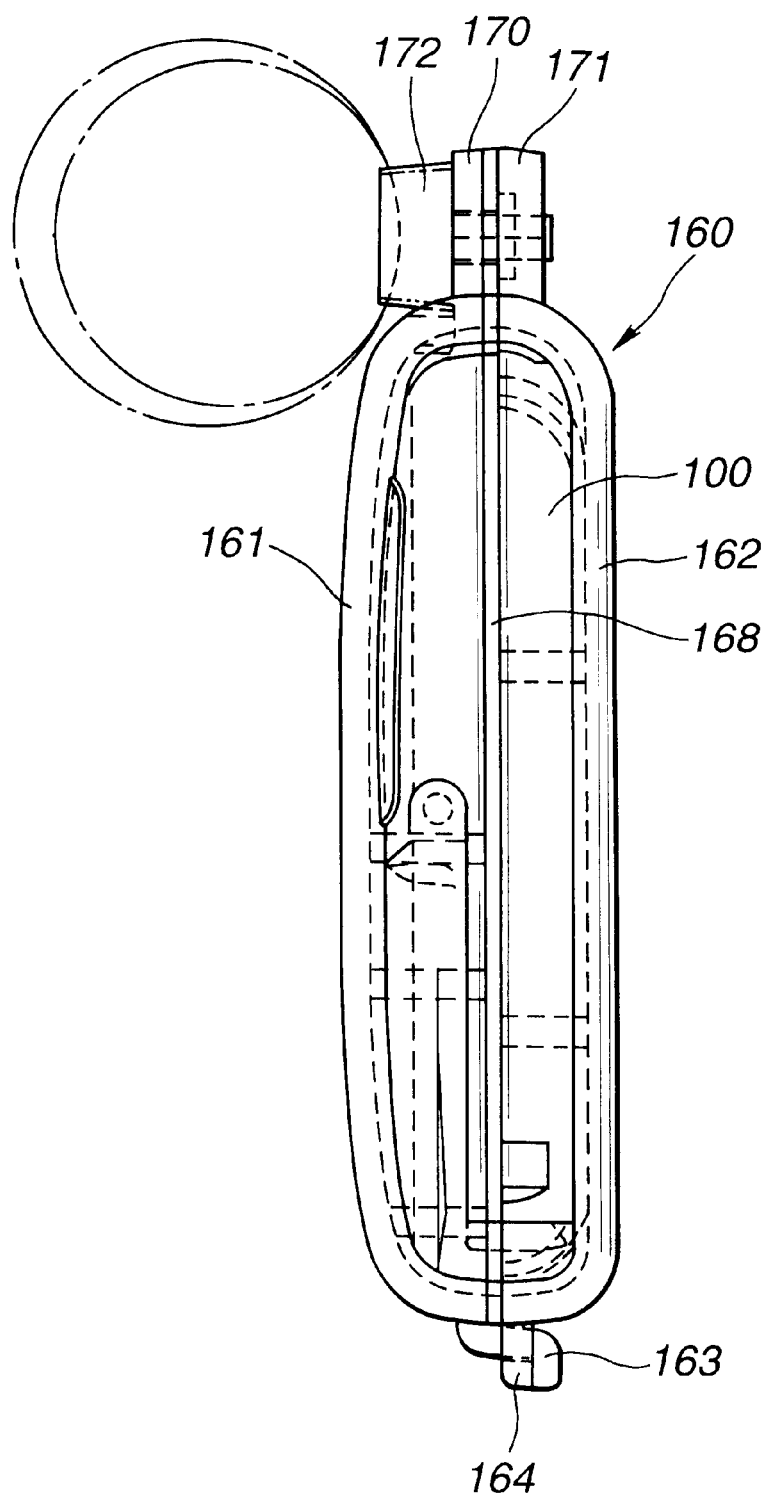
FIG. 45 is a side elevational view showing the structure of the protective casing of FIG. 44 accommodating the portable electronic apparatus of FIG. 5.

A protective casing 160 may be provided for housing and protecting the portable electronic device, as shown in FIG. 42 and 43. Protective casing 160 is formed of an upper casing 161 and a lower casing 162, which abut against each other for housing the portable electronic device, as shown in FIGS. 44 and 45. Casings 161, 162 are formed of a transparent synthetic resin material, such as polymethyl methacrylate (acryl), or polycarbonate, or the like.

Casings 161, 162 are provided with an engagement portion at one end thereof, such as hook-shaped engagement pawl 163 provided on upper casing 161 and an engagement ring 164 provided on lower casing 162 for receiving the engagement pawls. A tightening portion is made up of a screw inserting piece 170 provided on upper casing 161 and a threaded screw receiving piece 171 provided on lower casing 162 secured to each other by inserting a tightening screw 172 into respective threaded holes. Preferably, the head of tightening screw 172 is formed with a straight groove to receive the edge of a coin or the like, as shown in FIG. 43.

At least one of casings 161, 162, for example, upper casing 161, is provided with a plurality of through-holes 169 positioned in registration with actuator buttons 121, 122, as best seen in FIG. 44. A push button 165 passes through through-holes 169 and is connected to a tight closure member 167 by connecting portion 166. Closure member 167 is formed of an elastic material (elastomer) and is adapted to be bonded to the internal surface of upper casing 161 and lower casing 162. Pushbutton 165 is movable in a direction emerging from and disappearing below the upper surface of upper casing 161 by elastic deformation of connecting portion 166 of closure member 167 to translate an imparted force to a respective actuator button. Closure member 167 is further formed with a sealing member 168 adapted to seal the upper and lower casings. When the upper and lower casings are positioned in abutment against each other, sealing member 168 is clinched therebetween to seal the casings to each other. This sealing member prevents water or moisture intrusion or the like into protective casing 160 so that the casing can be used not only for protecting the portable electronic device therein from vibrations or shock but also as a water-proofing casing.

When portable electronic device 100 is housed within protective casing 160 with display 130 facing the upper casing, as shown in FIGS. 44 and 45, pushbuttons 165 of the protective casing are positioned in registration with actuator buttons 121, 122 so that operation of the pushbuttons effects actuation of the actuator buttons.

The portion of the protective casing 160 in registration with display 130 of portable electronic device 100 may be used as an enlarging lens unit as shown in FIG. 45. That is, by recessing that portion of the outer wall section of the protective casing in registration with display 130, such portion serves as a concave lens so that the display can be viewed with an enlarged scale.

Figure 46:
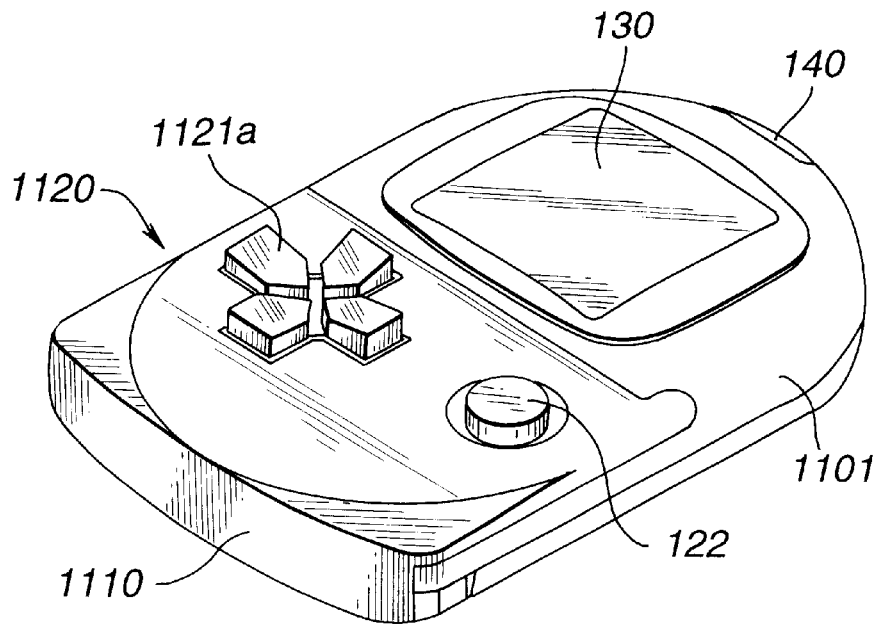
FIG. 46 is a perspective view showing an alternative embodiment of a portable electronic apparatus in which the four actuator buttons are constructed as a see-saw switch.

In the above-described embodiment, actuator buttons 121, 122 provided on lid 110 are made up of a grouping of four pushbutton actuator buttons 121 and a sole pushbutton actuator button 122. Alternatively, the four pushbutton actuator buttons 121 may be replaced by a sole cross-shaped seesaw actuator button 1121a of an actuator 1120 on a lid 1110, as shown in FIG. 46. Seesaw actuator button 1121a has four arm portions, each extending in one of four directions from its center. The arm portions are in registration with four switch elements (such as switch elements 102) and allow actuation thereof.

Figure 47:
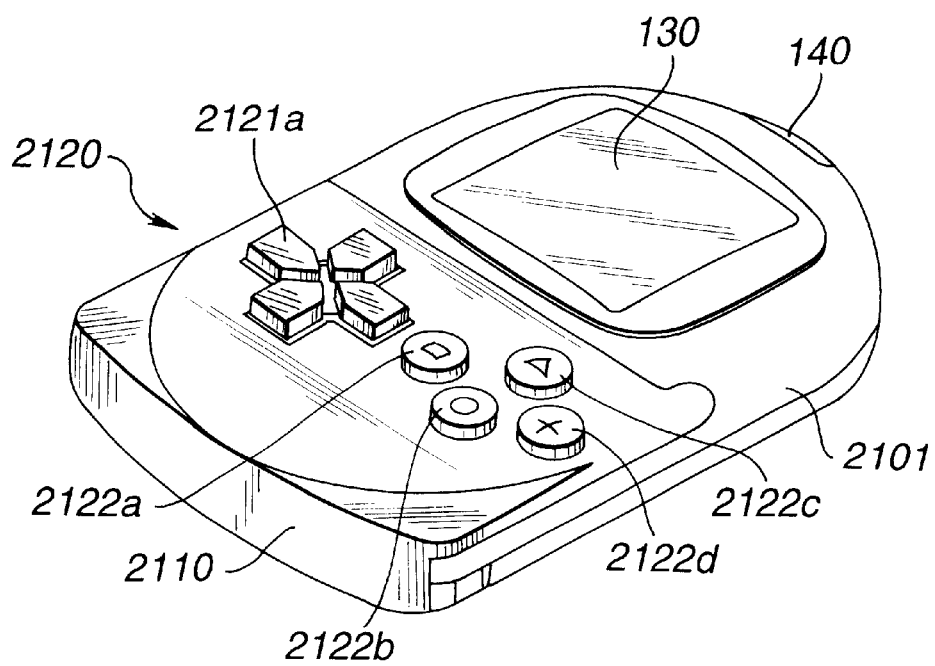
FIG. 47 is a perspective view showing another alternative embodiment of a portable electronic apparatus in which the actuator is arranged as a see-saw switch and four actuator buttons.

In another alternative embodiment, an actuator 2120 provided on a lid 2110 may be comprised of the above-mentioned seesaw actuator buttons 2121*a* and four push-button actuator buttons 2122*a*, 2122*b*, 2122*c* and 2122*d* as shown in FIG. 47. These four actuator buttons 2122*a*, 2122*b*, 2122*c* and 2122*d* are in registration with four switch elements 103, respectively.

Figure 48:
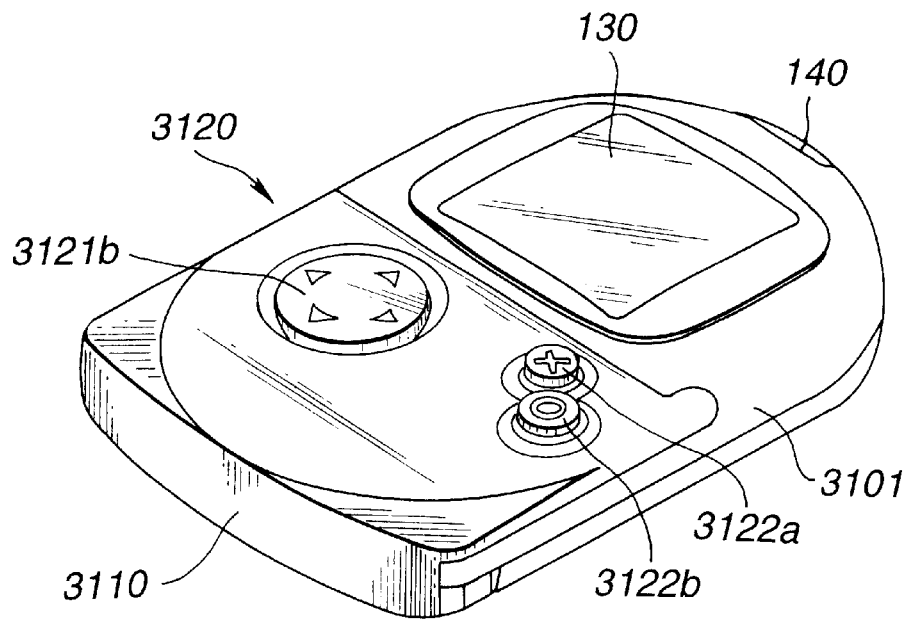
FIG. 48 is a perspective view showing another alternative embodiment of the portable electronic apparatus in which the actuator is arranged as a circular see-saw switch and four actuator buttons.

In accordance with a further alternative embodiment, an actuator 3120 provided on a lid 3110 may be formed with a disc-shaped see-saw actuator button 3121*b* and two push-button actuator buttons 3122*a*, 3122*b*, as shown in FIG. 48. See-saw button 3121*b* has triangular arrow marks printed thereon so as to be tilted in the direction of this arrow mark when pushed, and thereby impart a force to the switch element lying therebeneath. The two actuator buttons 3122*a*, 3122*b* are in registration with two switch elements.

Figure 49:
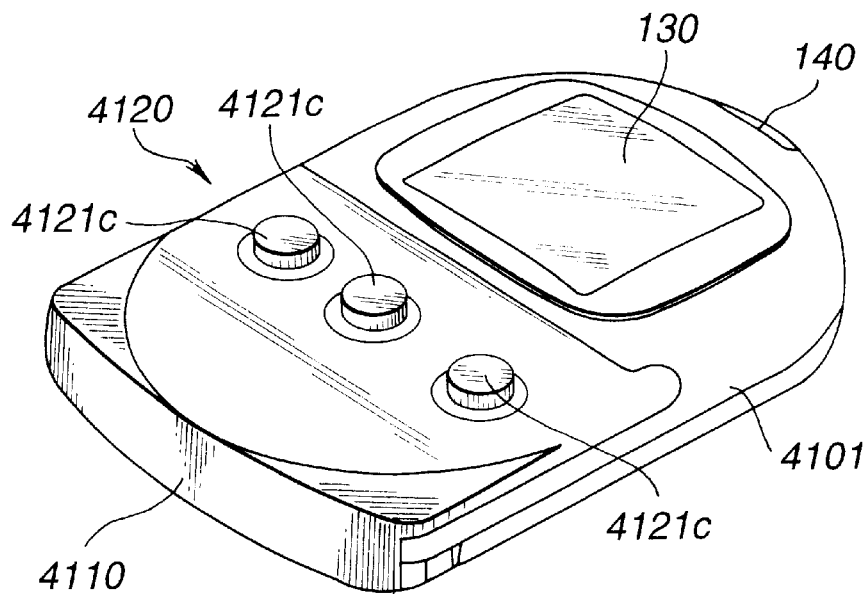
FIG. 49 is a perspective view showing another alternative embodiment of the portable electronic apparatus in which the actuator is arranged as three actuator buttons.

In accordance with yet another alternative embodiment, an actuator 4120 provided on a lid 4110 may comprise three pushbutton actuator buttons 4121*c*, 4121*c*, 4121*c*, as shown in FIG. 49. These three pushbutton actuator buttons are in registration with three switch elements 102, 103.

Figure 50:
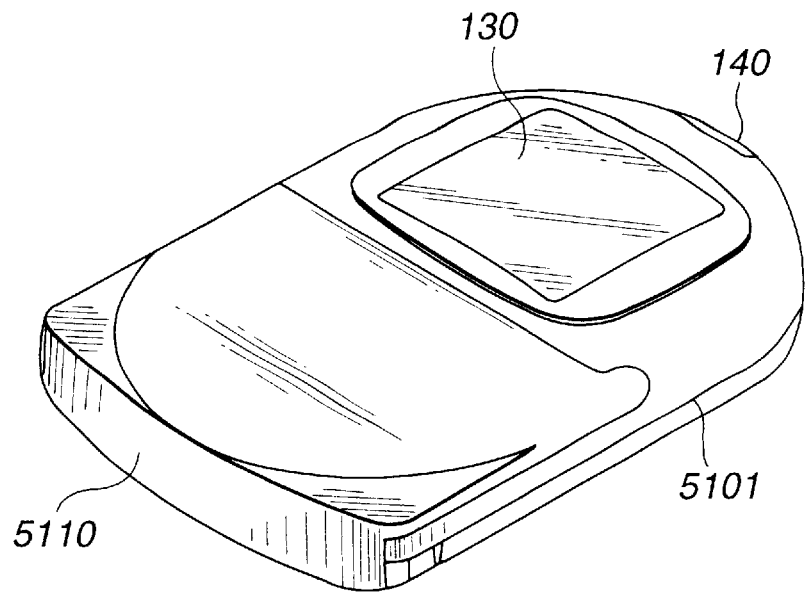
FIG. 50 is a perspective view showing another alternative embodiment of the portable electronic apparatus that is not provided with an actuator.
Figure 51:
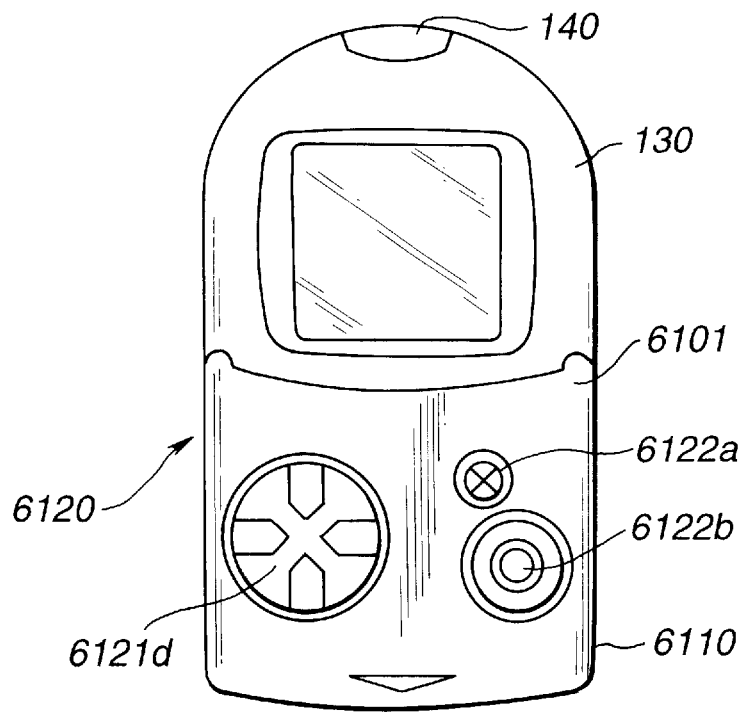
FIG. 51 is a front elevational view showing another alternative embodiment of the portable electronic apparatus in which the actuator is arranged as a see-saw switch, having a recess and a projection, and two actuator buttons.

In accordance with still another alternative embodiment, portable electronic device 100 is provided with a lid 5110 without an actuator or actuator buttons as shown in FIG. 50. In this case, switch elements 102, 103 are accessible, and are actuated with lid 5110 opened or removed from housing 5101.

In accordance with yet another alternative embodiment, the portable electronic device is provided with an actuator 6120 having a see-saw actuator button 6121*d* and two pushbutton actuator buttons 6122*a*, 6122*b* on a lid 6110. See-saw actuator button 6121*d* is formed with four raised portions in registration with switch elements 102. The two actuator buttons 6122*a*, 6122*b* are of different sizes, and are similarly positioned in registration with switch elements 103.

Figure 52:
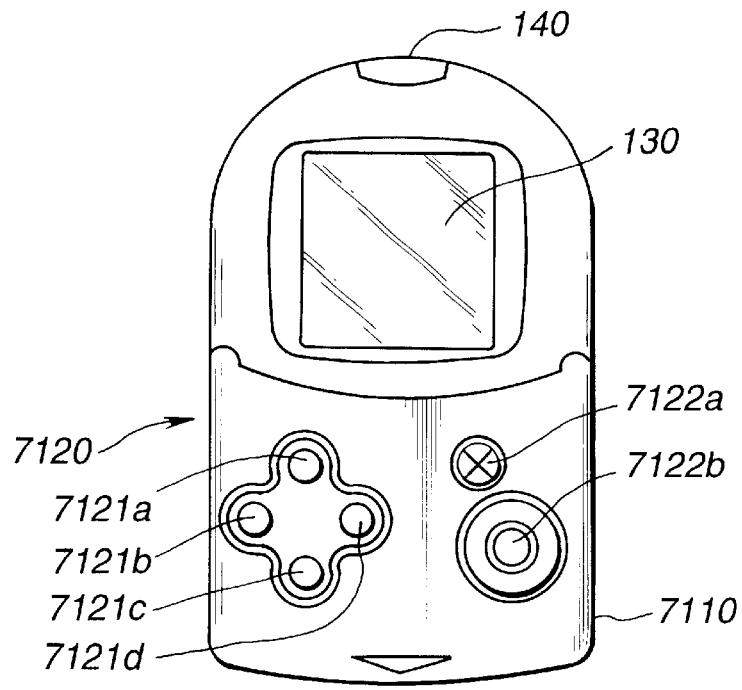
FIG. 52 is a front elevational view showing another alternative embodiment of the portable electronic apparatus in which an actuator is designed as six actuator buttons.

In a still further alternative embodiment of the invention, an actuator 7120 provided on a lid 7110 comprises a grouping of four pushbutton-actuator buttons 7121*a*, 7121*b*, 7121*c* and 7121*d* and two pushbutton-actuator buttons 7122*a* and 7122*b*, as shown in FIG. 52. These pushbutton-actuator buttons are in registration with respective switch elements 102 and switch elements 103.

Figure 53:
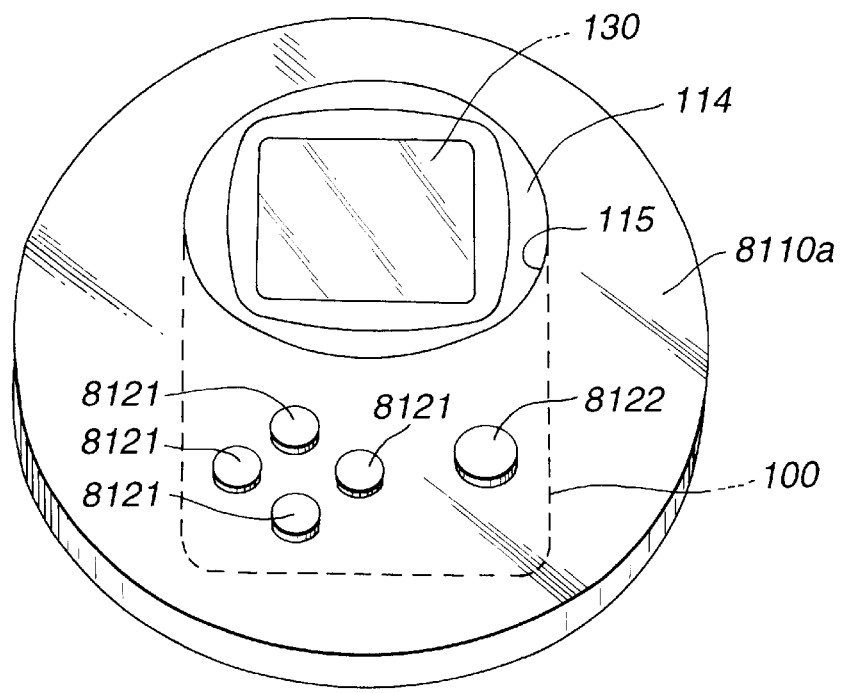
FIG. 53 is a perspective view showing a lid for covering the outer casing of the portable electronic apparatus of FIG. 5.
Figure 54:
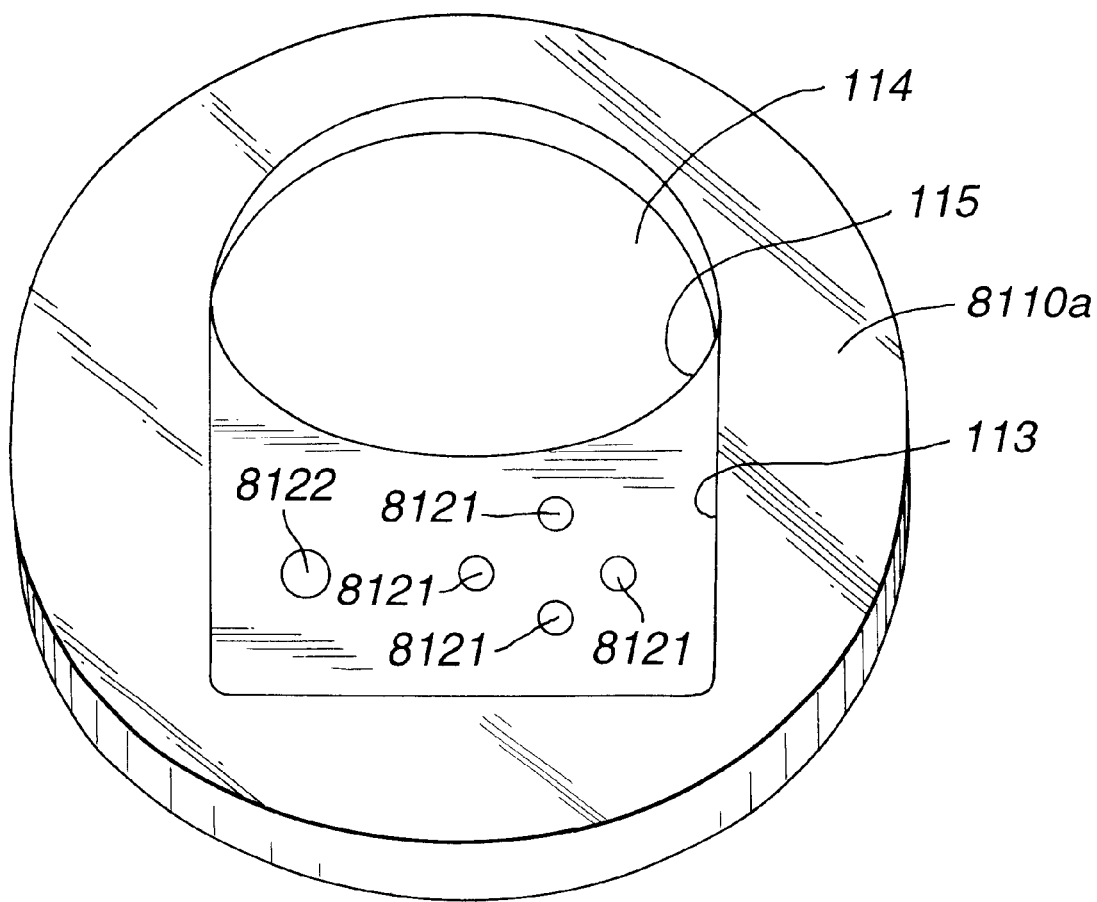
FIG. 54 is a perspective view showing the backside of the lid of FIG. 53.

In still another alternative embodiment, portable electronic device 100 is provided with a disc-shaped cover-like lid 8110*a* configured to hold housing 101 with lid 110 removed, as shown in FIGS. 53 and 54. Thus, cover-like lid 8110*a* takes the place of lid 110, and is formed with a recess 113 on its back side (FIG. 54) that is adapted to receive housing 101. When the housing is inserted into recess 113, display 130 faces the front side and is viewable through hole 115 formed in the cover-like lid which may be closed by a protective plate 114 formed of a transparent material. Cover-like lid 8110*a* includes actuator buttons 121, 8122 similar to those of lid 110 to translate to switch elements 102, 103.

Figure 55A:
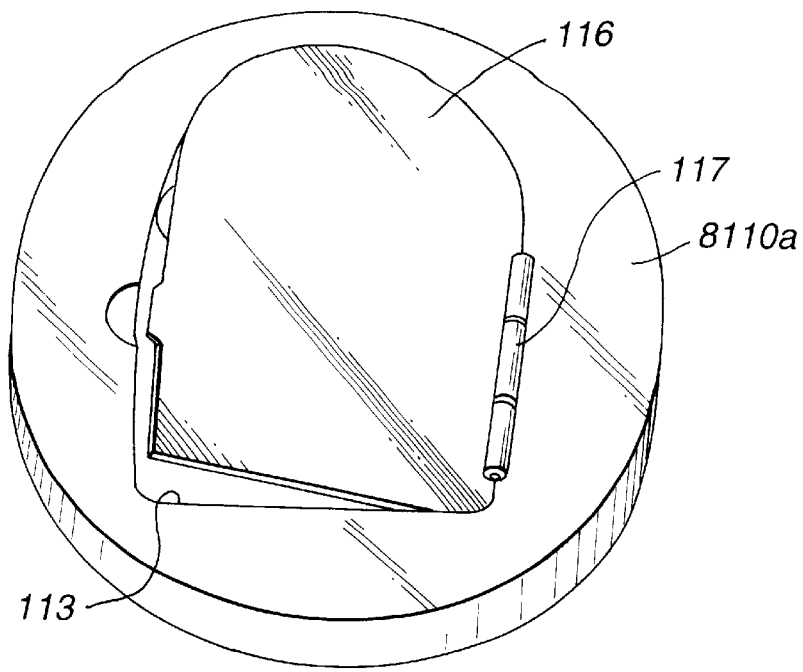
FIG. 55A is a perspective view showing the backside of the lid of FIG. 53 in which a door is provided.

Cover-like lid 8110*a* may further be formed with a door 116 covering recess 113, as shown in FIG. 55A. Door 116 is pivotably supported by a hinge 117. In its closed state, door 116 prevents portable electronic device 100 from being removed from recess 113. When door 116 is in its open state, housing 101 may be inserted into and removed from the recess.

Figure 55B:
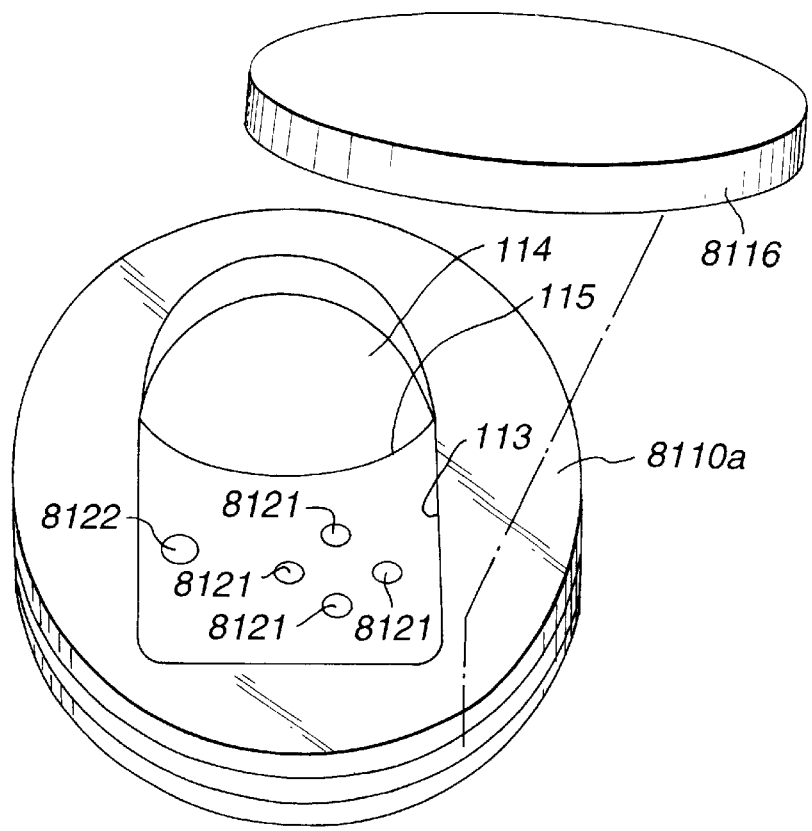
FIG. 55B is a perspective view showing a lid of the portable electronic apparatus including a cover coupleable to the backside thereof.

A removable disc-shaped lid plate 8116 overlies the entire back surface of cover-like lid 8110*a* and may be provided for securely closing recess 113, as shown in FIG. 55B, and for preventing housing 101 from being removed from the recess.

Figure 56:
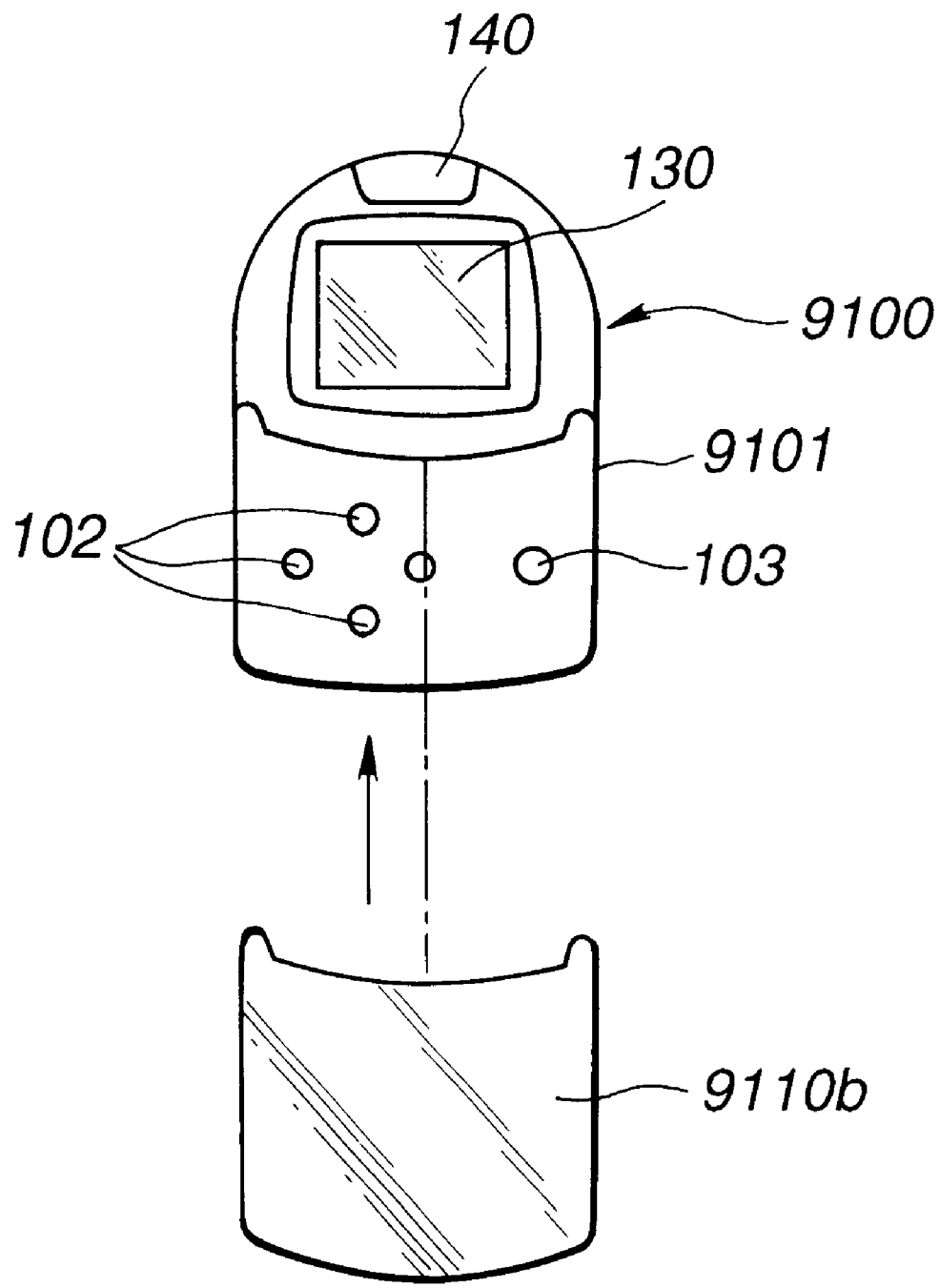
FIG. 56 is a front view showing an alternative embodiment of a lid in which the portable electronic apparatus of FIG. 5 is selectively, slidably inserted.
Figure 57:
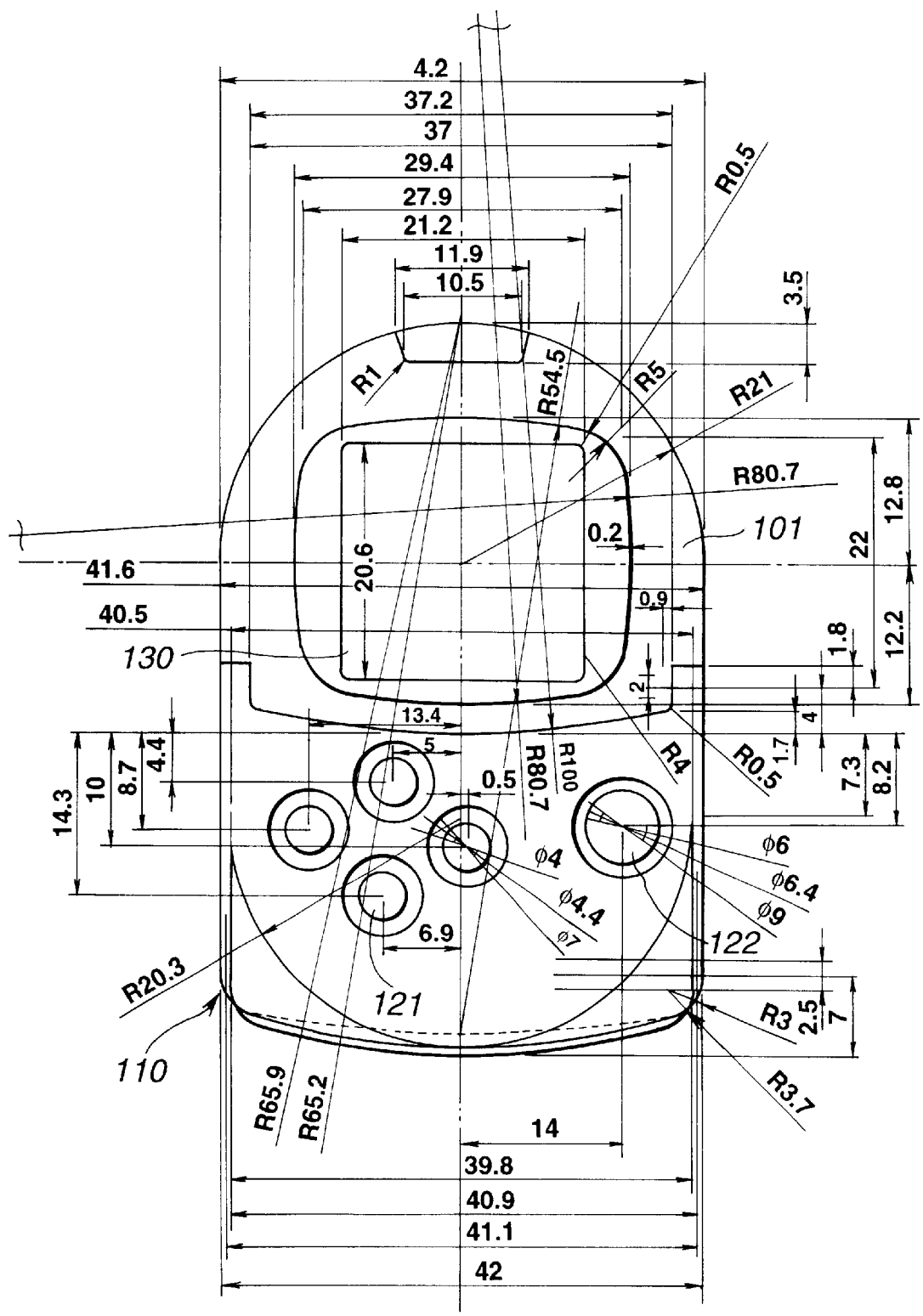
FIG. 57 is a front elevational view showing the size of the portable electronic apparatus of FIG. 5 in a preferred embodiment.
Figure 58:
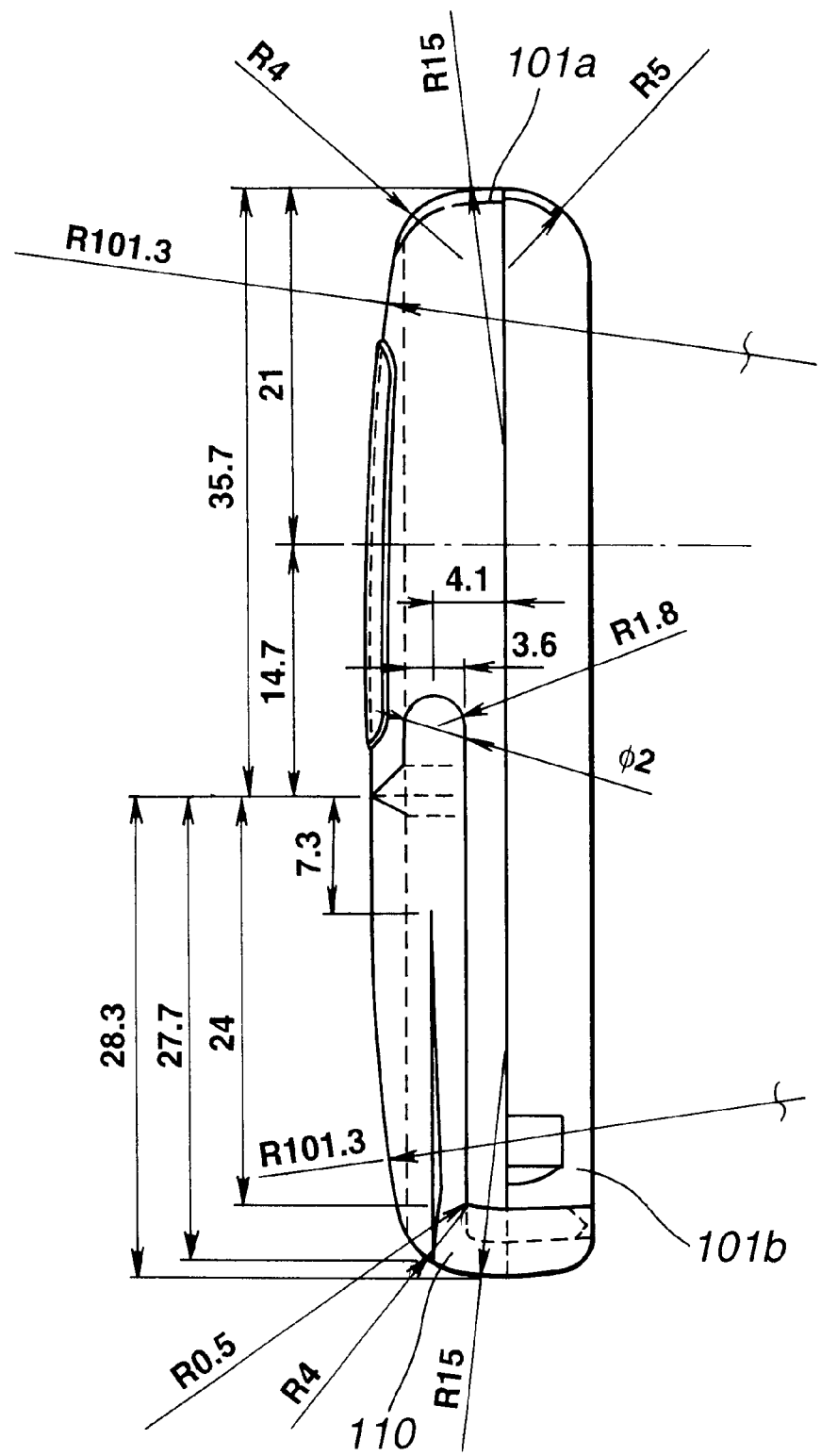
FIG. 58 is a right side elevational view showing the size of the portable electronic apparatus of FIG. 5 in a preferred embodiment.
Figure 59:
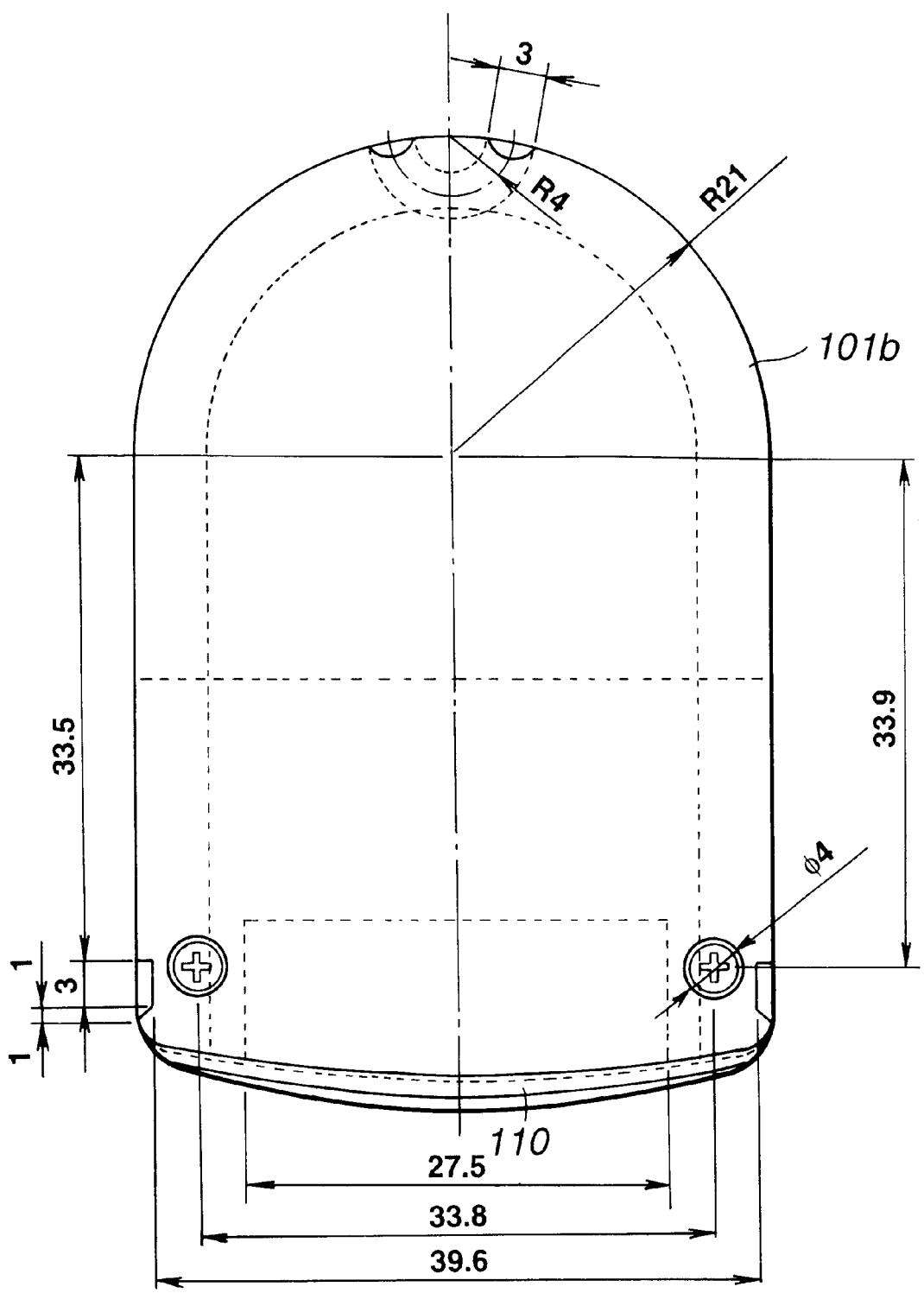
FIG. 59 is a backside elevational view showing the size of the portable electronic apparatus of FIG. 5 in a preferred embodiment.
Figure 60:
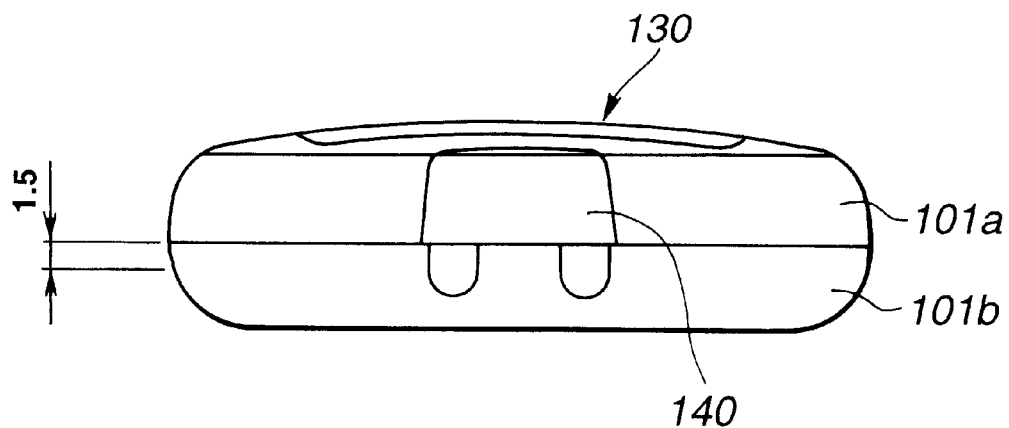
FIG. 60 is a top plan view showing the size of the portable electronic apparatus of FIG. 5 in a preferred embodiment.
Figure 61:
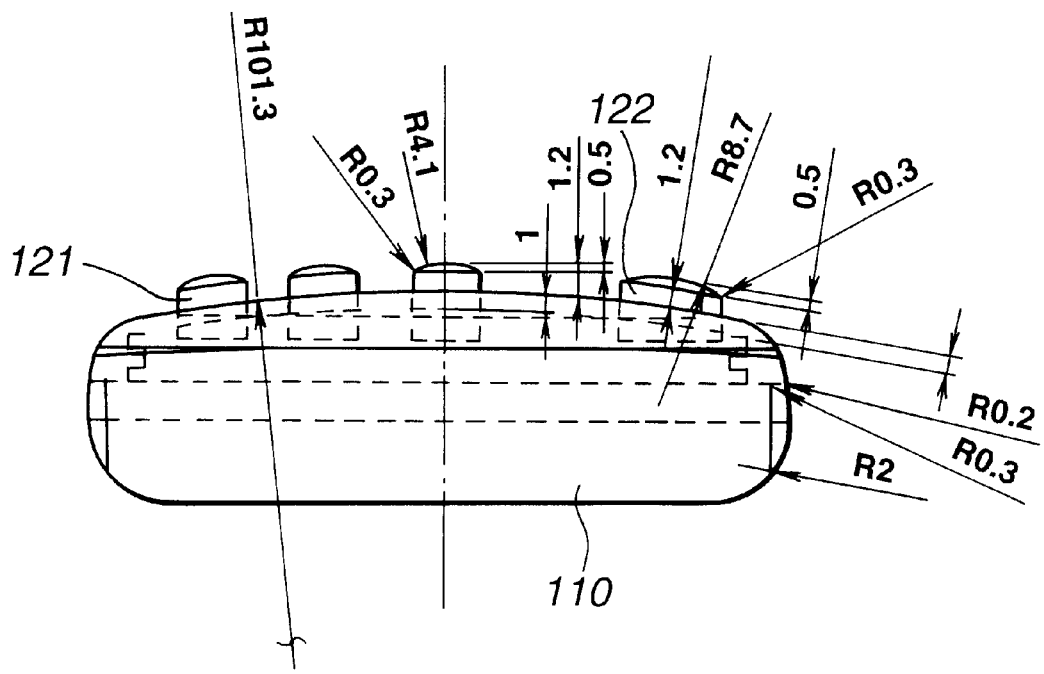
FIG. 61 is a bottom plan view showing the size of the portable electronic apparatus of FIG. 5 in a preferred embodiment.
Figure 62:
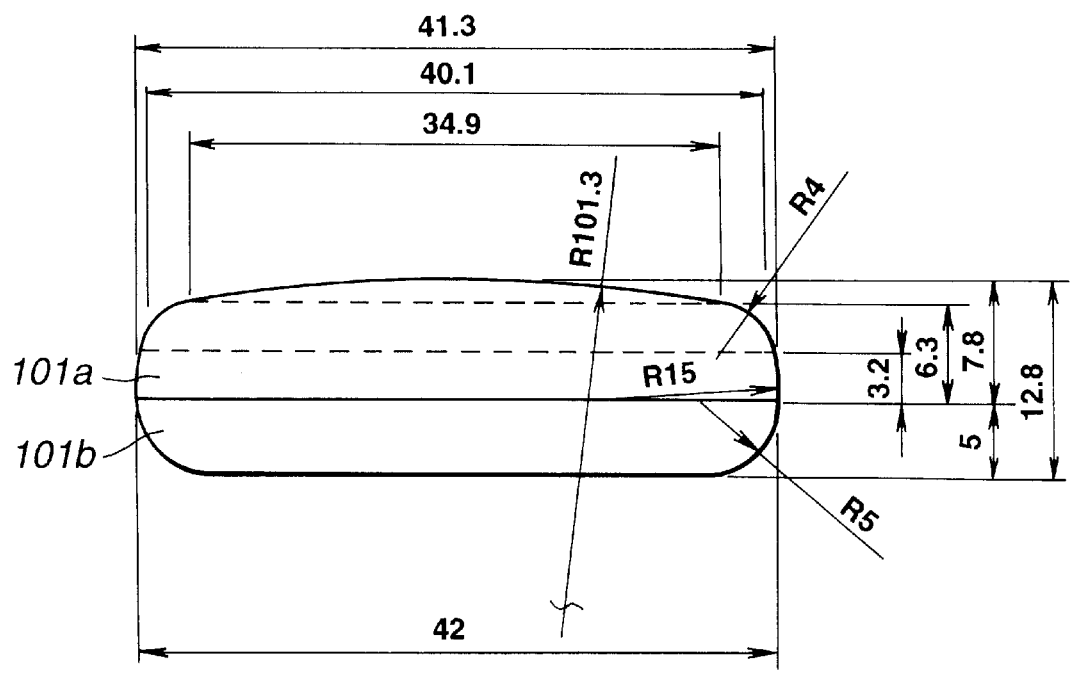
FIG. 62 is a bottom plan view showing the outer size of the portable electronic apparatus of FIG. 5 in a preferred embodiment.
Figure 64:
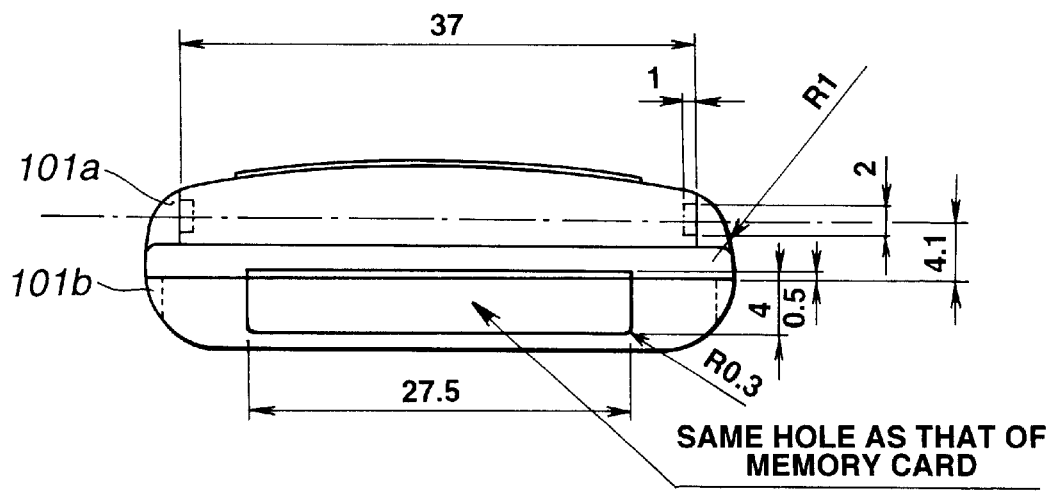
FIG. 64 is a bottom plan view showing the size of an outer casing of the portable electronic apparatus of FIG. 5 with the lid thereof removed in a preferred embodiment.
Figure 63:
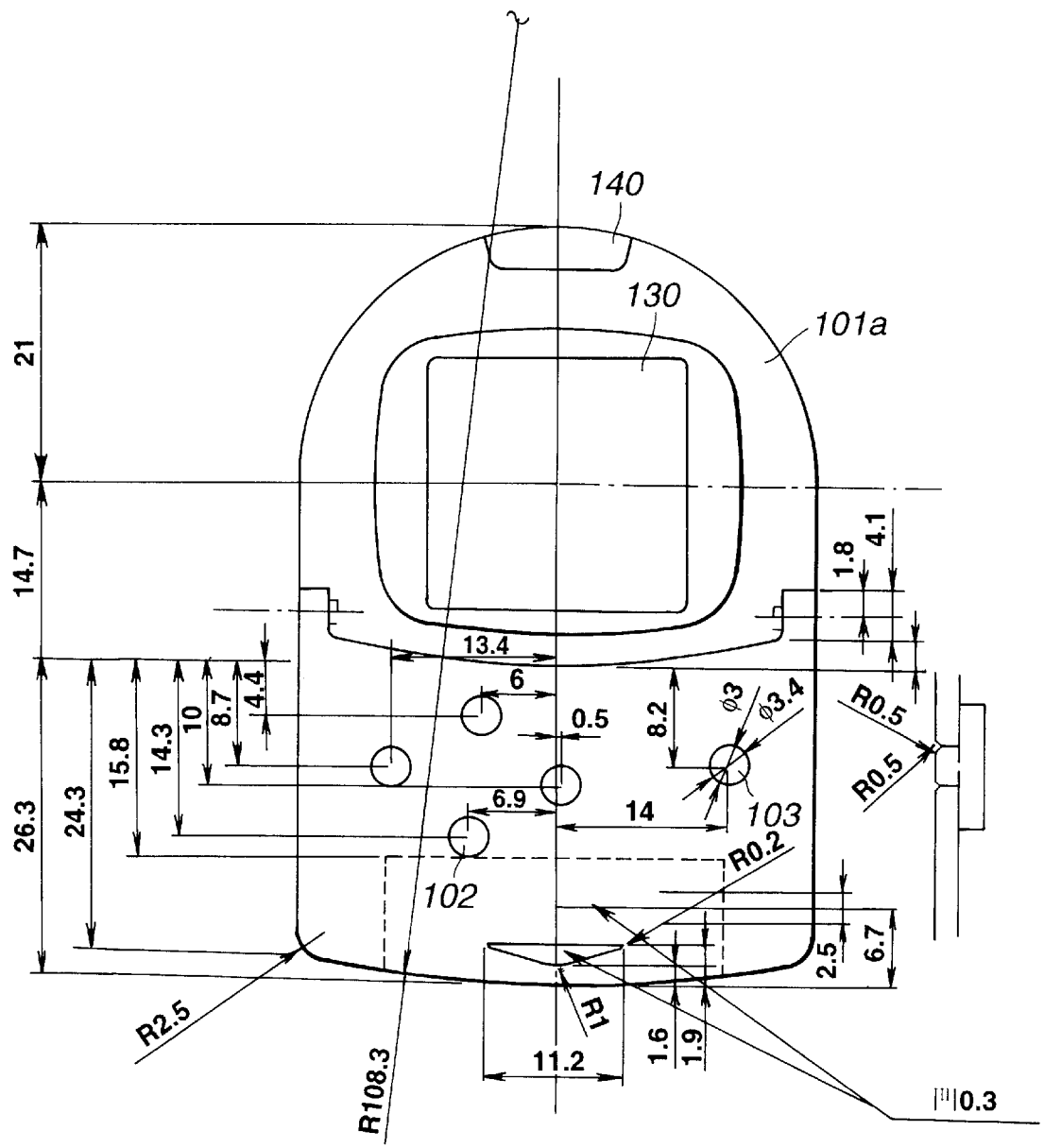
FIG. 63 is a front elevational view showing the size of an outer casing of the portable electronic apparatus of FIG. 5 with the lid thereof removed in a preferred embodiment.
Figure 65:
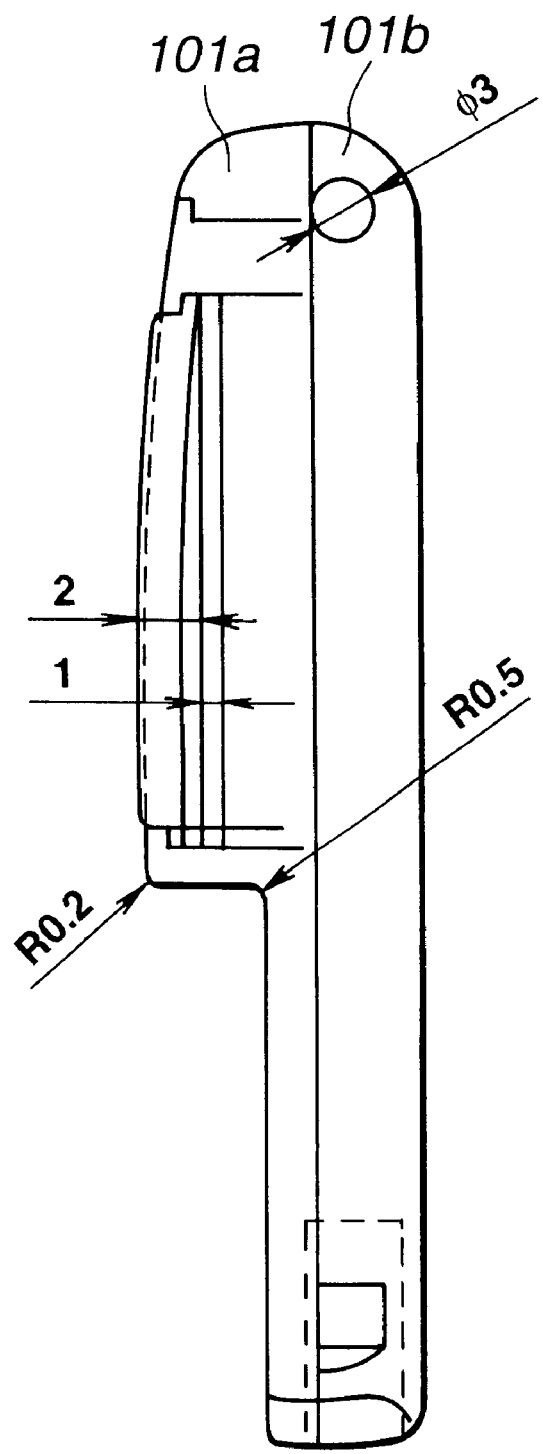
FIG. 65 is a right side elevational view showing the size of an outer casing of the portable electronic apparatus of FIG. 5 with the lid thereof removed in a preferred embodiment.
Figure 66:
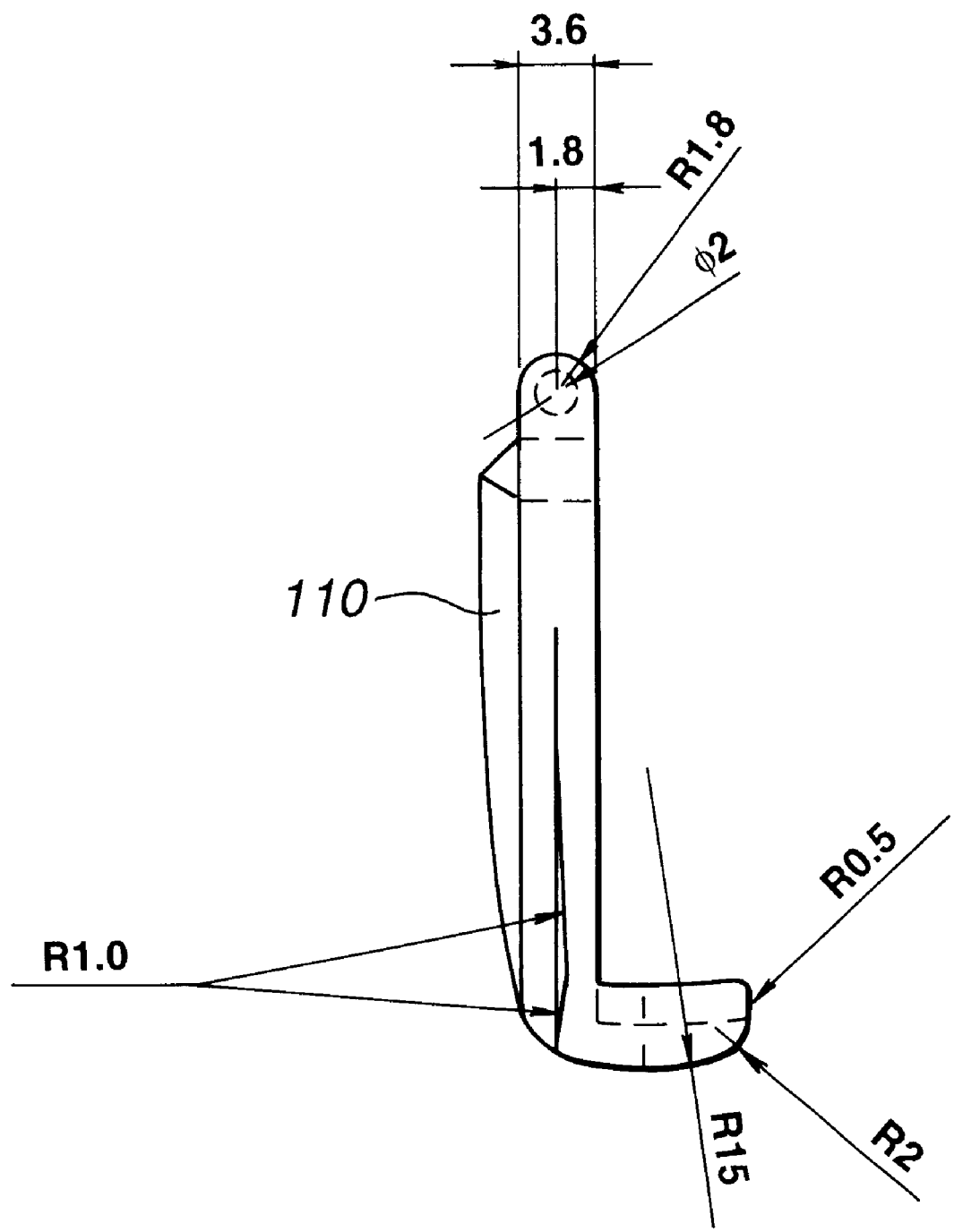
FIG. 66 is a right side elevational view showing the size of a lid of the portable electronic apparatus of FIG. 5 in a preferred embodiment.
Figure 67:
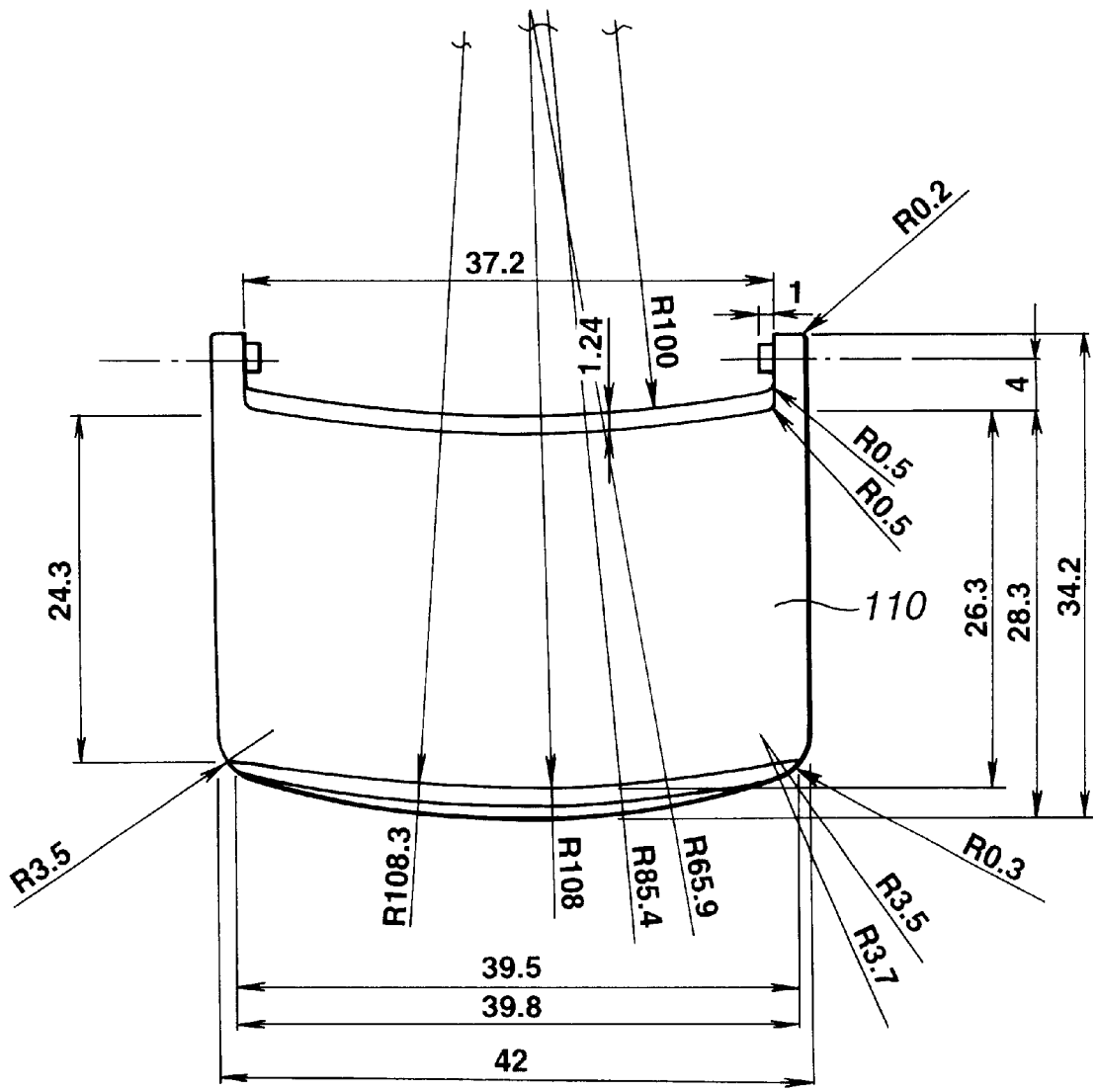
FIG. 67 is a front elevational view showing the size of a lid of the portable electronic apparatus of FIG. 5 in a preferred embodiment.
Figure 69:
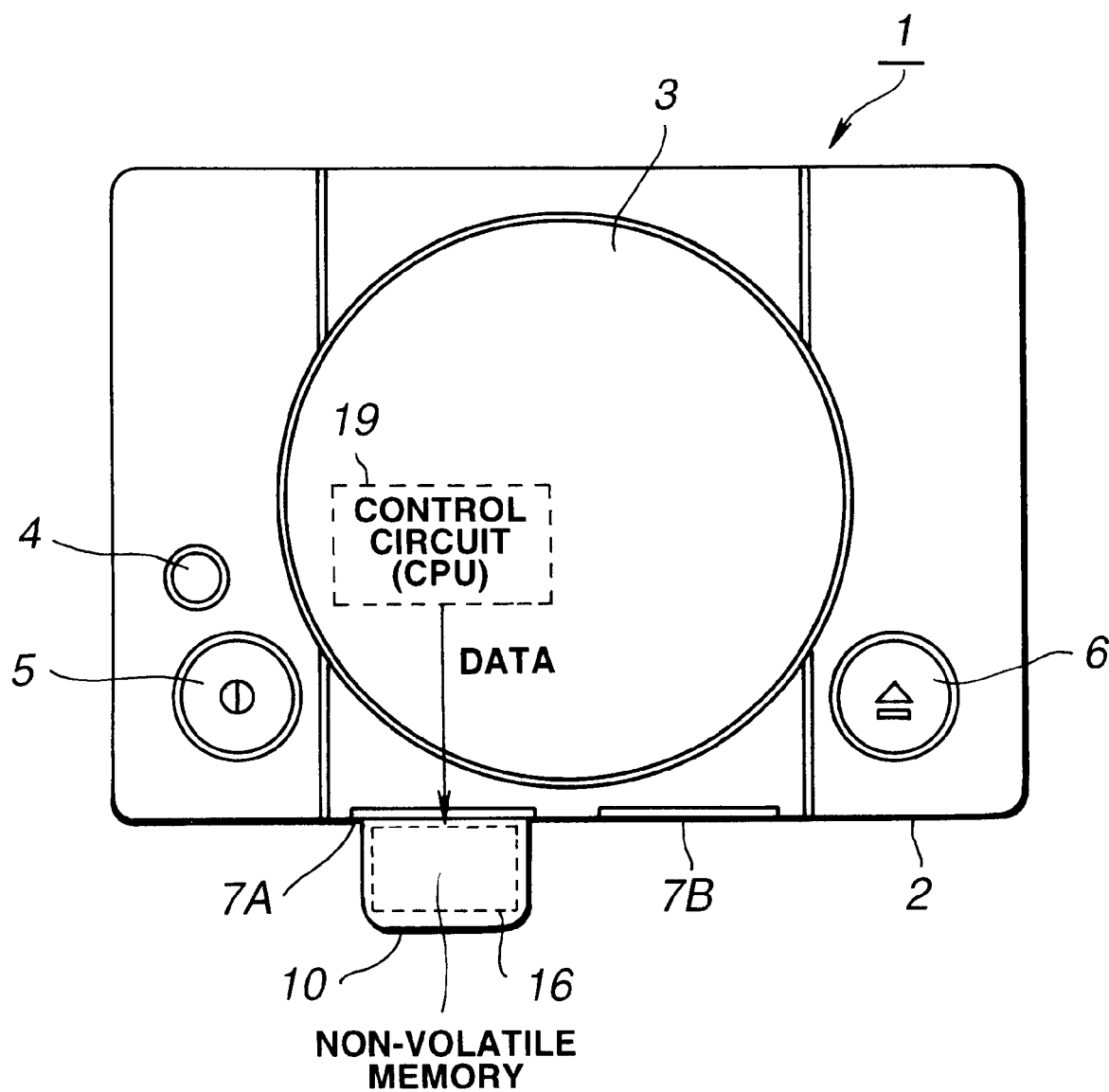
FIG. 69 shows an example of a conventional video game device employing a memory card as an auxiliary storage device.

In a still further alternative embodiment, a lid 9110*b* may be slidably mounted on a housing 9101 of portable electronic device 9100, as shown in FIG. 56. Lid 9110*b* may be detached from the housing 9101 by sliding the lid 9110*b* towards the bottom of the housing. Lid 9110*b* may or may not be provided with actuators.

Specific examples of preferred dimensions of embodiments of the present invention are shown in FIGS. 57–67. These dimensions are in millimeters and "R" denotes the radius of curvature.

In the portable electronic device constructed in accordance with the invention, the lid member reliably protects the terminal portion of the device, can be mounted on or removed from the outer casing of the device, and is prevented from being destroyed during the opening or closing thereof. If the lid provides a hindrance when connecting the portable electronic device to a video game device, it can be easily removed therefrom. The lid member is provided with actuator buttons positioned in registration with a plurality of switches disposed on the housing in order to permit actuation of the switches by way of the actuator buttons when the lid member is closed.

Thus, in accordance with the prevent invention, a portable electronic device is provided having a terminal portion for connection to an external equipment, in which, if the device is not connected to the external equipment, the terminal portion can be reliably protected. The portable electronic device is easy to handle, permits actuation of the switches thereon, and can be connected easily and smoothly to the external equipment.

Although portable electronic apparatus 100 has been described as being used as an auxiliary storage apparatus for video game device, the invention is not limited to the video game device and may be used as auxiliary storage, or for retrieving a variety of information in any number of apparatuses.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and in the accompanying drawings shall be interpreted as illustrative and not in a limiting sense.

It is also to be understood that the following claims are intended to cover all of the generic and specific features of the invention hereindescribed and all statements of the scope of the invention which, as a matter of language, might be said to fall therebetween.

What is claimed:

1. A portable electronic device adapted to be removably connected to an external device, comprising:

a housing having an access opening therein;

an electrical circuit accommodated in said housing and having a terminal adapted to be connected to said external device, said terminal being accessible via said access opening in said housing;

a lid member pivotally mounted to said housing for movement between a first position covering said terminal and second position exposing said terminal through said access opening, said terminal being adapted to be coupled with said external device via said access opening when said lid member is in said second position;

at least one actuator button supported on said lid member;

at least one switch mounted on said electrical circuit; and at least one switch element disposed in said housing and in registration with said at least one actuator button and said at least one switch;

wherein a force is applied to said at least one switch.

2. The device according to claim 1, further comprising a display member on said housing for displaying information.

3. The device according to claim 1, further comprising a transmitting member for transmitting data to another portable electronic apparatus or another external device.

4. The device according to claim 1, wherein said electrical circuit includes a processor and a memory for storing an application software downloaded from said external device to be executed on said processor.

5. The device according to claim 1, wherein said electrical circuit includes a memory for storing data downloaded from said external device.

6. The device according to claim 5, wherein said external device is a video game device, and wherein said electrical circuit includes a processor and a memory for storing an application software related to a video game and downloaded from said external device, said application software being executed on said processor.

7. The device according to claim 7, wherein said lid member is selectively mounted on or removed from said housing.

8. A system comprising an external device and a portable electronic device capable of being removably connected to said external device, said portable electronic device comprising:

a housing having an access opening;

an electrical circuit accommodated in said housing and having a terminal adapted to be connected to said external device, said terminal being accessible via said access opening in said housing;

a lid member pivotally mounted to said housing for movement between a first position covering said terminal and a second position exposing said terminal through said access opening, said terminal being adapted to be coupled with said external device via said access opening when said lid member is in said second position;

at least one actuator button supported on said lid member;

at least one switch mounted on said electrical circuit; and at least one switch element disposed in said housing and in registration with said at least one actuator button and said at least one switch;

wherein a force is applied to said at least one switch.

9. The system according to claim 8, further comprising a display member on said portable electronic device for displaying information.

10. The system according to claim 8, said portable electronic device further comprising a transmitting member for transmitting data to another portable electronic apparatus or another external device.

11. The system according to claim 8, wherein said electrical circuit includes a processor and a memory for storing an application software downloaded from said external device to be executed on said processor.

12. The system according to claim 8, wherein said electrical circuit includes a memory for storing data downloaded from said external device.

13. The system according to claim 8, wherein said external device is a video game device, and wherein said electrical circuit includes a processor and a memory for storing an application software related to a video game and downloaded from said external device, said application software being executed on said processor.

14. The system according to claim 8, wherein said lid member is selectively mounted on or removed from said housing.

* * * * *